United States Patent
Asano et al.

(10) Patent No.: US 8,300,814 B2
(45) Date of Patent: Oct. 30, 2012

(54) INFORMATION PROCESSING UNIT, TERMINAL UNIT, INFORMATION PROCESSING METHOD, KEY GENERATION METHOD AND PROGRAM

(75) Inventors: Tomoyuki Asano, Tokyo (JP); Masafumi Kusakawa, Tokyo (JP)

(73) Assignee: Sony Corporation, Tokyo (JP)

( * ) Notice: Subject to any disclaimer, the term of this patent is extended or adjusted under 35 U.S.C. 154(b) by 537 days.

(21) Appl. No.: 12/515,235

(22) PCT Filed: Oct. 3, 2007

(86) PCT No.: PCT/JP2007/069388
§ 371 (c)(1),
(2), (4) Date: May 15, 2009

(87) PCT Pub. No.: WO2008/059673
PCT Pub. Date: May 22, 2008

(65) Prior Publication Data
US 2010/0077201 A1    Mar. 25, 2010

(30) Foreign Application Priority Data

Nov. 16, 2006 (JP) ................................. 2006-310208
Nov. 16, 2006 (JP) ................................. 2006-310213

(51) Int. Cl.
*H04L 9/00* (2006.01)
(52) U.S. Cl. ........................................................ 380/44
(58) Field of Classification Search .................. 713/150; 380/44, 277
See application file for complete search history.

(56) References Cited

U.S. PATENT DOCUMENTS
2006/0015514 A1 *   1/2006   Suga .............................. 707/100

OTHER PUBLICATIONS

Yong Ho Hwang et al., "Efficient Broadcast Encryption Scheme with Log-Key Storage", CiteSeer. IST, 2005, pp. 1-13.
Nuttapong Attrapadung et al., "Subset Incremental Chain Based Broadcast Encryption with Shorter Ciphertext", Proceedings of Symposium on Information Theory and Its Applications, 28th, vol. 1, Nov. 20, 2005, pp. 57-60.

* cited by examiner

*Primary Examiner* — Cordelia Zecher
(74) *Attorney, Agent, or Firm* — Finengan, Henderson, Farabow, Garrett & Dunner, L.L.P.

(57) ABSTRACT

There is provided an information processing unit enabling reduction of the number of keys to be held by a terminal unit and the amount of calculations necessary for decryption of encrypted data. The information processing unit configures an entire binary tree made up of n-number of leaf nodes, a root node and a plurality of intermediate nodes different from the root node and the leaf nodes and divides the entire tree into a plurality of base subtrees including $n^{1/y}$ number of leaf nodes to form a y-level (y is a divisor of log(n)) hierarchical structure, such that root nodes of the base subtrees at a lower level coincide with leaf nodes of the base subtree at an upper level. Further, it assigns subsets of the terminal units to nodes of the respective base subtrees and generates directed graphs where directed edges connecting coordinate points on a coordinate axis are set.

34 Claims, 19 Drawing Sheets

FIG.13

| USER NUMBER | (A) BASIC TECHNOLOGY | (B) PRESENT INVENTION |
|---|---|---|
| 1 | 1 | 1 |
| 2 | 7 | 4 |
| 3 | 8 | 5 |
| 4 | 10 | 4 |
| 5 | 8 | 4 |
| 6 | 12 | 5 |
| 7 | 11 | 4 |
| 8 | 11 | 2 |
| 9 | 8 | 5 |
| 10 | 12 | 7 |
| 11 | 13 | 8 |
| 12 | 13 | 7 |
| 13 | 11 | 7 |
| 14 | 13 | 8 |
| 15 | 12 | 7 |
| 16 | 10 | 4 |
| 17 | 8 | 5 |
| 18 | 12 | 8 |
| 19 | 13 | 9 |
| 20 | 13 | 8 |
| 21 | 13 | 8 |
| 22 | 15 | 9 |
| 23 | 14 | 8 |
| 24 | 12 | 6 |
| 25 | 11 | 6 |
| 26 | 13 | 7 |
| 27 | 14 | 8 |
| 28 | 12 | 7 |
| 29 | 12 | 7 |
| 30 | 12 | 8 |
| 31 | 11 | 7 |
| 32 | 7 | 4 |
| 33 | 7 | 4 |
| 34 | 11 | 7 |
| 35 | 12 | 8 |
| 36 | 12 | 7 |
| 37 | 12 | 7 |
| 38 | 14 | 8 |
| 39 | 13 | 7 |
| 40 | 11 | 5 |
| 41 | 12 | 8 |
| 42 | 14 | 8 |
| 43 | 15 | 9 |
| 44 | 13 | 8 |
| 45 | 13 | 8 |
| 46 | 13 | 9 |
| 47 | 12 | 8 |
| 48 | 8 | 5 |
| 49 | 10 | 4 |
| 50 | 12 | 7 |
| 51 | 13 | 8 |
| 52 | 11 | 7 |
| 53 | 13 | 7 |
| 54 | 13 | 8 |
| 55 | 12 | 7 |
| 56 | 8 | 5 |
| 57 | 11 | 3 |
| 58 | 11 | 5 |
| 59 | 12 | 6 |
| 60 | 8 | 5 |
| 61 | 10 | 5 |
| 62 | 8 | 8 |
| 63 | 7 | 5 |
| 64 | 2 | 2 |
| TOTAL | 705 | 400 |
| AVERAGE NUMBER OF KEYS PER USER | 11.015625 | 6.25 |

INFORMATION PROCESSING UNIT, TERMINAL UNIT, INFORMATION PROCESSING METHOD, KEY GENERATION METHOD AND PROGRAM

TECHNICAL FIELD

The present invention relates to an information processing unit, a terminal unit, an information processing method, a key generation method and a program.

BACKGROUND ART

Development of encryption technology related to contents distribution over a network or the like attracts a growing interest today. Particularly, a method of securely and efficiently distributing an encryption key for decrypting encrypted contents attracts a special attention. Generally, a mechanism is necessary in which there are n-number (n is a natural number of two or above) of recipients who have valid reception rights with respect to one distributor who distributes encrypted contents, and only the n-number of recipients among an infinite number of interceptors existing on the network can decrypt the encrypted contents. Further, because the number n of recipients who have the valid reception rights varies with time, there is a demand for a mechanism capable of flexibly dealing with a change in a set of recipients.

Furthermore, in the implementation of such a mechanism, the processing load related to generation, holding and distribution of an encryption key, encryption of contents and so on occurs in the distributor, and the processing load related to holding and reception of a decryption key, decryption of contents and so on occurs in the recipient as a matter of course. It is true that the load on encryption distribution costs is relatively decreasing with various recent technological developments such as improvement in the throughput, the storage capacity or the like of an information processing device and improvement in the communication speed of an information transmission path. However, due to a drastic increase in the number of consumers of contents distribution services and a demand for the encryption technology that is secure enough to guard against skilled malicious interceptors, the processing load imposed by encryption distribution increases accordingly.

In such circumstances, as a technique to securely transmit information to a group of recipients arbitrarily selected by a distributor using a broadcast channel, schemes such as the revocation scheme and the broadcast encryption scheme have been proposed. One example of the broadcast encryption scheme is an encryption key distribution scheme which is disclosed in the following non-patent document 1, and a feature of the scheme is that an improvement in a key derivation path is made on the key distribution scheme using the existing hierarchical tree structure. Specifically, this scheme, in which a set of recipients is regarded as being divided into a plurality of subsets, creates a new subset by adding, to a certain subset, a recipient not included in the subset, and as a result of repeating this, creates a chain of subsets, and then derives an encryption key corresponding to each subset along the chain. It is thereby possible to reduce the number of keys to be held by a recipient, the amount of calculations to generate a decryption key and the traffic for key distribution.

[Non-patent document 1] Nuttapong Attrapadung and Hideki Imai, "Subset Incremental Chain Based Broadcast Encryption with Shorter Ciphertext", The 28th Symposium on Information Theory and Its Applications (SITA2005)

DISCLOSURE OF THE INVENTION

Problems to be Solved by the Invention

The encryption key distribution scheme according to the non-patent document 1 described above has a significant advantage compared to key distribution schemes such as the CD scheme (Complete Subtree scheme) and the SD scheme (Subset Difference scheme) according to related art. However, from a practical point of view assuming the implementation, there is a problem that the number of keys to be held by a terminal unit at the recipient's end and the amount of calculations in a terminal unit necessary at the time of decryption using a decryption key are still large in the case where the number of recipients is large.

The present invention has been accomplished to solve the above problem and an object of the present invention is thus to provide a novel and improved information processing unit, a terminal unit, an information processing method, a key generation method and a program capable of reducing the number of keys to be held by a terminal unit and the amount of calculations necessary for decrypting encrypted data.

Means for Solving the Problems

In order to solve the above problems, according to an aspect of the present invention, there is provided an information processing unit that includes a tree structure setting section to configure an entire binary tree made up of n-number of leaf nodes, a root node and a plurality of intermediate nodes different from the root node and the leaf nodes and divide the entire tree into a plurality of base subtrees including $n^{1/y}$ number of leaf nodes to form a y-level (y is a divisor of log(n)) hierarchical structure such that root nodes of the base subtrees at a lower level coincide with leaf nodes of the base subtree at an upper level, define a set of leaf nodes located lower than a node w of the entire tree as Aw, define a leaf node located on i-th left of a certain leaf node v as $v^{(-i)}$ and a leaf node located on i-th right as $v^{(+i)}$ in the leaf nodes of the base subtrees, regarding two leaf nodes u and v (v is on right of u) of the base subtrees, define a set (u→v) as {Au, Au∪Au$^{(+1)}$, ..., Au∪ ... ∪Av} and a set (u←v) as {Av, Av∪Av$^{(-1)}$, ..., Av∪ ... ∪Au}, when a leaf node located at a left end is defined as lv' and a leaf node located at a right end is rv' in a plurality of leaf nodes located lower than a node v of the base subtrees, correlate a set ($l_{root}$'→$r_{root}$') and a set ($l_{root}$'$^{(+1)}$←$r_{root}$') with a root node root of the base subtree at a top level, correlate a set (lv'→rv'$^{(-1)}$) and a set (lv'$^{(+1)}$←rv') with a root node v of the base subtrees at a level other than the top level, if an intermediate node v of each subtree is located on left of its parent node, correlate a set (lv'$^{(+1)}$←rv') with the intermediate node v, and if an intermediate node v of each subtree is located on right of its parent node, correlate a set (lv'→rv'$^{(-1)}$) with the intermediate node v; and a directed graph generation section to generate a directed graph where coordinate points corresponding to subsets included in the set ($l_{root}$'→$r_{root}$') or the set (lv'→rv'$^{(-1)}$) are arranged on a horizontal coordinate axis with a degree of inclusion increasing from left to right and a directed edge connecting the coordinate points is set and/or a directed graph where coordinate points corresponding to subsets included in the set ($l_{root}$'$^{(+1)}$←$r_{root}$') or the set (lv'$^{(+1)}$←rv') are arranged on a horizontal coordinate axis with a degree of inclusion increasing from right to left and a directed edge connecting the coordinate points is set, for each of the root node and the intermediate node v of the respective base subtrees.

Further, the directed graph generation section may further include an inter-subtree directed edge setting section to set a directed edge from the directed graph corresponding to the base subtree at the lower level to the directed graph corresponding to the base subtree at the upper level.

Further, the inter-subtree directed edge setting section may set a directed edge from a first coordinate point in the directed graph corresponding to the base subtree at the lower level to a second coordinate point in the directed graph corresponding to the base subtree at the upper level, and a subset corresponding to the second coordinate point may include a subset corresponding to the first coordinate point.

Further, the directed graph generation section may include a coordinate axis setting section and a directed edge setting section, the coordinate axis setting section may set a first horizontal coordinate axis on which coordinate points corresponding to subsets included in the set $(l_{root}' \to r_{root}')$ or the set $(lv' \to rv'^{(-1)})$ are arranged with a degree of inclusion increasing from left to right and/or a second horizontal coordinate axis on which coordinate points corresponding to subsets included in the set $(l_{root}'^{(+1)} \leftarrow r_{root}')$ or the set $(lv'^{(+1)} \leftarrow rv')$ are arranged with a degree of inclusion increasing from left to right, for each of the root node and the intermediate node v of the respective base subtrees and additionally set at least total two temporary coordinate points at a left end and/or a right end of each of the first and second horizontal coordinate axes, and the directed edge setting section may, after setting a given integer k (k is a divisor of $\log(n^{1/y})$) and calculating an integer x satisfying $n^{(x-1)/k*y} < (rv' - lv' + 1) \leq n^{x/k*y}$, repeatedly set a rightward directed edge extending to a coordinate point being $n^{i/(k*y)}$ (i=0 to x−1) apart, starting from a coordinate point at a left end on each first horizontal coordinate axis, repeatedly set a leftward directed edge extending to a coordinate point being $n^{i/(k*y)}$ (i=0 to x−1) apart, starting from a coordinate point at a right end on each second horizontal coordinate axis, exclude all directed edges having tails or heads at the temporary coordinate points for each of the first and second horizontal coordinate axes, and exclude directed edges other than a longest directed edge from the directed edges reaching each coordinate point on the first and second horizontal coordinate axes.

The information processing unit may further include a key generation section to generate a set key for encrypting contents or a contents key based on the directed graph.

Further, the key generation section may, in response to input of an intermediate key t(Si) for a subset S corresponding to a certain coordinate point in the directed graph, output the set key k(Si) corresponding to a subset Si corresponding to the coordinate point and intermediate keys t(S1), t(S2), . . . , t(Sk) for coordinate points S1, S2, . . . , Sk at heads of the directed edges having tails at the coordinate point S.

Further, the key generation section may, in response to input of a set key k(S) for a subset S corresponding to a certain coordinate point in the directed graph, output set keys k(S1), k(S2), . . . , k(Sk) for coordinate points S1, S2, . . . , Sk at heads of the directed edges having tails at the coordinate point S.

The information processing unit may further include an encryption section to encrypt the contents or the contents key using the set key.

The information processing unit may further include a transmission section to transmit the contents or the contents key encrypted by the encryption section to terminal units correlated respectively with some or all of leaf nodes 1 to n of the entire tree.

The information processing unit may further include a subset determination section to determine a set (N\R) of the terminal units allowed to decrypt the contents encrypted using the set key or the contents key and determine m-number of subsets S1 to Sm satisfying the set (N\R)={S1∪ S2∪ . . . ∪Sm}, when a subset of leaf nodes 1 to n of the entire tree is defined as Si.

Further, the subset determination section may determine the subsets S1 to Sm so as to minimize a value of m.

Further, the transmission section may transmit information indicating the set (N\R) or information indicating the subsets S1 to Sm constituting the set (N\R) to the terminal units.

Further, the transmission section may transmit the contents or the contents key encrypted by the encryption section using the set keys corresponding respectively to the subsets S1 to Sm to the terminal units.

Further, in order to solve the above problems, according to another aspect of the present invention, there is provided a terminal unit that includes a key generation section to generate a set key for decrypting encrypted contents or an encrypted contents key based on a directed graph, and the directed graph is generated by configuring an entire binary tree made up of n-number of leaf nodes, a root node and a plurality of intermediate nodes different from the root node and the leaf nodes and dividing the entire tree into a plurality of base subtrees including $n^{1/y}$ number of leaf nodes to form a y-level (y is a divisor of log(n)) hierarchical structure such that root nodes of the base subtrees at a lower level coincide with leaf nodes of the base subtree at an upper level, defining a set of leaf nodes located lower than a node w of the entire tree as Aw, defining a leaf node located on i-th left of a certain leaf node v as $v^{(-i)}$ and a leaf node located on i-th right as $v^{(+1)}$ in the leaf nodes of the base subtrees, regarding two leaf nodes u and v (v is on right of u) of the base subtrees, defining a set (u→v) as {Au, Au∪Au$^{(+1)}$, . . . , Au∪ . . . ∪Av} and a set (u←v) as {Av, Av∪Av$^{(-1)}$, . . . , Av∪ . . . ∪Au}, when a leaf node located at a left end is defined as lv' and a leaf node located at a right end is rv' in a plurality of leaf nodes located lower than a node v of the base subtrees, correlating a set $(l_{root}' \to r_{root}')$ and a set $(l_{root}'^{(+1)} \leftarrow r_{root}')$ with a root node of the base subtree at a top level, correlating a set $(lv' \to rv'^{(-1)})$ and a set $(lv'^{(+1)} \leftarrow rv')$ with a root node v of the base subtrees at a level other than the top level, if an intermediate node v of each subtree is located on left of its parent node, correlating a set $(lv'^{(+1)} \leftarrow rv')$ with the intermediate node v, if an intermediate node v of each subtree is located on right of its parent node, correlating a set $(lv' \to rv'^{(-1)})$ with the intermediate node v, and generating a directed graph where coordinate points corresponding to subsets included in the set $(l_{root}' \to r_{root}')$ or the set $(lv' \to rv'^{(-1)})$ are arranged on a horizontal coordinate axis with a degree of inclusion increasing from left to right and a directed edge connecting the coordinate points is set and/or a directed graph where coordinate points corresponding to subsets included in the set $(l_{root}'^{(+1)} \leftarrow r_{root}')$ or the set $(lv'^{(+1)} \leftarrow rv')$ are arranged on a horizontal coordinate axis with a degree of inclusion increasing from right to left and a directed edge connecting the coordinate points is set, for each of the root node and the intermediate node v of the respective base subtrees.

Further, a directed edge may be set from the directed graph corresponding to the base subtree at the lower level to the directed graph corresponding to the base subtree at the upper level.

Further, a directed edge may be set from a first coordinate point in the directed graph corresponding to the base subtree at the lower level to a second coordinate point in the directed graph corresponding to the base subtree at the upper level, and a subset corresponding to the second coordinate point may include a subset corresponding to the first coordinate point.

The terminal unit may further include a decryption section to decrypt the encrypted contents or the encrypted contents key using the set key generated by the key generation section.

Further, the key generation section may, in response to input of an intermediate key t(Si) for a subset S corresponding to a certain coordinate point in the directed graph, output the set key k(Si) corresponding to the subset S corresponding to the coordinate point and intermediate keys t(S1), t(S2), . . . , t(Sk) for subsets S1, S2, . . . , Sk corresponding to coordinate points at heads of the directed edges having tails at the coordinate point.

Further, the key generation section may, in response to input of a set key k(S) for a subset S corresponding to a certain coordinate point in the directed graph, output set keys k(S1), k(S2), . . . , k(Sk) for coordinate points S1, S2, . . . , Sk at heads of the directed edges having tails at the coordinate point S.

Further, the decryption section may decrypt the encrypted contents key using the set key and decrypts the encrypted contents using the decrypted contents key.

Further, the terminal unit may include a reception section to, when a set (N\R) of the terminal units allowed to decrypt the contents encrypted using the set key or the contents key is determined and m-number of subsets S1 to Sm satisfying the set (N\R)={S1∪S2∪ . . . ∪Sm} are determined, receive information indicating the set (N\R) or information indicating the subsets S1 to Sm constituting the set (N\R), where a subset of leaf nodes 1 to n of the entire tree is defined as Si; and a decision section to decide whether the terminal unit belongs to any of the subsets S1 to Sm based on the received information and decide whether decryption of the encrypted contents is allowed based on the decision result.

The terminal unit may further include a decryption section to decrypt the encrypted contents or the encrypted contents key using the set key generated by the key generation section, and the decryption section may decrypt the encrypted contents or the encrypted contents key using the set key when the decision section decides that the terminal unit belongs to any of the subsets S1 to Sm.

Further, in order to solve the above problems, according to another aspect of the present invention, there is provided an information processing method that includes a step of configuring an entire binary tree made up of n-number of leaf nodes, a root node and a plurality of intermediate nodes different from the root node and the leaf nodes and dividing the entire tree into a plurality of base subtrees including $n^{1/y}$ number of leaf nodes to form a y-level (y is a divisor of log(n)) hierarchical structure such that root nodes of the base subtrees at a lower level coincide with leaf nodes of the base subtree at an upper level; a step of defining a set of leaf nodes located lower than a node w of the entire tree as Aw, defining a leaf node located on i-th left of a certain leaf node v as $v^{(-i)}$ and a leaf node located on i-th right as $v^{(+i)}$ in the leaf nodes of the base subtrees, regarding two leaf nodes u and v (v is on right of u) of the base subtrees, defining a set (u→v) as {Au, Au∪Au$^{(+1)}$, . . . , Au∪ . . . ∪Av} and a set (u←v) as {Av, Av∪Av$^{(-1)}$, . . . , Av∪ . . . ∪Au}, when a leaf node located at a left end is defined as lv' and a leaf node located at a right end is rv' in a plurality of leaf nodes located lower than a node v of the base subtrees, correlating a set ($l_{root}$'→$r_{root}$') and a set ($l_{root}$'$^{(+1)}$←$r_{root}$') with a root node root of the base subtree at a top level, correlating a set (lv'→rv'$^{(-1)}$) and a set (lv'$^{(+1)}$←rv') with a root node v of the base subtrees at a level other than the top level, if an intermediate node v of each subtree is located on left of its parent node, correlating a set (lv'$^{(+1)}$←rv') with the intermediate node v, and if an intermediate node v of each subtree is located on right of its parent node, correlating a set (lv'→rv'$^{(-1)}$) with the intermediate node v; and a step of generating a directed graph where coordinate points corresponding to subsets included in the set ($l_{root}$'→$r_{root}$') or the set (lv'→rv'$^{(-1)}$) are arranged on a horizontal coordinate axis with a degree of inclusion increasing from left to right and a directed edge connecting the coordinate points is set and/or a directed graph where coordinate points corresponding to subsets included in the set ($l_{root}$'$^{(+1)}$←$r_{root}$') or the set (lv'$^{(+1)}$←rv') are arranged on a horizontal coordinate axis with a degree of inclusion increasing from right to left and a directed edge connecting the coordinate points is set, for each of the root node and the intermediate node v of the respective base subtrees.

Further, in order to solve the above problems, according to another aspect of the present invention, there is provided a key generation method to generate a set key for decrypting encrypted contents or an encrypted contents key based on a directed graph, wherein the directed graph is obtained by configuring an entire binary tree made up of n-number of leaf nodes, a root node and a plurality of intermediate nodes different from the root node and the leaf nodes and dividing the entire tree into a plurality of base subtrees including $n^{1/y}$ number of leaf nodes to form a y-level (y is a divisor of log(n)) hierarchical structure such that root nodes of the base subtrees at a lower level coincide with leaf nodes of the base subtree at an upper level, defining a set of leaf nodes located lower than a node w of the entire tree as Aw, defining a leaf node located on i-th left of a certain leaf node v as $v^{(-i)}$ and a leaf node located on i-th right as $v^{(+i)}$ in the leaf nodes of the base subtrees, regarding two leaf nodes u and v (v is on right of u) of the base subtrees, defining a set (u→v) as {Au, Au∪Au$^{(+1)}$, . . . , Au∪ . . . ∪Av} and a set (u←v) as {Av, Av∪Av$^{(-1)}$, . . . , Av∪ . . . ∪Au}, when a leaf node located at a left end is defined as lv' and a leaf node located at a right end is rv' in a plurality of leaf nodes located lower than a node v of the base subtrees, correlating a set ($l_{root}$'→$r_{root}$') and a set ($l_{root}$'$^{(+1)}$←$r_{root}$') with a root node root of the base subtree at a top level, correlating a set (lv'→rv'$^{(-1)}$) and a set (lv'$^{(+1)}$←rv') with a root node v of the base subtrees at a level other than the top level, if an intermediate node v of each subtree is located on left of its parent node, correlating a set (lv'$^{(+1)}$←rv') with the intermediate node v, if an intermediate node v of each subtree is located on right of its parent node, correlating a set (lv'→rv'$^{(-1)}$) with the intermediate node v, and generating a directed graph where coordinate points corresponding to subsets included in the set ($l_{root}$'→$r_{root}$') or the set (lv'→rv'$^{(-1)}$) are arranged on a horizontal coordinate axis with a degree of inclusion increasing from left to right and a directed edge connecting the coordinate points is set and/or a directed graph where coordinate points corresponding to subsets included in the set ($l_{root}$'$^{(+1)}$←$r_{root}$') or the set (lv'$^{(+1)}$←rv') are arranged on a horizontal coordinate axis with a degree of inclusion increasing from right to left and a directed edge connecting the coordinate points is set, for each of the root node and the intermediate node v of the respective base subtrees.

Further, in order to solve the above problems, according to another aspect of the present invention, there is provided a program causing a computer to execute processing including a step of configuring an entire binary tree made up of n-number of leaf nodes, a root node and a plurality of intermediate nodes different from the root node and the leaf nodes and dividing the entire tree into a plurality of base subtrees including $n^{1/y}$ number of leaf nodes to form a y-level (y is a divisor of log(n)) hierarchical structure such that root nodes of the base subtrees at a lower level coincide with leaf nodes of the base subtree at an upper level; a step of defining a set of leaf nodes located lower than a node w of the entire tree as Aw, defining a leaf node located on i-th left of a certain leaf node v as $v^{(-i)}$ and a leaf node located on i-th right as $v^{(+i)}$ in the leaf nodes of the base subtrees, regarding two leaf nodes u and v (v is on right of u) of the base subtrees, defining a set (u→v) as $\{Au, Au \cup Au^{(+1)}, \ldots, Au \cup \ldots \cup Av\}$ and a set (u←v) as $\{Av, Av \cup Av^{(-1)}, \ldots, Av \cup \ldots \cup Au\}$, when a leaf node located at a left end is defined as lv' and a leaf node located at a right end is rv' in a plurality of leaf nodes located lower than a node v of the base subtrees, correlating a set $(l_{root}' \to r_{root}')$ and a set $(l_{root}'^{(+1)} \leftarrow r_{root}')$ with a root node root of the base subtree at a top level, correlating a set $(lv' \to rv'^{(-1)})$ and a set $(lv'^{(+1)} \leftarrow rv')$ with a root node v of the base subtrees at a level other than the top level, if an intermediate node v of each subtree is located on left of its parent node, correlating a set $(lv'^{(+1)} \leftarrow rv')$ with the intermediate node v, and if an intermediate node v of each subtree is located on right of its parent node, correlating a set $(lv' \to rv'^{(-1)})$ with the intermediate node v; and a step of generating a directed graph where coordinate points corresponding to subsets included in the set $(l_{root}' \to r_{root}')$ or the set $(lv' \to rv'^{(-1)})$ are arranged on a horizontal coordinate axis with a degree of inclusion increasing from left to right and a directed edge connecting the coordinate points is set and/or a directed graph where coordinate points corresponding to subsets included in the set $(l_{root}'^{(+1)} \leftarrow r_{root}')$ or the set $(lv'^{(+1)} \leftarrow rv')$ are arranged on a horizontal coordinate axis with a degree of inclusion increasing from right to left and a directed edge connecting the coordinate points is set, for each of the root node and the intermediate node v of the respective base subtrees.

Further, in order to solve the above problems, according to another aspect of the present invention, there is provided a program causing a computer to execute a step of generating a set key for decrypting encrypted contents or an encrypted contents key based on a directed graph, wherein the directed graph is obtained by configuring an entire binary tree made up of n-number of leaf nodes, a root node and a plurality of intermediate nodes different from the root node and the leaf nodes and dividing the entire tree into a plurality of base subtrees including $n^{1/y}$ number of leaf nodes to form a y-level (y is a divisor of log(n)) hierarchical structure such that root nodes of the base subtrees at a lower level coincide with leaf nodes of the base subtree at an upper level, defining a set of leaf nodes located lower than a node w of the entire tree as Aw, defining a leaf node located on i-th left of a certain leaf node v as $v^{(-i)}$ and a leaf node located on i-th right as $v^{(+i)}$ in the leaf nodes of the base subtrees, regarding two leaf nodes u and v (v is on right of u) of the base subtrees, defining a set (u→v) as $\{Au, Au \cup Au^{(+1)}, \ldots, Au \cup \ldots \cup Av\}$ and a set (u←v) as $\{Av, Av \cup Av^{(-1)}, \ldots, Av \cup \ldots \cup Au\}$, when a leaf node located at a left end is defined as lv' and a leaf node located at a right end is rv' in a plurality of leaf nodes located lower than a node v of the base subtrees, correlating a set $(l_{root}' \to r_{root}')$ and a set $(l_{root}'^{(+1)} \leftarrow r_{root}')$ with a root node root of the base subtree at a top level, correlating a set $(lv' \to rv'^{(-1)})$ and a set $(lv'^{(+1)} \leftarrow rv')$ with a root node v of the base subtrees at a level other than the top level, if an intermediate node v of each subtree is located on left of its parent node, correlating a set $(lv'^{(+1)} \leftarrow rv')$ with the intermediate node v, if an intermediate node v of each subtree is located on right of its parent node, correlating a set $(lv' \to rv'^{(-1)})$ with the intermediate node v, and generating a directed graph where coordinate points corresponding to subsets included in the set $(l_{root}' \to r_{root}')$ or the set $(lv' \to rv'^{(-1)})$ are arranged on a horizontal coordinate axis with a degree of inclusion increasing from left to right and a directed edge connecting the coordinate points is set and/or a directed graph where coordinate points corresponding to subsets included in the set $(l_{root}'^{(+1)} \leftarrow r_{root}')$ or the set $(lv'^{(+1)} \leftarrow rv')$ are arranged on a horizontal coordinate axis with a degree of inclusion increasing from right to left and a directed edge connecting the coordinate points is set, for each of the root node and the intermediate node v of the respective base subtrees.

In order to solve the above problems, according to an aspect of the present invention, there is provided an information processing unit that includes directed graph acquisition section to acquire a directed graph composed of a plurality of directed edges, such that one tail of a longest directed edge constituting the directed graph coincides with a tail of the directed graph; and a key generation section to generate a set key for encrypting or decrypting contents or a contents key based on the directed graph acquired by the directed graph acquisition section.

Further, in order to solve the above problems, according to an aspect of the present invention, there is provided an information processing unit to process a temporary directed graph formed by arranging a plurality of directed edges with a length of $n^{i/k}$ (i=0, 1, ..., x−1) on first to fourth horizontal coordinate axes according to a natural number x satisfying $n^{(x-1)/k} < (rv - lv + 1) \leq n^{x/k}$ for a given integer k, in a binary tree made up of n-number of leaf nodes to which numbers 1 to n (n is a natural number) are assigned, a root node and a plurality of intermediate nodes different from the root node and the leaf nodes, where a number assigned to a leaf node located at a left end is defined as lv and a number assigned to a leaf node located at a right end is defined as rv in a plurality of leaf nodes located lower than a certain intermediate node v or a certain root node v, for natural numbers i and j (i≤j), it is assumed a set (i→j) is notated as $\{\{i\}, \{i, i+1\}, \ldots, \{i, i+1, \ldots, j-1, j\}\}$, and a set (i←j) is notated as $\{\{j\}, \{j, j-1\}, \ldots, \{j, j-1, \ldots, i+1, i\}\}$, a first horizontal coordinate axis correlated with the root node and having coordinate points correlated respectively with subsets included in a set (1→n) and arranged on a horizontal coordinate axis with a degree of inclusion increasing from left to right is set, a second horizontal coordinate axis correlated with the root node and having coordinate points correlated respectively with subsets included in a set (2←n) and arranged on a horizontal coordinate axis with a degree of inclusion increasing from right to left is set, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right is set, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left is set, and the information processing unit includes a temporary directed graph acquisition section to acquire the temporary directed graph; a directed graph generation section to generate a directed graph by leaving a longer directed edge among a plurality of directed edges constituting the temporary directed graph acquired by the temporary directed graph acquisition section; and a key generation section to generate a set key for encrypting contents or a contents key based on the directed graph.

Further, in order to solve the above problems, according to an aspect of the present invention, there is provided an information processing unit that includes a tree structure setting section to configure a binary tree made up of n-number of leaf nodes to which numbers 1 to n (n is a natural number) are assigned, a root node and a plurality of intermediate nodes different from the root node and the leaf nodes, define a set (i→j) as {{i}, {i,i+1}, ..., {i,i+1, ...,j−1,j}} and a set (i←j) as {{j}, {j,j−1}, ..., {j,j−1, ..., i+1,i}} for natural numbers i and j (i≦j), and set a number assigned to a leaf node located at a left end as lv and a number assigned to a leaf node located at a right end as rv in a plurality of leaf nodes located lower than a certain intermediate node v or a certain root node v; a coordinate axis setting section to set a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, place two temporary coordinate points each on right of a coordinate point located at a right end of the third horizontal coordinate axis and on left of a coordinate point located at a left end of the second and fourth horizontal coordinate axes, and set a coordinate point located at a right end of the first horizontal coordinate axis as a first temporary coordinate point and place a second temporary coordinate point on right of the first temporary coordinate point; and a directed graph generation section to generate directed graphs respectively related to a set (1→n−1), the set (2←n), the set (lv+1←rv) and the set (lv→rv−1) by setting a given integer k, calculating an integer x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than a longest directed edge from the directed edges reaching each coordinate point on the first to fourth horizontal coordinate axes, and generate a directed graph related to the set (1→n) by adding a directed edge with a length of 1 having a head at the first temporary coordinate point on the first horizontal coordinate axis to the directed graph related to the set (1→n−1).

As described above, the encryption key distribution scheme using intermediate keys and set keys enables distribution of the intermediate keys and generation of the set keys based on the above-described directed graphs, thereby enabling reduction of the worst value of the amount of calculations necessary for each user (terminal unit) to generate a decryption key at the time of decrypting distributed encrypted information without increasing the number of keys to be held by each user.

Further, the information processing unit may include a key generation section to generate a set key for encrypting contents or a contents key based on the directed graphs.

Further, the key generation section may, in response to input of an intermediate key t(S) for a subset S corresponding to a certain coordinate point in the directed graph, output the set key k(S) corresponding to the subset S corresponding to the coordinate point and intermediate keys t(S1), t(S2), ..., t(Sk) for coordinate points S1, S2, ..., Sk at heads of the directed edges having tails at the coordinate point S.

Further, the key generation section may, in response to input of a set key k(S) for a subset S corresponding to a certain coordinate point in the directed graph, output set keys k(S1), k(S2), ..., k(Sk) for coordinate points S1, S2, ..., Sk at heads of the directed edges having tails at the coordinate point S.

Further, the information processing unit may include an initial intermediate key setting section to set given random numbers as an intermediate key corresponding to a tail of each directed graph.

Further, the information processing unit may include an encryption section to encrypt contents or a contents key using the set key.

Further, the information processing unit may include a transmission section to transmit the contents or the contents key encrypted by the encryption section to terminal units correlated respectively with some or all of leaf nodes 1 to n (n is a natural number) constituting a given binary tree.

Further, the information processing unit may include a subset determination section to define a subset of the leaf nodes 1 to n as Si, determine a set (N\R) of the terminal units allowed to decrypt the contents encrypted using the set key or the contents key and determine m-number of subsets S1 to Sm satisfying the set (N\R)=S1∪S2∪ ... ∪Sm.

Further, the subset determination section may determine the subsets S1 to Sm so as to minimize a value of m.

The information processing unit may further include a transmission section to transmit information indicating the set (N\R) or information indicating the subsets S1 to Sm constituting the set (N\R) to the terminal units.

The information processing unit may further include a decryption section to decrypt contents or a content key using the set key.

The information processing unit may further include a reception section correlated with one or more leaf nodes 1 to n (n is a natural number) constituting a given binary tree and, to receive contents or a contents key encrypted using the set key.

The encrypted contents or the encrypted contents key received by the reception section may be decrypted by one or more information processing units correlated with the leaf node being an element of a set S including the leaf node correlated with itself in a set Si defined as a subset of the leaf nodes 1 to n.

Further, in order to solve the above problems, according to another aspect of the present invention, there is provided a terminal unit that includes a key generation section to generate a set key for decrypting contents or a contents key based on a directed graph. The directed graph is generated by configuring a binary tree made up of n-number of leaf nodes to which numbers 1 to n (n is a natural number) are assigned, a root node and a plurality of intermediate nodes different from the root node and the leaf nodes, defining a set (i→j) as {{i}, {i, i+1}, ..., {i, i+1, ..., j−1, j}} and a set (i←j) as {{j}, {j, j−1}, ..., {j,j−1, i+1, i}} for natural numbers i and j (i≦j), and setting a number assigned to a leaf node located at a left end as lv and a number assigned to a leaf node located at a right end as rv in a plurality of leaf nodes located lower than a certain intermediate node v or a certain root node v, setting a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, placing two temporary coordinate points each on right of a coordinate point located at a right end of the third horizontal coordinate axis and on left of a coordinate point located at a left end of the second and fourth horizontal coordinate axes, setting a coordinate point located at a right end of the first horizontal coordinate axis as a first temporary coordinate point and placing a second temporary coordinate point on right of the first temporary coordinate point, generating directed graphs respectively related to a set (1→n−1), the set (2←n), the set (lv+1←rv) and the set (lv→rv−1) by setting a given integer k, calculating an integer x satisfying $n^{(x-1)/k}<(rv-lv+1)\leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than a longest directed edge from the directed edges reaching each coordinate point on the first to fourth horizontal coordinate axes, and generating a directed graph related to the set (1→n) by adding a directed edge with a length of 1 having a head at the first temporary coordinate point on the first horizontal coordinate axis to the directed graph related to the set (1→n−1).

As described above, the encryption key distribution scheme using intermediate keys and set keys enables distribution of the intermediate keys and generation of the set keys based on the above-described directed graphs, thereby enabling reduction of the worst value of the amount of calculations necessary for each user (terminal unit) to generate a decryption key at the time of decrypting distributed encrypted information without increasing the number of keys to be held by each user.

Further, the terminal unit may include a decryption section to decrypt the encrypted contents or the encrypted contents key using the set key.

Further, the key generation section may, in response to input of an intermediate key t(S) for a subset S corresponding to a certain coordinate point in the directed graph, output the set key k(S) corresponding to the subset S corresponding to the coordinate point and intermediate keys t(S1), t(S2), . . . , t(Sk) for subsets S1, S2, . . . , Sk corresponding to coordinate points at heads of the directed edges having tails at the coordinate point S.

Further, the key generation section may, in response to input of a set key k(S) for a subset S corresponding to a certain coordinate point in the directed graph, output set keys k(S1), k(S2), . . . , k(Sk) for coordinate points S1, S2, . . . , Sk at heads of the directed edges having tails at the coordinate point S.

Further, the decryption section may decrypt the encrypted contents key using the set key and decrypt the encrypted contents using the decrypted contents key.

Further, when a subset of leaf nodes 1 to n of the tree is defined as Si, and in the case where a set (N\R) of the terminal units allowed to decrypt the contents encrypted using the set key or the contents key is determined, m-number of subsets S1 to Sm satisfying the set (N\R)=S1∪S2∪ . . . ∪Sm are determined, and information indicating the set (N\R) or information indicating the subsets S1 to Sm constituting the set (N\R) is received, the terminal unit may include a decision section to decide whether the terminal unit belongs to any of the subsets S1 to Sm based on the received information and decide whether decryption of the encrypted contents is allowed based on the decision result.

Further, when it is decided that the terminal unit belongs to any of the subsets S1 to Sm, the decryption section may decrypt the contents or the contents key using the set key corresponding to the subset to which the terminal unit belongs.

Further, in order to solve the above problems, according to yet another aspect of the present invention, there is provided an information processing method that includes a directed graph acquisition step to acquire a directed graph generated by, in a temporary directed graph composed of a plurality of directed edges, leaving a longer directed edge among the plurality of directed edges constituting the temporary directed graph; and a key generation step to generate a set key for encrypting or decrypting contents or a contents key based on the directed graph acquired by the directed graph acquisition section.

Further, in order to solve the above problems, according to yet another aspect of the present invention, there is provided an information processing method to process a temporary directed graph formed by arranging a plurality of directed edges with a length of $n^{i/k}$ (i=0, 1, . . . , x−1) on first to fourth horizontal coordinate axes according to a natural number x satisfying $n^{(x-1)/k}<(rv-lv+1)\leq n^{x/k}$ for a given integer k in a binary tree made up of n-number of leaf nodes to which numbers 1 to n (n is a natural number) are assigned, a root node and a plurality of intermediate nodes different from the root node and the leaf nodes, where a number assigned to a leaf node located at a left end is defined as lv and a number assigned to a leaf node located at a right end is defined as rv in a plurality of leaf nodes located lower than a certain intermediate node v or a certain root node v, for natural numbers i and j (i≦j), it is assumed a set (i→j) is notated as {{i}, {i, i+1}, . . . , {i, i+1, . . . , j−1, j}}, and a set (i←j) is notated as {{j}, {j, j−1}, . . . , {j, j−1, . . . , i+1, i}}, a first horizontal coordinate axis correlated with the root node and having coordinate points correlated respectively with subsets included in a set (1→n) and arranged on a horizontal coordinate axis with a degree of inclusion increasing from left to right is set, a second horizontal coordinate axis correlated with the root node and having coordinate points correlated respectively with subsets included in a set (2←n) and arranged on a horizontal coordinate axis with a degree of inclusion increasing from right to left is set, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right is set, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left is set, and the information processing method includes a temporary directed graph acquisition step of acquiring the temporary directed graph; a directed graph generation step of generating a directed graph by leaving a longer directed edge among a plurality of directed edges constituting the temporary directed graph acquired by the temporary directed graph acquisition section; and a key generation step of generating a set key for encrypting contents or a contents key based on the directed graph.

Further, in order to solve the above problems, according to still another aspect of the present invention, there is provided an information processing method that includes a tree structure setting step of configuring a binary tree made up of n-number of leaf nodes to which numbers 1 to n (n is a natural number) are assigned, a root node and a plurality of intermediate nodes different from the root node and the leaf nodes, defining a set (i→j) as $\{\{i\}, \{i, i+1\}, \ldots, \{i, i+1, \ldots, j-1, j\}\}$ and a set (i←j) as $\{\{j\}, \{j, j-1\}, \ldots, \{j, j-1, \ldots, i+1, i\}\}$ for natural numbers i and j (i≦j), and setting a number assigned to a leaf node located at a left end as lv and a number assigned to a leaf node located at a right end as rv in a plurality of leaf nodes located lower than a certain intermediate node v or a certain root node v; a coordinate axis setting step of setting a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, placing two temporary coordinate points each on right of a coordinate point located at a right end of the third horizontal coordinate axis and on left of a coordinate point located at a left end of the second and fourth horizontal coordinate axes, and setting a coordinate point located at a right end of the first horizontal coordinate axis as a first temporary coordinate point and placing a second temporary coordinate point on right of the first temporary coordinate point; and a directed graph generation step of generating directed graphs respectively related to a set (1→n−1), the set (2←n), the set (lv+1←rv) and the set (lv→rv−1) by setting a given integer k, calculating an integer x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed points for each of the first to fourth horizontal coordinate axes, and excluding directed edges other than a longest directed edge from the directed edges reaching each coordinate point on the first to fourth horizontal coordinate axes, and generating a directed graph related to the set (1→n) by adding a directed edge with a length of 1 having a head at the first temporary coordinate point on the first horizontal coordinate axis to the directed graph related to the set (1→n−1).

As described above, the encryption key distribution scheme using intermediate keys and set keys enables distribution of the intermediate keys and generation of the set keys based on the above-described directed graphs, thereby enabling reduction of the worst value of the amount of calculations necessary for each user (terminal unit) to generate a decryption key at the time of decrypting distributed encrypted information without increasing the number of keys to be held by each user.

Further, in order to solve the above problems, according to still another aspect of the present invention, there is provided a key generation method that includes a key generation step of generating a set key for decrypting contents or a contents key based on a directed graph. The directed graph is generated by configuring a binary tree made up of n-number of leaf nodes to which numbers 1 to n (n is a natural number) are assigned, a root node and a plurality of intermediate nodes different from the root node and the leaf nodes, defining a set (i→j) as $\{\{i\}, \{i, i+1\}, \ldots, \{i, i+1, \ldots, j-1, \ldots, j\}\}$, and a set (i←j) as $\{\{j\}, \{j, j-1\}, \ldots, \{j, j-1, \ldots, i+1, i\}\}$ for natural numbers i and j (i≦j), and setting a number assigned to a leaf node located at a left end as lv and a number assigned to a leaf node located at a right end as rv in a plurality of leaf nodes located lower than a certain intermediate node v or a certain root node v, setting a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, placing two temporary coordinate points each on right of a coordinate point located at a right end of the third horizontal coordinate axis and on left of a coordinate point located at a left end of the second and fourth horizontal coordinate axes, setting a coordinate point located at a right end of the first horizontal coordinate axis as a first temporary coordinate point and placing a second temporary coordinate point on right of the first temporary coordinate point, generating directed graphs respectively related to a set (1→n−1), the set (2←n), the set (lv+1←rv) and the set (lv→rv−1) by setting a given integer k, calculating an integer x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than a longest directed edge from the directed edges reaching each coordinate point on the first to fourth horizontal coordinate axes, and generating a directed graph related to the set (1→n) by adding a directed edge with a length of 1 having a head at the first temporary coordinate point on the first horizontal coordinate axis to the directed graph related to the set (1→n−1).

As described above, the encryption key distribution scheme using intermediate keys and set keys enables distribution of the intermediate keys and generation of the set keys based on the above-described directed graphs, thereby enabling reduction of the worst value of the amount of calculations necessary for each user (terminal unit) to generate a decryption key at the time of decrypting distributed encrypted information without increasing the number of keys to be held by each user.

Further, in order to solve the above problems, according to yet another aspect of the present invention, there is provided a program causing a computer to implement a tree structure setting function to configure a binary tree made up of n-number of leaf nodes to which numbers 1 to n (n is a natural number) are assigned, a root node and a plurality of intermediate nodes different from the root node and the leaf nodes, define a set (i→j) as $\{\{i\}, \{i, i+1\}, \ldots, \{i, i+1, \ldots, j-1, j\}\}$ and a set (i←j) as $\{\{j\}, \{j, j-1\}, \ldots, \{j, j-1, \ldots, i+1, i\}\}$ for natural numbers i and j (i≦j), and set a number assigned to a leaf node located at a left end as lv and a number assigned to a leaf node located at a right end as rv in a plurality of leaf nodes located lower than a certain intermediate node v or a certain root node v; a coordinate axis setting function to set a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, place two temporary coordinate points each on right of a coordinate point located at a right end of the third horizontal coordinate axis and on left of a coordinate point located at a left end of the second and fourth horizontal coordinate axes, and set a coordinate point located at a right end of the first horizontal coordinate axis as a first temporary coordinate point and place a second temporary coordinate point on right of the first temporary coordinate point; and a directed graph generation function to generate directed graphs respectively related to a set (1→n−1), the set (2←n), the set (lv+1←rv) and the set (lv→rv−1) by setting a given integer k, calculating an integer x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than a longest directed edge from the directed edges reaching each coordinate point on the first to fourth horizontal coordinate axes, and generate a directed graph related to the set (1→n) by adding a directed edge with a length of 1 having a head at the first temporary coordinate point on the first horizontal coordinate axis to the directed graph related to the set (1→n−1).

As described above, the encryption key distribution scheme using intermediate keys and set keys enables distribution of the intermediate keys and generation of the set keys based on the above-described directed graphs, thereby enabling reduction of the worst value of the amount of calculations necessary for each user (terminal unit) to generate a decryption key at the time of decrypting distributed encrypted information without increasing the number of keys to be held by each user.

Further, in order to solve the above problems, according to still another aspect of the present invention, there is provided a program causing a computer to implement a key generation function to generate a set key for decrypting contents or a contents key based on a directed graph. The directed graph is generated by configuring a binary tree made up of n-number of leaf nodes to which numbers 1 to n (n is a natural number) are assigned, a root node and a plurality of intermediate nodes different from the root node and the leaf nodes, defining a set (i→j) as $\{\{i\}, \{i, i+1\}, \ldots, \{i, i+1, \ldots, j-1, j\}\}$ and a set (i←j) as $\{\{j\}, \{j, j-1\}, \ldots, \{j, j-1, \ldots, i+1, i\}\}$ for natural numbers i and j (i≦j), and setting a number assigned to a leaf node located at a left end as lv and a number assigned to a leaf node located at a right end as rv in a plurality of leaf nodes located lower than a certain intermediate node v or a certain root node v, setting a first horizontal coordinate axis correlated with the root node and having coordinate points correlated respectively with subsets included in a set (1→n) and arranged on a horizontal coordinate axis with a degree of inclusion increasing from left to right, a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right, and a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, placing two temporary coordinate points each on right of a coordinate point located at a right end of the third horizontal coordinate axis and on left of a coordinate point located at a left end of the second and fourth horizontal coordinate axes, setting a coordinate point located at a right end of the first horizontal coordinate axis as a first temporary coordinate point and placing a second temporary coordinate point on right of the first temporary coordinate point, generating directed graphs respectively related to a set (1→n−1), the set (2←n), the set (lv+1←rv) and the set (lv→rv−1) by setting a given integer k, calculating an integer x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than a longest directed edge from the directed edges reaching each coordinate point on the first to fourth horizontal coordinate axes, and generating a directed graph related to the set $(1 \rightarrow n)$ by adding a directed edge with a length of 1 having a head at the first temporary coordinate point on the first horizontal coordinate axis to the directed graph related to the set $(1 \rightarrow n-1)$.

As described above, the encryption key distribution scheme using intermediate keys and set keys enables distribution of the intermediate keys and generation of the set keys based on the above-described directed graphs, thereby enabling reduction of the worst value of the amount of calculations necessary for each user (terminal unit) to generate a decryption key at the time of decrypting distributed encrypted information without increasing the number of keys to be held by each user.

Advantages of the Invention

As described in the foregoing, according to the present invention, it is possible to reduce the number of keys to be held by a terminal unit at a receiving end and the amount of calculations necessary for decryption of encrypted data.

BRIEF DESCRIPTION OF THE DRAWINGS

[FIG. 13] A comparative chart showing a comparison between the basic scheme and the key distribution scheme according to the embodiment.

DESCRIPTION OF REFERENCE NUMERALS

Figure 1:
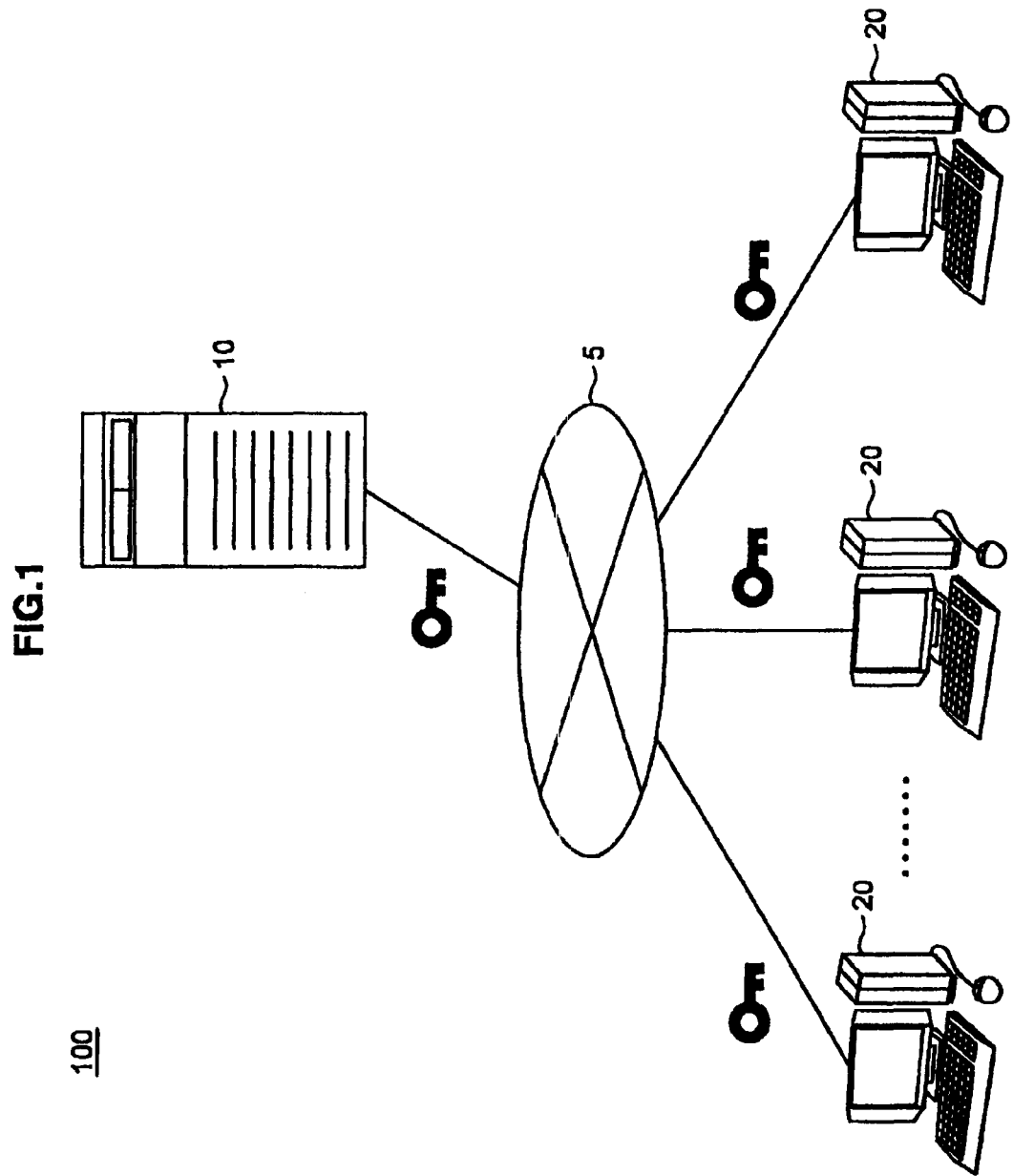
[FIG. 1] An explanatory view showing an encryption key distribution system according to one embodiment of the present invention.

5 Network
10 Key distribution server
20 Terminal device
100 Encryption key distribution system
102 Tree structure setting section
104 Coordinate axis setting section
106 Directed edge setting section
108 Inter-subtree directed edge setting section
110 Directed graph generation section
112 Initial intermediate key setting section
114 Key generation section
116 Encryption section
118 Transmission section
120 Subset determination section
124 Reception section
126 Decision section
128 Key generation section
130 Decryption section
202 Controller
204 Processing unit
206 Input/output interface
208 Secure storage section
210 Main storage section
212 Network interface
216 Media interface
218 Information media
154 Tree structure setting section
156 Coordinate axis setting section
160 Directed graph generation section
162 Initial intermediate key setting section
164 Key generation section
166 Encryption section
168 Transmission section
170 Subset determination section
174 Reception section
176 Decision section
178 Key generation section
180 Decryption section

BEST MODES FOR CARRYING OUT THE INVENTION

Hereafter, preferred embodiments of the present invention will be described in detail with reference to the appended drawings. Note that in this specification and the drawings, elements that have substantially the same functions and configurations are denoted with the same reference numerals and a repeated explanation is omitted.

[Configuration of the Encryption Key Distribution System 100]

The configuration of an encryption key distribution system 100 according to one embodiment of the present invention is described hereinafter. FIG. 1 is an explanatory view showing the configuration of the encryption key distribution system 100 according to the embodiment.

Referring to FIG. 1, the encryption key distribution system 100 includes a key distribution server 10 configured as an example of an information processing unit according to the embodiment, a plurality of terminal units 20 respectively owned by a plurality of users, and a network 5 connecting the key distribution server 10 and the terminal units 20.

The network 5 is a communications network that connects the key distribution server 10 and the terminal units 20 so as to allow two-way communication or one-way communication. The network 5 is configured by a public network such as the Internet, a telephone line network, a satellite communications network and a broadcast channel, a leased line network such as WAN (Wide Area Network), LAN (Local Area Network), IP-VPN (Internet Protocol-Virtual Private Network) and a wireless LAN or the like, for example, either wired or wireless.

The key distribution server 10 is configured by a computer unit or the like having a server function, and it can transmit various kinds of information to an external unit through the network 5. For example, the key distribution server 10 may generate an encryption key in the broadcast encryption scheme and distribute the encryption key to the terminal units 20. Further, the key distribution server 10 according to the embodiment is equipped with a function as a contents distribution server that provides contents distribution services such as a video distribution service and an electronic music distribution service, and it can distribute contents to the terminal units 20. The key distribution server 10 and the content distribution server may be configured as separate units as a matter of course.

The contents may be any contents data such as video contents composed of moving images or still images such as videos, television programs, video programs and charts, audio contents such as music, lectures and radio programs, game contents, document contents, software and so on, for example. The video contents may contain not only video data but also audio data.

The terminal unit 20 is an information processing unit capable of data communication with an external unit through the network 5, and it is owned by each user. Although the terminal unit 20 is configured by a computer unit (either a notebook type or a desktop type) such as a personal computer (which is referred to hereinafter as "PC") as shown in the figure, it is not limited thereto, and it may be configured by home information appliances such as a PDA (Personal Digital Assistant), a home video game machine, a DVD/HDD recorder and a television set, a television broadcast tuner or decoder and so on, as long as it has a communication function through the network 5. Further, the terminal unit 20 may be a portable device that can be carried by a user, such as a portable video game player, a cellular phone, a portable video/audio player, a PDA and a PHS.

The terminal unit 20 can receive various kinds of information from the key distribution server 10. For example, the terminal unit 20 can receive contents distributed from the key distribution server 10. At the time of contents distribution, the key distribution server 10 can encrypt various kinds of electronic data and distribute them. For example, the key distribution server 10 can generate a contents key for encrypting contents and distribute it. The contents key may be represented by random numbers (pseudo-random numbers) generated by a pseudo-random number generator, a given character string or sequence and so on, for example. Using the contents key, the key distribution server 10 can encrypt the contents by given encryption logic. Further, the key distribution server 10 can distribute the contents key or a decryption key corresponding to the contents key to an arbitrary terminal unit 20. On the other hand, the terminal unit 20 can decrypt the encrypted contents using the contents key or the decryption key corresponding to the contents key received from the key distribution server 10.

The pseudo-random number generator used for generating the contents key is a unit or a program capable of outputting a long-period pseudo-random number sequence by inputting a given seed value, and it is generally implemented using logic such as the linear congruential method or the Mersenne Twister method. The pseudo-random number generator applicable to the embodiment is of course not limited thereto, and pseudo-random numbers may be generated using other logic, or it may be a unit or a program capable of generating a pseudo-random number sequence containing special information or conditions.

Further, the key distribution server 10 according to the embodiment encrypts not only contents but also a contents key and distributes them. It is true that encrypting and distributing contents ensures a certain degree of security level. However, in order to flexibly deal with addition or elimination of a user who is licensed to have the authority to use contents (which is referred to hereinafter as a "licensed user") among a large number of users, a method that encrypts a contents key and distributes it is more advantageous. In such a case, in this embodiment, the key distribution server 10 first generates a plurality of set keys for encrypting and decrypting a contents key. The plurality of set keys are correlated respectively with a plurality of subsets of licensed users extracted from a large number of users, as described in detail later. Specifically, the key distribution server 10 encrypts a contents key using a set key that is set so that only a set of licensed users can decrypt the contents key and distributes the encrypted contents key to the terminal units 20 of all users. In this configuration, only the terminal unit 20 of a licensed user can decrypt the encrypted contents key and then decrypt the encrypted contents using the contents key, thereby making the contents viewable. In the case where a set of licensed users is changed, the key distribution server 10 can deal with the change by changing the set key to be used for encrypting the contents key. In order to establish the above encryption key distribution logic, it is necessary to configure the key distribution server 10 or the like so as to implement algorithms related to generation and distribution of the set key.

Hereinafter, exemplary hardware configurations of the key distribution server 10 and the terminal unit 20 according to the embodiment are described firstly. Secondly, basic technology related to the encryption key distribution logic according to the embodiment is described. Thirdly, the configurations of the key distribution server 10 and the terminal unit 20 according to the embodiment are described in detail, and differences in configurations and effects from the basic technology are described specifically. Finally, applications of the encryption key distribution system according to the embodiment are described.

[Hardware Configurations of the Key Distribution Server 10 and the Terminal Unit 20]

Figure 2:
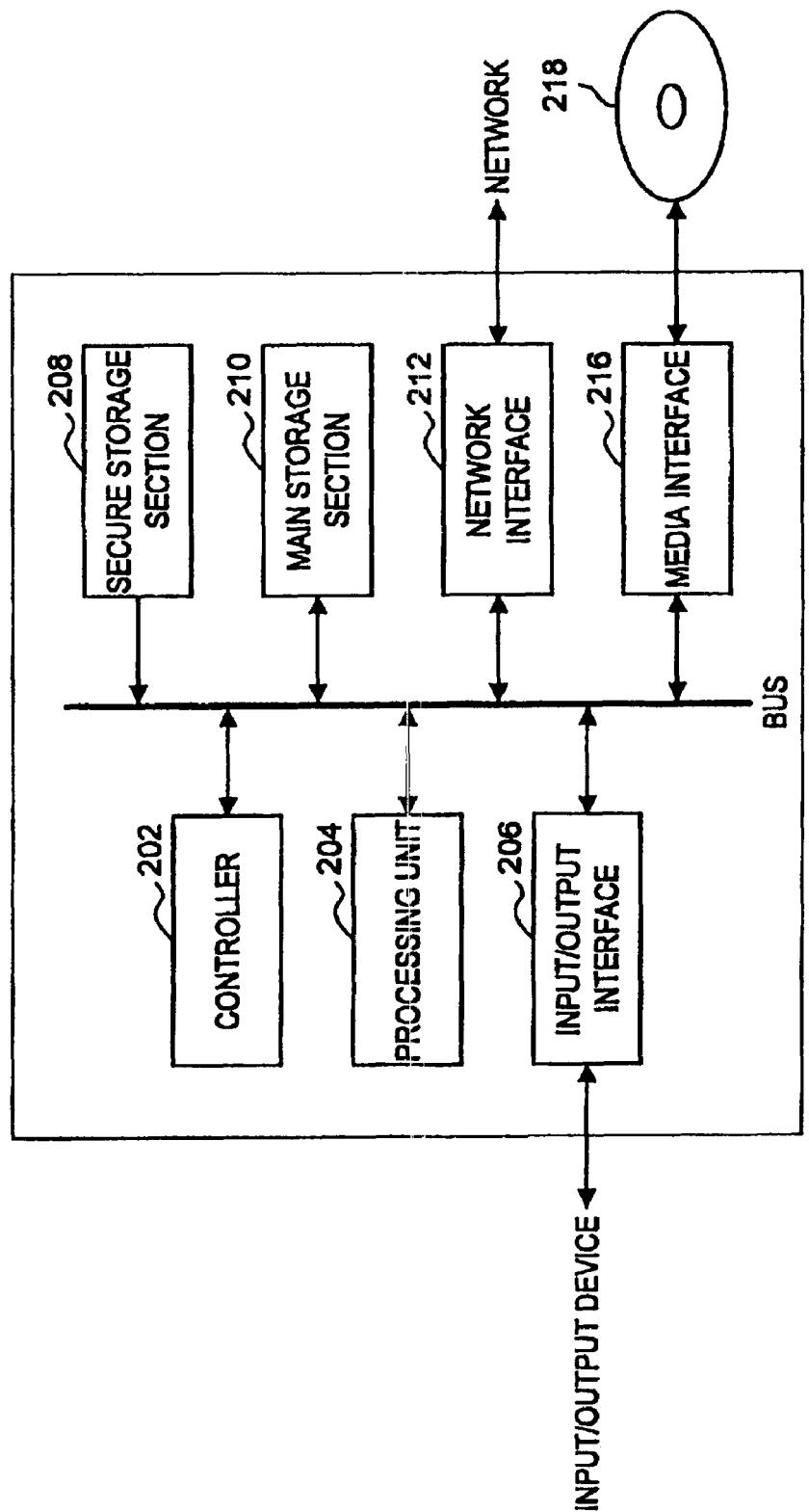
[FIG. 2] A block diagram showing a hardware configuration of a key distribution server and a terminal unit according to the embodiment.

Referring first to FIG. 2, exemplary hardware configurations of the key distribution server 10 and the terminal unit 20 according to the embodiment are described hereinafter. FIG. 2 shows an example of the hardware configuration capable of implementing the functions of the key distribution server 10 or the terminal unit 20 according to the embodiment.

The key distribution server 10 and the terminal unit 20 include a controller 202, a processing unit 204, an input/output interface 206, a secure storage section 208, a main storage section 210, a network interface 212 and a media interface 216, for example.

(Controller 202)

The controller 202 is connected to the other elements through a bus, and it mainly serves to control each section of the unit based on programs and data stored in the main storage section 210. The controller 202 may be configured by a processing unit such as a CPU (Central Processing Unit).

(Processing Unit 204 (Key Distribution Server 10))

The processing unit 204 included in the key distribution server 10 can execute encryption of contents, encryption of a contents key, generation of a set key and derivation of an intermediate key used for generating a set key, for example. Thus, the processing unit 204 can function as a pseudo-random number generator that generates pseudo-random numbers based on given data (a seed value etc.) and also encrypt contents or a contents key based on given algorithms. The given algorithms may be stored in the main storage section 210 as a program readable by the processing unit 204. Further, the given information may be stored in the main storage section 210 or the secure storage section 208. The processing unit 204 can record output results of executing the above processing in the main storage section 210 or the secure storage section 208. The processing unit 204 may be configured by a processing unit such as a CPU or formed integrally with the controller 202 described above.

(Processing Unit 204 (Terminal Unit 20))

On the other hand, the processing unit 204 included in the terminal unit 20 can execute decryption of contents, decryption of a contents key, generation of a set key and generation of an intermediate key used for generating a set key, for example. Thus, the processing unit 204 can function as a pseudo-random number generator that generates pseudo-random numbers based on given data (a seed value etc.) and also decrypt contents or a contents key based on given algorithms. The given algorithms may be stored in the main storage section 210 as a program readable by the processing unit 204. Further, the given information may be stored in the main storage section 210 or the secure storage section 208. The processing unit 204 can record output results of executing the above processing in the main storage section 210 or the secure storage section 208. The processing unit 204 may be configured by a processing unit such as a CPU or formed integrally with the controller 202 described above.

(Input/Output Interface 206)

The input/output interface 206 is mainly connected to an input device for a user to input information and an output device to output processing results or descriptions of contents. For example, the input device may be a keyboard, a mouse, a trackball, a tough pen, a keypad, a touch panel or the like, and it may be connected via wired or wireless to the input/output interface 206. In some cases, the input device may be portable electronic equipment such as a cellular phone or a PDA (Personal Digital Assistant) connected via wired or wireless. On the other hand, the output device may be a display unit such as a display, an audio output device such as a speaker or the like, for example, and it may be connected via wired or wireless to the input/output interface 206. The input/output device may be built in or integrated with the key distribution server 10 or the terminal unit 20.

The input/output interface 206 is connected to the other elements through the bus, so that it can transfer information input via the input/output interface 206 to the main storage section 210 or the like. On the contrary, the input/output interface 206 can output information stored in the main storage section 210 or the like, information input via the network interface 212 or the like, or results obtained by processing those information in the processing unit 204 and so on to the output device.

(Secure Storage Section 208)

The secure storage section 208 mainly securely stores information necessary to be concealed, such as contents keys, set keys and intermediate keys. The secure storage section 208 may be configured by a magnetic storage unit such as a hard disk, an optical storage unit such as an optical disk, a magneto-optical storage unit, a semiconductor storage unit or the like, for example. Further, the secure storage section 208 may be configured by a tamper-resistant storage unit, for example.

(Main Storage Section 210)

The main storage section 210 may store control programs for controlling the other elements, encryption programs for encrypting contents, contents keys or the like, decryption programs for decrypting encrypted contents, contents keys or the like, key generation programs for generating set keys or intermediate keys and so on, for example. Further, the main storage section 210 may temporarily or permanently store calculation results output from the processing unit 204 or store information input from the input/output interface 206, the network interface 212, the media interface 216 or the like. The main storage section 210 may be configured by a magnetic storage unit such as a hard disk, an optical storage unit such as an optical disk, a magneto-optical storage unit, a semiconductor storage unit or the like, for example. Further, the main storage section 210 may be formed integrally with the secure storage section 208.

(Network Interface 212)

The network interface 212 is connected to another communication unit or the like on the network 5, for example, and it is an interface means for transmitting and receiving information such as encrypted contents or contents keys, set keys and intermediate keys, parameter information related to encryption, and information related to a set of licensed users, for example. The network interface 212 is connected to the other elements through the bus, so that it can transfer information received from an external unit on the network 5 to the other elements or transmit information held by the other elements to an external unit on the network 5.

(Media Interface 216)

The media interface 216 is an interface for reading and writing information by removably attaching information media 218, and it is connected to the other elements through the bus. The media interface 216 can read information from the attached information media 218 and transfer it to the other elements or write information supplied from the other elements into the information media 218, for example. For example, the information media 218 may be portable storage media (removable storage media) such as an optical disk, a magnetic disk and a semiconductor memory, storage media of an information terminal connected via wired or wireless within a relatively short distance without through the network 5, or the like.

An example of the hardware configuration capable of implementing the functions of the key distribution server 10 and the terminal unit 20 according to the embodiment is described in the foregoing. Each of the above elements may be configured using general-purpose hardware or may be configured by hardware specialized to the function of each element. It is thereby possible to change the hardware configuration to use as appropriate according to the technique level when implementing the embodiment. Further, the above-described hardware configuration is merely an example, and it is not limited thereto as a matter of course. For example, the controller 202 and the processing unit 204 may be configured by the same processing unit, and the secure storage section 208 and the main storage section 210 may be configured by the same storage unit. Further, depending on use, the configuration that eliminates the media interface 216, the input/output interface 206 or the like is feasible. Hereinafter, the encryption key distribution scheme that is implemented by the key distribution server 10 and the terminal unit 20 having the above-described hardware configuration is described in detail.

[Encryption Key Distribution Scheme According to the Basic Technology]

Before providing detailed description of the encryption key distribution scheme according to the embodiment, technological matters that form the basis for implementing the embodiment are described hereinafter. The embodiment is configured so as to have more significant advantages by adding improvements to the basic technology described below. Therefore, the technique related to the improvements is a feature of the embodiment. Thus, it is noted that, although the embodiment follows the fundamental concept of the technological matters described hereinafter, the essence of the embodiment is rather integrated into the improved parts, and the configuration is clearly different, and there is also a clear distinction in advantages from the basic technology.

The encryption key distribution scheme according to the basic technology described hereinafter is referred to as a basic scheme. The basic scheme divides a set of terminal units of users to which contents are to be distributed into a plurality of subsets and then encrypts a contents key by a set key assigned to each subset and distributes it. The basic scheme provides one means for solving the problems as to which subset is to be selected, how to generate set keys and how to distribute set keys in order to reduce the traffic for encryption key distribution, the number of decryption keys to be held by each user, the amount of calculations necessary for each user to generate an decryption key and so on. The basic scheme is described hereinafter with reference to FIGS. 3 to 7.

(Setting of a Tree Structure)

In the basic scheme, a set of terminal units (users), which are targets of contents distribution, is considered as being divided into a plurality of subsets. A way of dividing into subsets according to the basic scheme is described hereinbelow with reference to FIG. 3. Although a way of dividing into subsets is not one as a matter of course, the way of dividing into subsets with use of a binary tree is employed in the basic scheme. Schematically, the basic scheme assigns a given subset to each node forming a binary tree in consideration of the positional relationship between nodes, thereby comprehensively selecting the subsets of users in given combinations, as is described in detail later. The merits of such a selection method would be more clearly understood by a specific example of the binary tree shown in FIG. 3. A method of constructing the binary tree is described hereinafter with reference to FIG. 3.

Firstly, a set that is used in the description below is defined as follows.

A set of all terminal units (users) N={1, 2, . . . , n} (n is a power of two)

For natural numbers i and j (i≦j):

$$[i, j] = \{i, i+1, i+2, \ldots, j\}$$
$$(i \to i) = (i \leftarrow i) = \{\{i\}\}$$
$$(i \to j) = \{\{i\}, \{i, i+1\}, \ldots, \{i, i+1, \ldots, j\}\}$$
$$\quad = \{[i, i], [i, i+1], [i, i+2], \ldots, [i+j]\}$$
$$(i \leftarrow j) = \{\{j\}, \{j, j-1\}, \ldots, \{j, j-1, \ldots, i\}\}$$
$$\quad = \{[j, j], [j-1, j], [j-2, j], \ldots, [i, j]\}$$

Figure 3:
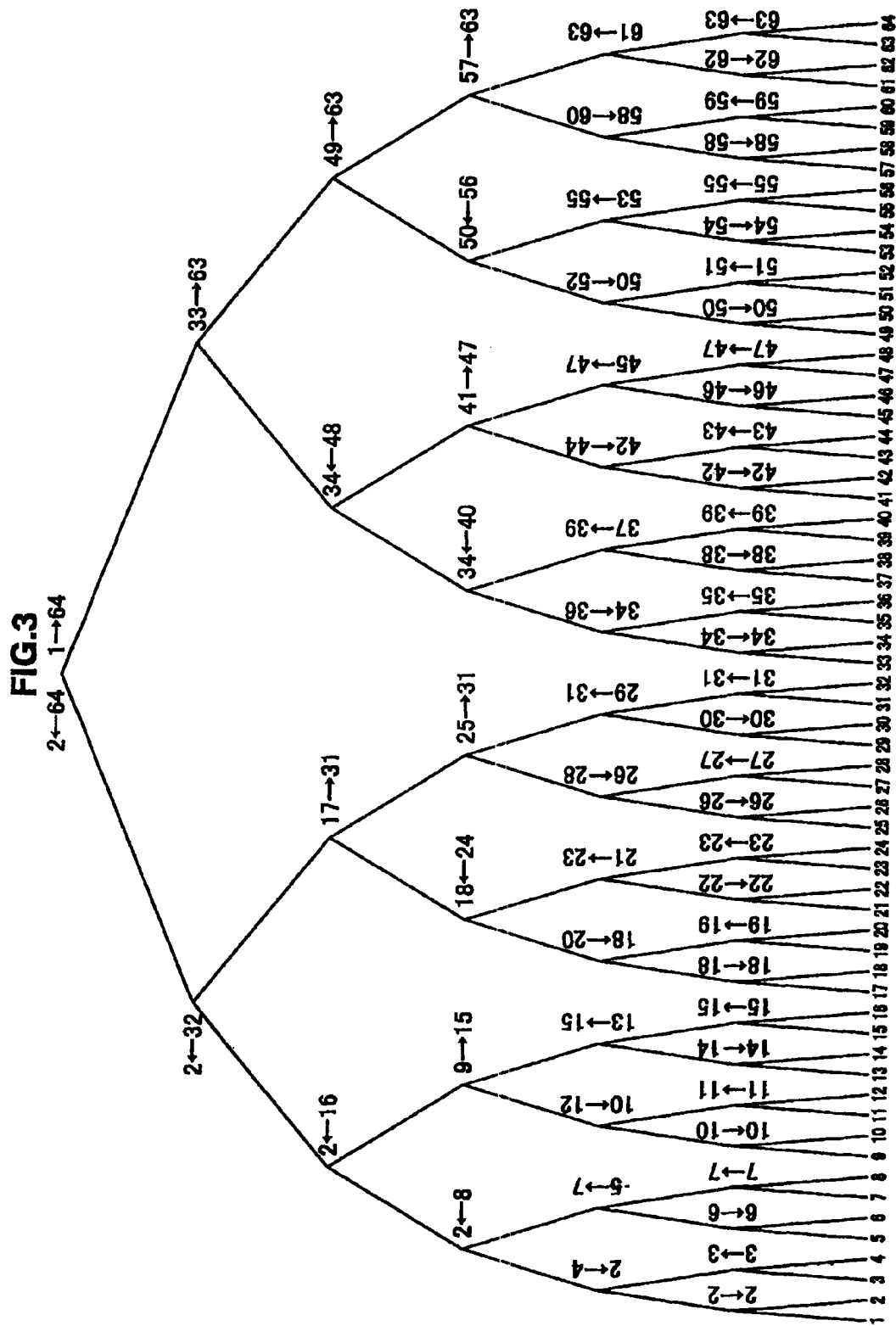
[FIG. 3] An explanatory view showing a binary tree structure according to a basic scheme.

Hereinafter, nodes located at the bottom of a binary tree (BT) are referred to as leaf nodes, a node located at the top is referred to as a root node, and nodes located between the root node and the leaf nodes are referred to as intermediate nodes. The leaf nodes correspond to the respective terminal units. Further, for convenience of the description, it is assumed hereinafter that a terminal unit and a user are in one-to-one correspondence, and the "terminal unit" correlated with the leaf node is indicated by the wording "user" in some cases. FIG. 3 shows an example where the number of leaf nodes of the BT is n=64.

First, the BT is created in such a way that the number of leaf nodes is n (=64). Then, numbers 1, 2, . . . , n are assigned to the respective leaf nodes from the left end toward the right.

Next, indexes lv and rv for regulating a subset to be assigned to a certain intermediate node v are defined. Among the leaf nodes located lower than a certain intermediate node v, the number assigned to the leftmost leaf node is defined as lv, and the number assigned to the rightmost leaf node is defined as rv. Note that, v may be sequential numbers assigned to the respective intermediate nodes. Thus, the intermediate node v indicates an intermediate node of the BT with an index of v.

Then, the intermediate nodes of the BT are defined by categorizing them into two sets. Among the intermediate nodes of the BT, a set of intermediates nodes located on the left of a parent node is defined as BTL, and a set of intermediates nodes located on the right of a parent node is defined as BTR. The parent-child relation referred to herein indicates the hierarchical relationship of the nodes connected on the BT, and it means a relationship in which the parent node is located at the upper level, and the child node is located at the lower level.

Further, the subsets of the user set correlated with the respective leaf nodes are correlated with the root node of the BT. First, the set (1→n) and the set (2←n) are correlated with the root node. Because all leaf nodes are connected at the lower level of the root node, the root node is represented by the set that comprehensively or selectively includes those leaf nodes. Specifically, the set (1→64) and the set (2←64) are correlated with the root node of FIG. 3. Consider, for example, the set (1→64). The set (1→64) includes subsets [1, 1], [1, 2], . . . , [1, 64] as its elements. For example, to represent all users (leaf nodes), the subset [1, 64] can be used, and it is included as the element of the set (1→64). Further, to represent all users except the user with the number 16, the subsets [1, 15] and [17, 64] can be used, and they are included as the elements of the set (1→64) and the set (2←64), respectively. In this manner, the combinations of the leaf nodes (users) located at the lower level of the root node can be represented by the subsets of the correlated set.

Then, the subsets of the user set are correlated with the intermediate nodes of the BT. First, a set (lv+1←rv) is correlated with the intermediate node v belonging to the above-described set BTL. On the other hand, a set (lv→rv−1) is correlated with the intermediate node v belonging to the above-described set BTR. As a matter of course, those sets are correlated with all intermediate nodes v of the BT. Referring to FIG. 3, those sets are indicated next to the respective intermediate nodes. For example, regarding the intermediate node correlated with the set (2←4), two intermediate nodes correlated respectively with the set (2←2) and the set (3→3) exist at the lower level of the intermediate node, and the leaf nodes with the number 1 to 4 are further connected thereto. When representing a combination of those leaf nodes except the one with the number 3, it can be represented by a group of subsets {[1, 1] [2, 2], [4, 4]} or {[1, 2], [4, 4]}. While the subsets [1, 1] and [1, 2] are elements of the set (1→64) correlated with the root node, the subsets [2, 2] and [4, 4] are elements of the sets (2←2) and (2←4), respectively.

In this manner, the basic scheme defines the subsets of the user set using the binary tree BT. This method enables representation of the subsets of users in various combinations. The universal set made up of those subsets is called a set system Φ and defined as the following expression (1). Thus, the following expression (1) mathematically represents the binary tree constructed by the above method.

[Expression 1]

$$\Phi = \bigcup_{v \in BTL} (lv+1 \leftarrow rv) \cup \bigcup_{v \in BTR} (lv \rightarrow rv-1) \cup (1 \rightarrow n) \cup (2 \leftarrow n) \quad (1)$$

The method of configuring the binary tree that regulates the subsets is described in the foregoing. The basic concept of the basic scheme is to set the set keys for encrypting a contents key to the respective subsets, encrypt the contents key using the respective set keys and distribute it to all users. By defining the subsets as described above, one means for categorizing combinations of users is regulated at least. Hereinafter, an algorithm for generating set keys using those subsets is described.

(Generation of Directed Graphs)

A method of generating a directed graph that represents an algorithm for generating a set key is described hereinafter with reference to FIG. 4. Prior to this, however, the relationship between a set key for encrypting a contents key and an intermediate key for generating the set key is described hereinbelow.

As briefly mentioned above, the basic scheme uses a particular pseudo-random number generator PRSG (Pseudo-random Sequence Generator) for generating set keys. When an intermediate key t(S0) which corresponds to a certain subset S0 is input, the PRSG outputs a set key k(S0) which corresponds to the subset S0 and intermediate keys t(S1), t(S2), . . . , t(Sk) which correspond to the subsets S1, S2, . . . , Sk relevant to the subset S0. The sets S0 and S1, S2, . . . , Sk are, of course, any of the subsets constituting the set system Φ. Thus, the PRSG is a key generation unit. A feature of the basic scheme is the logic that regulates the relationship between inputs and outputs of the PRSG. The directed graph that regulates the relationship between the set S0 and the sets S1, S2, . . . , Sk is described hereinafter.

The symbols used for the following description are defined as follows:

| | |
|---|---|
| Intermediate key corresponding to a subset Si | t(Si) |
| Set key corresponding to a subset Si | k(Si) |

-continued

| | |
|---|---|
| Contents key | mek |
| Pseudo-random number generator | PRSG |

(Note that an input of t(S0) is expressed as PRSG(t(S0)). On the other hand, an output from the PRSG is expressed as t(S1)∥ . . . ∥t(Sk)∥k(S0)→PRSG(t(S0)))

| | |
|---|---|
| Directed graph | H |
| Directed edge | E |
| Directed path | V |

(Note that a directed graph corresponding to the set (i←j) is expressed as H(i←j))

First, a parameter k (k is a natural number) is determined. For simplification, it is assumed to be k∥log(n) (hereinafter, the base of log is two) in this example. Because the parameter k eventually affects the number of intermediate keys to be held by the terminal unit 20 and the amount of calculations necessary for generating the set key, it should be set appropriately according to the situation. In FIG. 4, k=6 is set, for example.

Next, a specific way of drawing the directed graph is described hereinbelow. Firstly, the directed graph H(lv→rv−1) which corresponds to the intermediate node v belonging to BTR is described by way of illustration.

(S1) Set a horizontal coordinate axis for constructing the directed graph H(lv→rv−1). On the horizontal coordinate axis, the subsets S1 forming the elements of the set (lv→rv−1) are assigned as coordinate points. The subsets Si forming the coordinate points are arranged in such a way that the degree of inclusion becomes larger from left to right. For instance, to take the directed graph H(5→7)=H({[5, 5], [5, 6], [5, 7]}) as an example, the coordinate axis has three coordinate points to which the subsets [5, 5], [5, 6], [5, 7] are assigned sequentially from the left.

If a vertical line at which a starting point of the rightward directed graph H on a first horizontal coordinate axis is located is x, an intersection point of the directed graph H and a vertical line y represents [x, y], and if a vertical line at which a starting point of the leftward directed graph H on a second horizontal coordinate axis is located is z, an intersection point of the directed graph H and the vertical line y represents [y, z].

After that, a temporary coordinate point to serve as a starting point is placed on the left of the coordinate point located leftmost on the coordinate axis and set as the starting point, and a temporary coordinate point to serve as an end point is placed on the right of the coordinate point located rightmost on the coordinate axis and set as the end point. In the coordinate axis set in this manner, a length Lv from the temporary coordinate point at the left end (starting point) to the temporary coordinate point at the right end (end point) is Lv=rv−lv+1.

(S2) Set a directed edge constituting the directed graph H(lv→rv−1).

(S2-1) Calculate an integer x satisfying $n^{(x-1)/k} < Lv \leq n^{x/k}$. The integer x satisfies $1 \leq x \leq k$.

(S2-2) Perform the following operations by changing a counter i from 0 to x−1. Starting from the starting point at the left end of the horizontal coordinate axis, repeat setting of a rightward directed edge extending to a coordinate point that is $n^{i/k}$ (i=0 to x−1) apart from the coordinate point (jump to a coordinate point that is $n^{i/k}$ apart from the coordinate point) until the head of the directed edge reaches the end point at the right end of the horizontal coordinate axis or the head of the directed edge to be set next exceeds the end point.

(S3) Delete all directed edges whose tails or heads are at the temporary coordinate points.

(S4) If there are a plurality of directed edges reaching a certain coordinate point, leave the longest directed edge only and delete all the directed edges other than the longest directed edge.

After the above steps (S1) to (S4) are executed, the directed graph H(lv→rv−1) is completed. For example, referring to the directed graph H(33→63) located on the right side at the third level from the top of FIG. 4 as an example, the substance of the directed graph H(33→63) is a group of lines composed of directed edges being arched curved line and straight lines connected to one end of the arched curved lines and extending in the horizontal direction. Further, the curved lines and the straight lines constituting the directed graph H(33→63) are directed edges. An intersection point between the end of the directed edge and the vertical line is a coordinate point. Although the horizontal coordinate axis is not clearly shown in FIG. 4, the horizontal coordinate axis is composed of a group of intersection points between the vertical lines and the ends of the directed edges. Further, an outline arrow is depicted above the directed graph H(33→63), and it indicates the direction of the directed edge. Specifically, it indicates that all of the directed edges forming the directed graph H(33→63) are rightward.

In the same manner as the directed graph H(lv→rv−1), the directed graph H(lv+1←rv) correlated with the intermediate node v belonging to BTL and the directed graphs H(1→n) and H(2←n) correlated with the root node are set. It is noted that when setting the coordinate axis of the directed graph H(lv+1←rv) and H(2←n), the subsets Si are arranged on the horizontal coordinate axis in such a way that the degree of inclusion becomes larger from right to left, so that the direction of the directed edges is leftward. Further, the directed graph H(1→n) is generated by adding the directed edge E([1, n−1], [1, n]) to the directed graph H(1→n−1). On the other hand, the directed graph H(2←n) is set by the same method as the directed graph H(lv+1←rv).

Additional explanation is provided hereinafter, taking the directed graph H(1→64) of FIG. 4 as an example. First, in the horizontal coordinate axis of the directed graph H(1→64), the leftmost coordinate point (the intersection point with the vertical line 1) is [1, 1]={1}, the coordinate point adjacent on the right (the intersection point with the vertical line 2) is [1, 2]={1, 2}, and the coordinate point further adjacent on the right is [1, 3]={1, 2, 3}. Further, the arrow immediately above or below each directed graph indicates the direction of all the directed edges forming the directed graph H. For example, the directed graph H(1→64) has a directed edge from the coordinate point [1, 1] to [1, 2] and two directed edges extending from the coordinate point [1, 2] to [1, 3] and [1, 4]. Further, the black circles depicted at the bottom of FIG. 4 indicate the directed graph H(2→2), H(3→3), . . . , H(63→63), respectively, from the left.

A method of configuring the directed graph H is described in the foregoing. FIG. 4 shows a result of drawing the directed graphs H corresponding to the intermediate nodes and the root node of BT by the above-described method. This example is the case where n=64 and k=6. The logic that generates set keys using the directed graphs H is described hereinbelow.

(Generation of Set Keys)

As described earlier, the basic scheme encrypts the contents key mek using the set key k(Si) assigned to each subset Si constituting the above set system Φ and distributes it. Thus, each coordinate point of the directed graph H described above corresponds to the subset Si composed of one or more users, and the set key k(Si) is assigned thereto. Further, the intermediate key t(Si) is also assigned to each subset Si described above and used for generating the set key k(Si).

Incidentally, because the number of repetitions in the processing of the step (S2-2) at the time of the directed graph H generation described above is x where the $1 \leq x \leq k$, the maximum k-number of directed edges originate from each coordinate point of the directed graph H. The subsets of coordinate points as the destination of one or more than one directed edges originating from a certain coordinate point (subset S0) are S1, S2, . . . , Sk in the order of closeness to the certain coordinate point (in the order of the length of the directed edge). Note that, if the number of directed edges originating from the coordinate point (subset S0) is q (q<k), Sq+1, Sq+2, . . . , Sk are treated as dummy and not actually used.

The basic scheme uses the above-described PRSG that outputs $(k+1)\lambda$-bit output in response to $\lambda$-bit input. If the intermediate key t(S0) corresponding to a certain coordinate point (subset S0) is input, the PRSG outputs the intermediate keys t(S1), t(S2), . . . , t(Sk) corresponding to the coordinate points (subsets S1, S2, . . . , Sk) at the heads of the directed edges whose tails are at the certain coordinate point and the set key k(S0) for the subset S0. Thus, t(S1) $\|$ . . . $\|$t(Sk) $\|$k(S0)←PRSG (t(S0)). By delimiting the output of the PRSG into $\lambda$ bits each from the left, the intermediate keys t(S1), t(S2), . . . , t(Sk) and the set key k(S0) are obtained.

Figure 4:
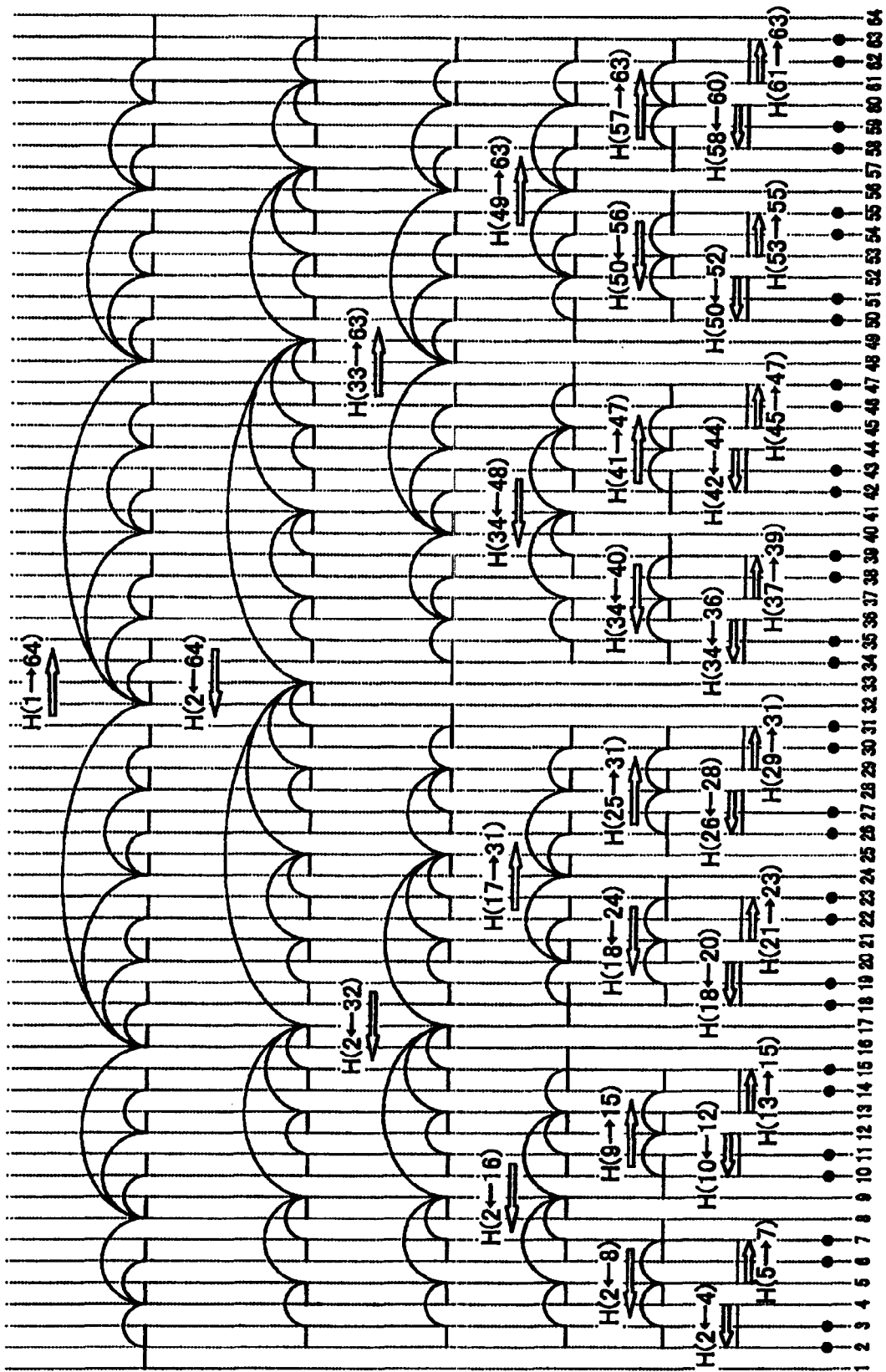
[FIG. 4] An explanatory view showing a directed graph according to the basic scheme.

For example, referring to the directed graph H(1→64) of FIG. 4 and focusing attention on the coordinate point (subset S0)=[1, 8] (the eighth coordinate point from the left end), four directed edges originate from the coordinate point S0, with their heads at S1=[1, 9], S2=[1, 10], S3=[1, 12] and S4=[1, 16]. Therefore, if the intermediate key t(S0) is input to the PRSG, k(S0), t(S1), t(S2), t(S3) and t(S4) can be obtained. Further, if the obtained t(S4) is input to the PRSG, k(S4) and t(S11), t(S12), t(S13), t(S14) and t(S15) corresponding to S11=[1, 17], S12=[1, 18], S13=[1, 20], S14=[1, 24] and S15=[1, 32] can be obtained. In this manner, it is possible to calculate a plurality of set keys k(Si) by repeatedly using the PRSG.

As is easily inferred from the above example, with a certain intermediate key, it is possible to derive the intermediate keys corresponding to the coordinate points reachable by the chain of the directed edges extending from the coordinate point corresponding to the certain intermediate key and the set key by the repeated use of the PRSG. Accordingly, each user only needs to hold the minimum number of intermediate keys which can derive all the intermediate keys corresponding to the subset in which the user is included. On the other hand, if a key distribution server that generates a set key for encrypting a contents key holds at least the intermediate key corresponding to the initial coordinate point of each directed graph H, it can derive the set keys corresponding to the other coordinate points of the directed graph by repeatedly performing the processing using the PRSG.

Thus, an administrator of a key distribution system sets $\lambda$-bit random numbers, for example, as the intermediate key for the initial coordinate point (root) of each directed graph H in a key distribution server, upon setup of the key distribution system. The initial coordinate point (root) of the directed graph H is a coordinate point where a directed edge originates but no directed edge reaches. For example, the initial coordinate point of the directed graph H(1→64) in FIG. 4 is the coordinate point [1, 1] at the left end of the horizontal coordinate axis.

The intermediate key is used for the purpose of enhancing security. In the case where there is a need to reduce the amount of processing for set key generation while there is no particular need to focus on the security, it is feasible to calculate another set key directly from a certain set key without using the intermediate key. For example, in the above example, the output when inputting the set key k(S0) for the subset S0 to the PRSG may be k(S1), k(S2), k(S3) and k(S4), which serve as the set keys for the respective subsets S1 to S4.

A method of generating the set keys is described above. The above-described set key generation method is used not only in the key generation server at the transmitting end of the contents key but also in the terminal unit at the receiving end.

(Distribution of Intermediate Keys)

Distribution of intermediate keys from the key distribution server to the terminal unit of each user is described hereinafter. As briefly mentioned earlier, it is necessary to provide the terminal unit of each user with a plurality of intermediate keys that enable derivation of set keys corresponding to all subsets in which the terminal unit of the user is included. It should be, of course, avoided to provide an intermediate key that enables derivation of a set key corresponding to a subset where the terminal unit of the user is not included, and it is preferred that the number of provided intermediate keys is minimum in terms of the efficiency of memory capacity.

In light of this, a distributor of intermediate keys extracts all the directed graphs H having the subset to which the terminal unit of a user u belongs (which is also referred to hereinafter as the "subset to which a user u belongs" or "subset in which a user u is included") as an element. Then, if the user u is included in the subset corresponding to the initial coordinate point (root) of the directed graph H, the distributor provides the terminal unit of the user u with only the intermediate key corresponding to the initial coordinate point. On the other hand, if the user u belongs to any of the subsets corresponding to the coordinate points different from the initial coordinate point of the directed graph H, the distributor finds the subset S0 such that the user u is included in the subset S0 but is not included in the subset parent (S0) which is the parent of the subset S0 and provides the terminal unit of the user u with the intermediate key t(S0) for the subset S0. In other words, if a plurality of coordinate points different from the initial coordinate point and corresponding to the subset to which the user u is included exist in the directed graph H, the distributor extracts the coordinate point S0 such that the user u is not included in the subset parent (S0) corresponding to the tail of the directed edge reaching the coordinate point corresponding to the subset S0 from those coordinate points, and provides the terminal unit of the user u with the intermediate key t(S0) for the coordinate point (S0). If there are a plurality of such coordinate points S0, the intermediate keys t(S0) for the respective coordinate points are provided. The parent-child relation of the coordinate points is determined by the directed edge, and the coordinate point at the tail of the directed edge serves as the parent of the coordinate point at the head, and the coordinate point at the head of the directed edge serves as the child of the coordinate point at the tail. Hereinafter, the coordinate point parent(S0) at the tail of the directed edge reaching a certain coordinate point S0 is referred to as the parent coordinate point. If a certain coordinate point S0 is the starting point of the directed graph H, no parent coordinate point exists, and if it is not the starting point of the directed graph H, only one parent coordinate point exists. In one directed graph H, there may be a plurality of coordinate points such that the user u is included in the subset corresponding thereto but the user u is not included in the subset corresponding to its parent coordinate point in some cases.

The distribution method of the intermediate key is described hereinafter specifically with reference to the example of FIG. 4.

EXAMPLE 1

Consider the intermediate key that is distributed to a user 1. First, as a result of searching for the directed graph H having the subset to which the user 1 belongs as the element, only the directed graph H(1→64) is found. The user 1 belongs to the subset [1, 1] which is the initial coordinate point of the directed graph H(1→64). Thus, the user 1 is provided with the intermediate key t([1, 1]) only.

EXAMPLE 2

Consider the intermediate key that is distributed to a user 3. First, as a result of searching for the directed graph H having the subset to which the user 3 belongs as the element, the directed graphs H(1→64), H(2←64), H(2←32), H(2←16), H(2←8), H(2←4) and H(3→3) are found. Looking into the directed graph H(1→64), the user 3 does not belong to the subset [1, 1] at the initial coordinate point but belongs to the subsets [1, 3], [1, 4], . . . , [1, 64] at the third and subsequent coordinate points. Among those coordinate points, the coordinate points whose parent coordinate points do not include the user 3 are [1, 3] and [1, 4] only. Specifically, the user 3 is not included in the coordinate point [1, 2], which is the parent coordinate point parent ([1, 3]) and parent ([1, 4]) of the coordinate points [1, 3] and [1, 4] including the user 3. Therefore, t([1, 3]) and t([1, 4]) are provided to the user 3 as the intermediate keys corresponding to the directed graph H(1→64). In the same manner, the corresponding intermediate keys are selected for the other directed graphs H(24←64), H(24←32), H(24←16), H(24←8), H(24←4) and H(3→3) and provided to the user 3. Consequently, the user 3 is provided with the total eight intermediate keys.

Figure 5:
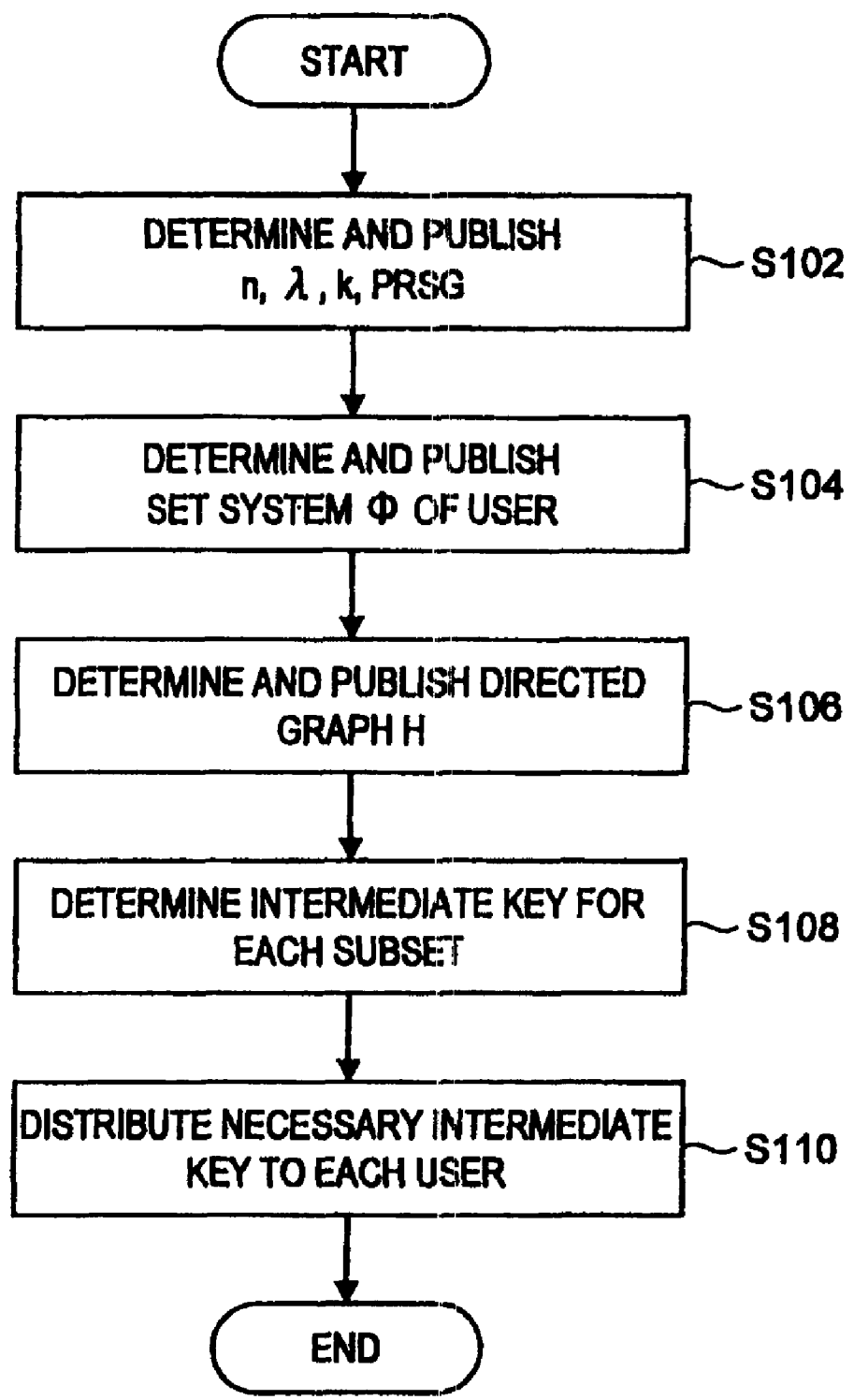
[FIG. 5] A flowchart showing a directed graph calculation method according to the basic scheme.

The processing until distributing the intermediate keys to the terminal unit of each user is briefly summarized with reference to FIG. 5. FIG. 5 is a flowchart showing the process flow for the intermediate key distribution in the key distribution server upon system setup.

As shown in FIG. 5, the key distribution server of the key distribution system first sets parameters and so on. For example, the key distribution server determines the number n of users, the number λ of bits of the set key and the intermediate key, a given parameter k, a pseudo-random number generation algorithm by PRSG and so on and publishes them to the terminal units of all users (S102). Next, the key distribution server divides a set of users into given subsets and then determines and publishes the set system Φ (cf. the above expression (1)) represented by the union (S104). Then, the key distribution server determines and publishes the directed graphs H and the directed edges T forming the respective directed graphs H (S106). Further, the key distribution server determines the intermediate keys corresponding to the respective subsets constituting the set system Φ (S108). After that, the key distribution server distributes the necessary intermediate keys to the terminal unit 20 of each user, so that each user can derive the set key corresponding to the subset that includes the user (S110).

The distribution method of the intermediate keys is described in the foregoing. If the above distribution method is used, the minimum number of intermediate keys necessary for the terminal unit of each licensed user to generate the set keys is distributed, thereby enabling reduction of the traffic between the key distribution server and the terminal unit and the memory capacity for the intermediate keys in the terminal unit of each user.

(Distribution of Contents Keys)

A method of distributing the encrypted contents key mek by the key distribution server is described hereinafter. First, the key distribution server encrypts the contents key mek using the set key that can be generated by the terminal unit 20 of a licensed user only. Specifically, the key distribution server determines a set R of the terminal units of users to be excluded (hereinafter referred to as excluded users) and then determines a set N\R of the terminal units of licensed users (hereinafter referred to as the "set (N\R) of licensed users") by excluding the set R of the terminal units of excluded users (hereinafter referred to as the "set (R) of excluded users") from the set N of the terminal units 1 to n of all users. Then, the set of licensed users (N\R)=S1∪S2∪ . . . ∪Sm is represented by the union of the subsets S1 (i=1, 2, . . . , m) selected from the subsets constituting the set system Φ. Although there are a large number of combinations of the subsets Si, the subset Si with the minimum value of m is selected. After selecting the subset Si in this manner, the key distribution server encrypts the contents key mek using the set key k(Si) corresponding to each subset Si. Specifically, the contents key mek is encrypted by the set key k(S1), k(S2), . . . , k(Sm) and becomes the m-number of encrypted contents keys mek. Then, the m-number of encrypted contents keys mek are distributed to the terminal units 1 to n of all users. At this time, the information indicating the set (N\R) of licensed users or the information indicating the m-number of subsets S1 are also distributed to the terminal units 1 to n of all users.

Figure 6:
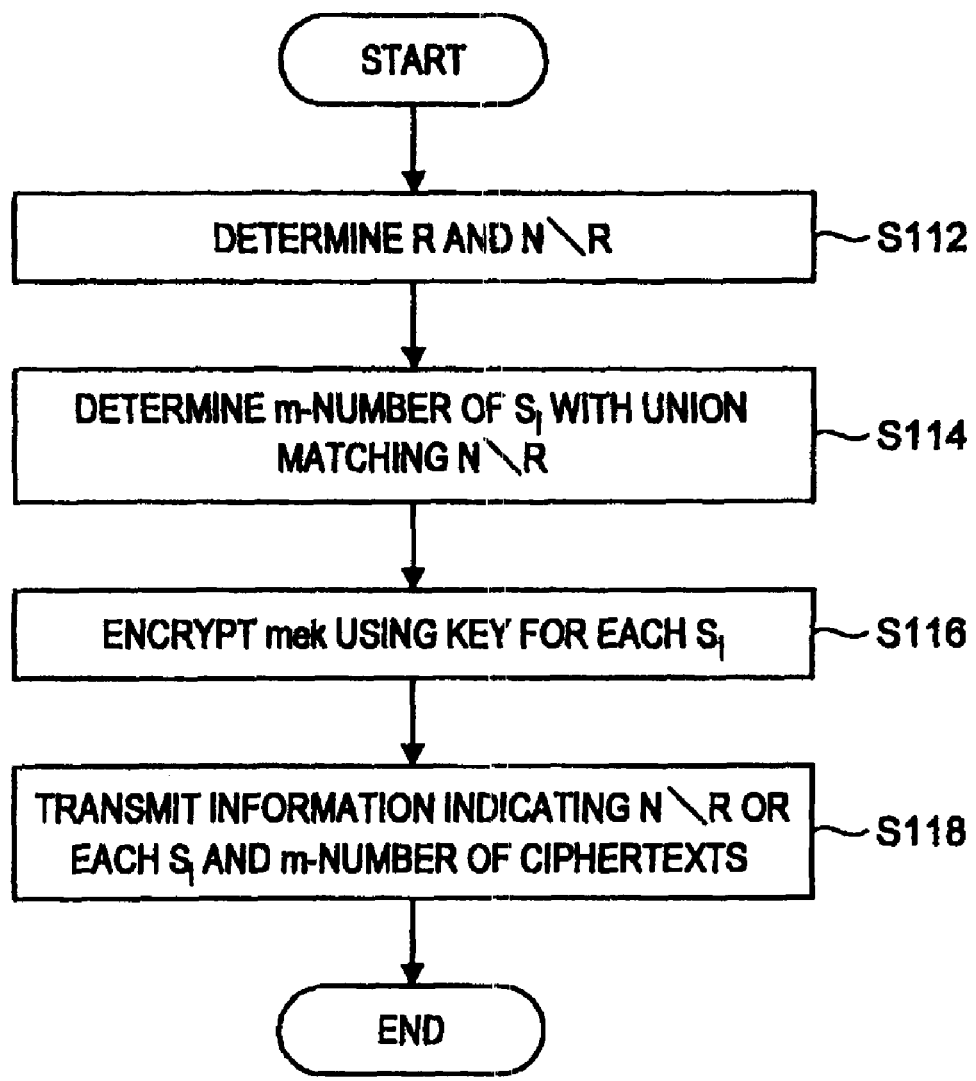
[FIG. 6] A flowchart showing a distribution method of a contents key according to the basic scheme.

The process flow for the distribution of the encrypted contents key mek is briefly summarized with reference to FIG. 6. FIG. 6 is a flowchart showing the process flow for the distribution of the contents key.

As shown in FIG. 6, the key distribution server first determines the set (R) of excluded users and obtains the set (N\R) of licensed users (S112). Next, the key distribution server selects the m-number of subsets S1 (i=1, 2, . . . , m) having the union of N\R from the subsets constituting the set system Φ in such a way that the value of m is minimum (S114). Then, the key distribution server encrypts the contents key mek using the set keys k(Si) corresponding respectively to the selected subsets Si (S116). Further, the key distribution server distributes the information indicating the set (N\R) of licensed users or the respective subsets Si and the m-number of encrypted contents keys mek to the terminal units 1 to n of all users (S118).

The encryption method and the distribution method of the contents key mek are described in the foregoing. If the above encryption method is used, the subsets Si are selected efficiently so that the number of set keys is the minimum necessary. Because the contents key mek is thereby encrypted using the minimum necessary number of set keys, it is possible to save the amount of calculations necessary for encryption and also reduce the number of encrypted contents keys mek to be distributed, thereby reducing the traffic.

(Decryption of Contents Keys)

Decryption processing of the encrypted contents key in the terminal unit of each user is described hereinafter. The decryption processing is such that the terminal unit obtains the contents key mek based on the information indicating the set (N\R) of licensed users or the m-number of subsets Si and the m-number of ciphertexts received from the key distribution server.

The terminal unit receives the encrypted contents key and the information indicating the set (N\R) of licensed users or the information indicating the m-number of subsets Si from the key distribution server. Further, the terminal unit analyzes the information and decides whether it belongs to any of the m-number of subsets Si. If the terminal unit does not belong to any of the subsets, it ends the decryption processing because it is the terminal unit of an excluded user. On the other hand, if the terminal unit finds the subset Si to which it belongs, it derives the set key k(Si) corresponding to the subset Si using the above-described PRSG. The configuration of the PRSG is as described earlier.

In this step, if the terminal unit is provided with the intermediate key t(Si) corresponding to the above subset Si from the key distribution server in advance upon system setup and holds it beforehand, it can derive the set key k(Si) corresponding to the above subset Si by inputting the intermediate key t(Si) to the PRSG. On the other hand, if the terminal unit does not hold the relevant intermediate key t(Si), the terminal unit can derive a desired set key k(Si) by repeatedly inputting the held intermediate key to the PRSG. Further, the terminal unit decrypts the encrypted contents key mek using the set key k(Si) derived in this manner.

Derivation of the above-described set key k(Si) in the terminal unit is specifically described with reference to the example of FIG. 4. In the terminal unit of the user 3, it is assumed that "1, 8" is selected as the subset to which it belongs. The terminal unit of the user 3 holds the intermediate key for the subset [1, 4] as described above. Referring to the directed graph H(1→64) of FIG. 4, the directed edge extending from the coordinate point [1, 4] to the coordinate point [1, 8] is set, and this directed edge has the third shortest length (jump distance) among the directed edges whose tails are at the coordinate point [1, 4]. Thus, among the outputs when inputting the intermediate key t([1, 4]) for the subset [1, 4] to the PRSG, the third λ-bit portion from the top is the intermediate key t([1, 8]) for the subset [1, 8]. The terminal unit extracts the intermediate key t([1, 8]) from the output of the PRSG, inputs it again to the PRSG and extracts the final λ-bit portion, thereby obtaining the desired set key k([1, 8]).

Likewise, in the terminal unit of the user 1, it is assumed that "1, 8" is selected as the subset to which it belongs. The terminal unit of the user 1 holds the intermediate key for the subset [1, 1]. In such a case, the terminal unit 20 can obtain a desired set key k([1, 8]) by extracting the first λ-bit portion from the top (which corresponds to the intermediate key t([1, 2]) from the outputs when inputting the intermediate key t([1, 1]) for the subset [1, 1] to the PRSG, then extracting the second λ-bit portion from the top (which corresponds to the intermediate key t([1, 4]) from the outputs when inputting the intermediate key t([1, 2]) to the PRSG, further extracting the third λ-bit portion from the top (which corresponds to the intermediate key t([1, 8]) from the outputs when inputting the intermediate key t([1, 4]) to the PRSG, and finally extracting the final portion (which corresponds to the set key k([1, 8]) from the outputs when inputting the intermediate key t([1, 8]) to the PRSG.

Figure 7:
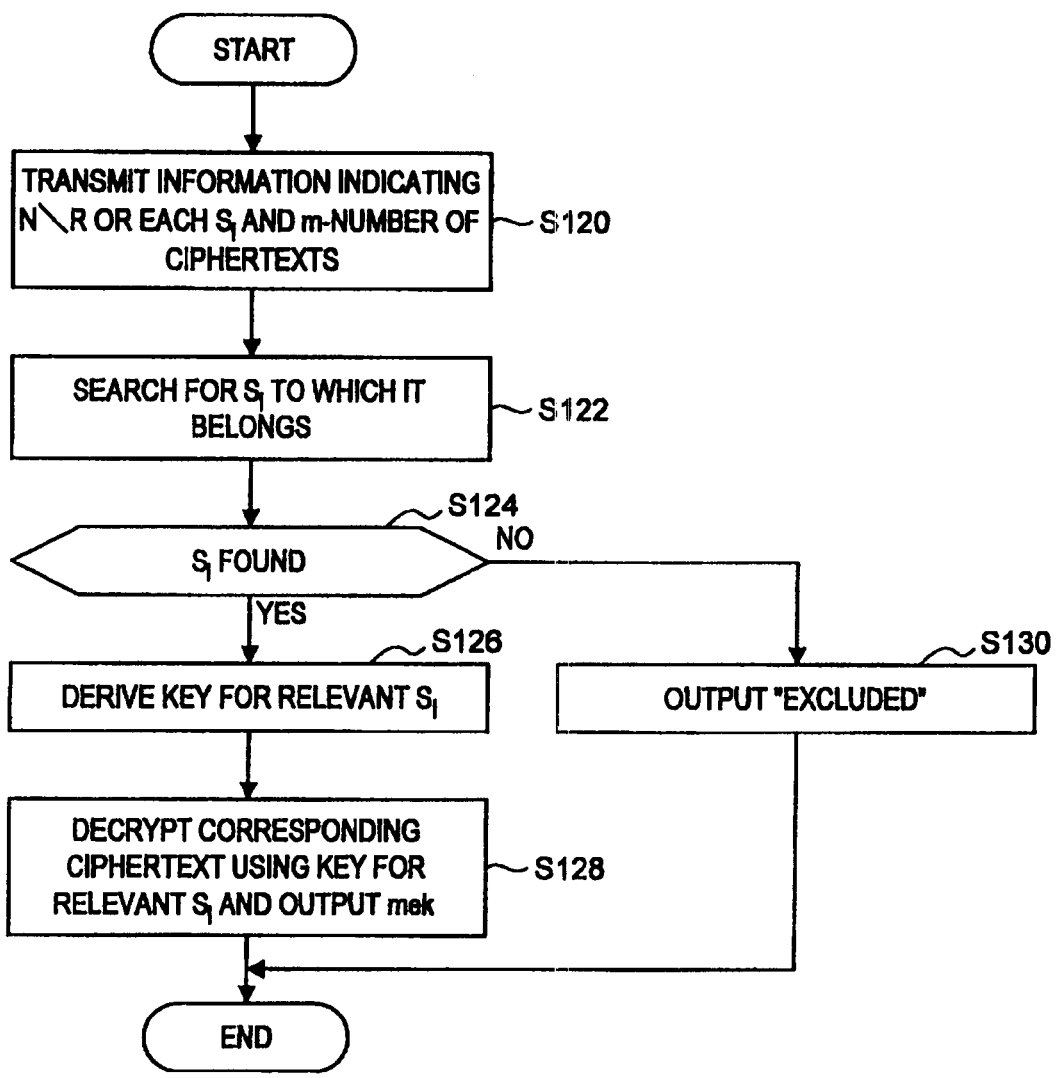
[FIG. 7] A flowchart showing a set key generation method according to the basic scheme.

The process flow for decrypting the encrypted contents key mek in the terminal unit of each user is summarized with reference to FIG. 7. FIG. 7 is a flow chart showing the key generation process flow for the decryption of the contents key in the terminal unit of each user.

As shown in FIG. 7, the terminal unit of each user first receives the m-number of encrypted contents keys mek and the information indicating the set (N\R) of licensed users or the information indicating the m-number of subsets Si (i=1, 2, . . . , m) from the key distribution server (S120). Next, the terminal unit searches for the subset Si to which it belongs based on the information (S122) and decides whether it belongs to any of the m-number of subsets Si (Step S124).

As a result, if the terminal unit finds the subset Si to which it belongs, it derives the set key k(Si) corresponding to the subset Si using the above PRSG (S126). The configuration of the PRSG is as described earlier. If the terminal unit is provided with the intermediate key t(Si) corresponding to the subset Si by the key distribution server upon setup and holds it beforehand, it can derive the set key k(Si) by using the PRSG once. On the other hand, if the terminal unit does not hold the relevant intermediate key t(Si), it can derive the desired set key k(Si) by using the PRSG repeatedly. After that, the terminal unit decrypts the encrypted contents key mek using the set key k(Si) derived in this way (S128).

On the other hand, if the terminal unit decides in the step S124 that it does not belong to any of the subsets Si, the terminal unit displays and outputs that it is excluded from the terminal unit allowed to access the contents (i.e. it is an excluded user) (S130) and ends the decryption processing of the contents key.

The decryption method of the contents key in the terminal unit is described in the foregoing. The above decryption scheme is executed based on the information about the directed graph H with use of the PRSG for generating the intermediate key and the set key. Thus, the information about the directed graph and the PRSG are necessary in the terminal unit of each user as well. However, the method of using the PRSG enables minimization of the number of intermediate keys to be held by the terminal unit of each user.

The encryption key distribution scheme according to the basic technology of the embodiment is described in the foregoing. With the use of the basic scheme, the number of intermediate keys to be held by the terminal unit of each user is $O(k*\log(n))$, and the amount of calculations (the number of times of operations of the PRSG) necessary for generation of the set key does not exceed $(2k-1)*(n^{1/k}-1)$. However, the encryption key distribution scheme according to the basic technology has a problem that the number of intermediate keys to be held by the terminal unit of each user is still large as shown in FIG. 13(A) described later.

Further, the dominant of the amount of calculations necessary for the terminal unit when decrypting the encrypted contents key mek depends on the number of times to execute the PRSG for deriving a desired intermediate key. The worst value is represented by the number of directed edges (i.e. the number of jumps) from the initial coordinate point (root) to the farthest final coordinate point (the leaf from which no directed edge originates) in the directed graph H. In the example shown in FIG. 4, in order to reach the final coordinate point [1, 64] from the initial coordinate point [1, 1] of the directed graph $H(1 \to 64)$, it is necessary to go through eleven directed edges (execute eleven times of jumps), which means to, execute the PRSG as many as eleven times. Thus, the encryption key distribution scheme according to the basic technology has another problem that the number of execution times of the PRSG is large and thus the amount of calculations for deriving the intermediate key is large.

<First Embodiment>

The inventors of the present invention have conducted extensive studies for solving the above problems and developed an encryption key distribution scheme according to an embodiment (first embodiment) of the present invention as described hereinbelow. The encryption key distribution scheme according to the embodiment divides a large binary tree BT representing the terminal units of all users into a plurality of small base subtrees to create a hierarchical structure, and uses the key derivation method of the above basic scheme for each base subtree and sets a directed edge between the base subtrees. This enables reduction of both the number of intermediate keys held by the terminal unit 20 and the amount of calculations in the terminal unit 20. Hereinafter, the functional configurations of the key distribution server 10 and the terminal unit 20 that implement the encryption key distribution scheme according to the embodiment, and features and advantages of the encryption key distribution scheme are described in detail.

[Configuration of the Key Distribution Server 10]

Figure 8:
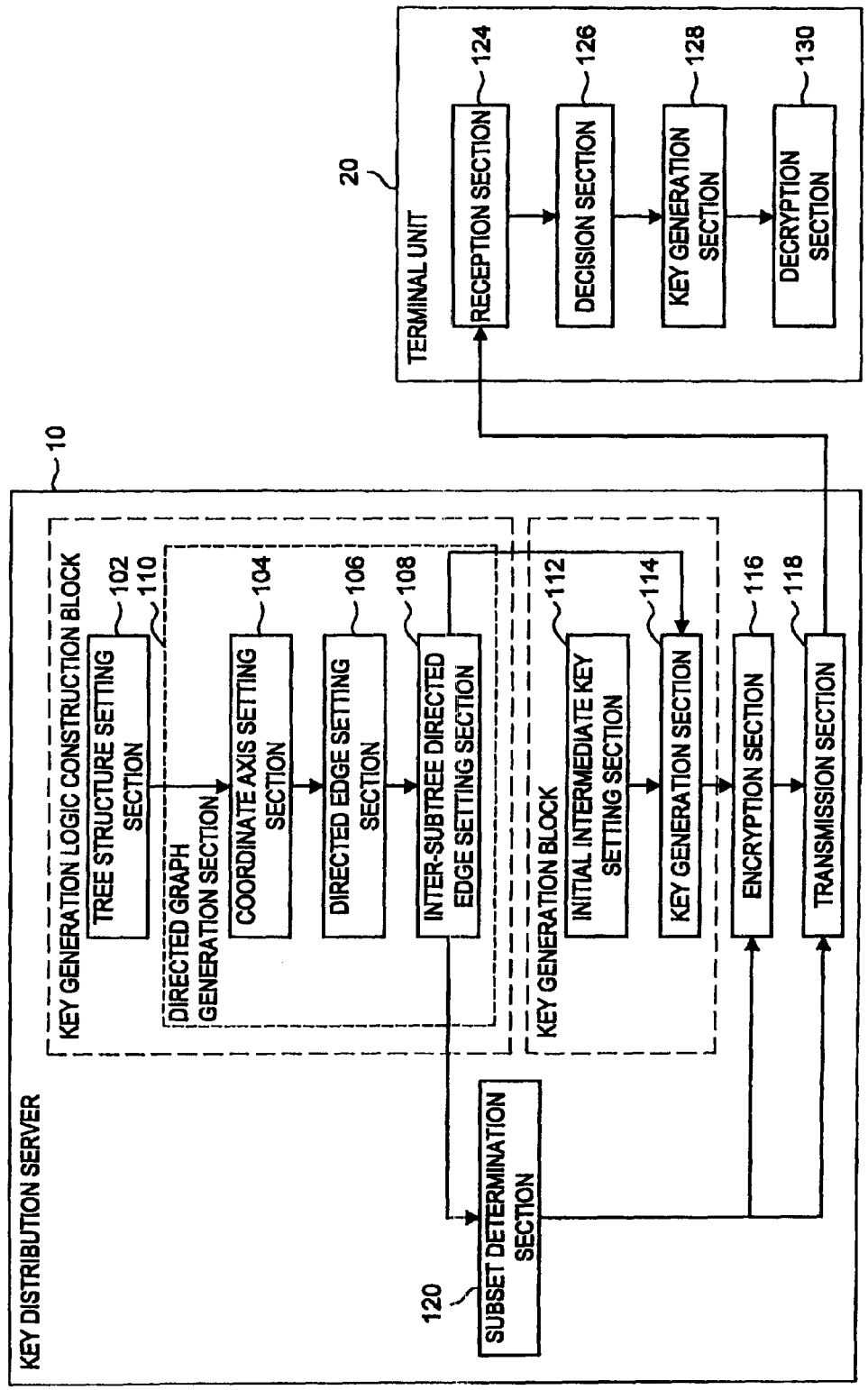
[FIG. 8] A block diagram showing functional configurations of a key distribution server and a terminal unit according to a first embodiment of the present invention.

The functional configuration of the key distribution server 10 according to the embodiment is described hereinafter in detail with reference to FIG. 8. FIG. 8 is a block diagram showing the functional configurations of the key distribution server 10 and the terminal unit 20 according to the embodiment.

As shown in FIG. 8, the key distribution server 10 includes a tree structure setting section 102, a coordinate axis setting section 104, a directed edge setting section 106, an inter-subtree directed edge setting section 108, an initial intermediate key setting section 112, a key generation section 114, an encryption section 116, a transmission section 118, and a subset determination section 120. The coordinate axis setting section 104, the directed edge setting section 106 and the inter-subtree directed edge setting section 108 constitute a directed graph generation section. Further, the tree structure setting section 102 and the directed graph setting section 110 are collectively referred to as a key generation logic construction block. Likewise, the initial intermediate key setting section 112 and the key generation section 114 are collectively referred to as a key generation block.

The elements constituting the key generation logic construction block are described hereinafter. The key generation logic construction block performs processing corresponding to (Setting of a tree structure) and (Generation of directed graphs) in [Description of the basic technology] described above.

(Tree Structure Setting Section 102)

The tree structure setting section 102 configures a y-level hierarchical tree structure by dividing the entire tree BT having n-number of leaf nodes to which numbers 1 to n (n is a natural number) corresponding to n-number (n is a power of two) of terminal units 20 are assigned into a plurality of base subtrees. In this way, a feature of the embodiment is to configure the tree structure hierarchized into base subtrees in the tree structure setting section 102. Although the total number n of the terminal units 20 is described as being a power of two for convenience of the description, it is not limited to such an example, and if the total number of the terminal units 20 is not a power of two, for example, the entire tree having the n-number (n is a power of two) of leaf nodes that exceeds the total number of the terminal units 20 may be configured The embodiment uses a parameter y indicating the number of levels of the entire tree BT in addition to the parameters used in the basic technology described earlier. Note that, y|log(n), which is, y is a divisor of log(n). Then, the tree structure setting section 102 hierarchizes the entire tree BT of the binary tree structure representing all of the terminal units of users using the base subtrees having $n^{1/y}$ number of leaf nodes.

The entire tree BT has a complete binary tree structure with a height of log(n), which is equivalent to the binary tree BT (cf. FIG. 3) of the basic technology described earlier. The entire tree BT is composed of n-number of leaf nodes to which the terminal units 20 are assigned, a root node at the top of the entire tree BT, and a plurality of intermediate nodes other than the root node and the leaf nodes. On the other hand, the base subtree has a complete binary tree structure with a height of $((\log(n))/y)$. The base subtree is composed of $n^{1/y}$ number of leaf nodes, a root node at the top of the base subtree, and a plurality of intermediate nodes other than the root node and the leaf nodes.

The tree structure setting section 102 first creates the entire tree so that the number n of leaf nodes is larger than the total number of the terminal units 20, and assigns numbers 1, 2, ..., n to the respective leaf nodes from the left end toward the right.

Further, the tree structure setting section 102 divides the above entire tree BT into a plurality of base subtrees to form a y-level hierarchical structure, and combines the base subtrees in such a way that the root node of the base subtree at the lower level coincides with the leaf node of the subtree at the upper level, thereby constructing the entire tree BT.

Figure 9:
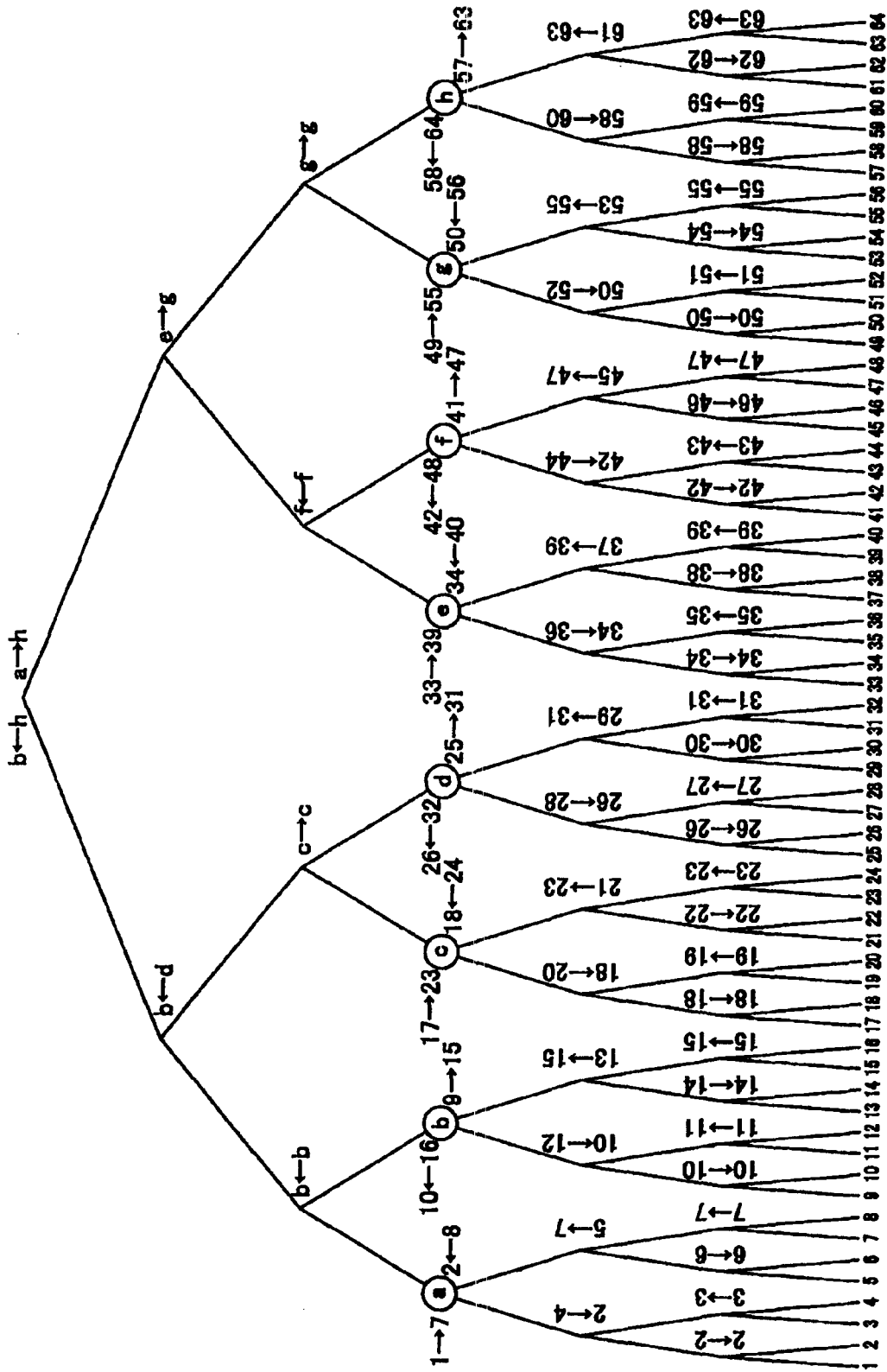
[FIG. 9] An explanatory view showing an entire tree structure of a binary tree according to the embodiment.

A specific example of such a hierarchical tree structure is shown in FIG. 9. In the example of FIG. 9, the number of terminal units 20 is set to n=64, and the parameter y is set to y=2. As shown in FIG. 9, the entire tree BT (with a height of 6 and the number of leaf nodes of 64) is divided into nine base subtrees (with a height of 3 and the number of leaf nodes of 8), having a two-level hierarchical structure. The number of base subtree at the upper level is one, and the number of base subtrees at the lower level is eight. The root node of the base subtree at the upper level is the same as the root node of the entire tree BT, and the number of leaf nodes of the base subtree at the upper level is eight, a, b, c, ..., h. The root nodes of the respective base subtrees at the lower level coincide with the leaf nodes a, b, c, ..., h of the base subtree at the upper level, and the leaf nodes of the respective base subtrees at the lower level are eight leaf nodes (e.g. 1 to 8, 9 to 16, 17 to 24, ..., 57 to 64), which are parts of the leaf nodes 1 to 64 of the above-described entire tree BT.

In this manner, the symbols "a, b, c, ..., h" in FIG. 9 indicate both the leaf nodes of the base subtree at the upper level and the root nodes of the base subtrees at the lower level and also indicate sets of leaf nodes located at the lower level of the root nodes: {Aa}, {Ab}, {Ac}, ..., {Ah}. For example, "a" indicates the set {Aa}=the subset {1, 2, ..., 8}, and "b" indicates the set {Ab}=the subset {9, ..., 16}.

The leaf nodes of the base subtrees at the bottom level respectively correspond to the terminal units 20. Further, it is assumed in the following description that the terminal unit 20 and a user are in one-to-one correspondence, and the "terminal unit 20" correlated with the leaf nodes 1 to n (the leaf nodes of the respective base subtrees at the bottom level) of the entire tree BT is indicated by the wording "user" in some cases. Although FIG. 9 shows an example where the number of leaf nodes of BT is n=64 and y=2, it is not limited to such an example, and the value of n may be an arbitrary power of two, such as n=4 ($=2^2$), 8 ($=2^3$), 16 ($=2^4$), 32 ($=2^5$), 128 ($=2^7$), ... and so on. Further, the hierarchical parameter y may be also arbitrarily set as long as it is a divisor of $\log(n)$, other than the example of y=2 shown in the figure.

Further, the tree structure setting section 102 correlates the set combining the leaf nodes 1 to n corresponding to the terminal units 20 of users with each node forming the entire tree BT configured as above, which is, the root node and the intermediate node of each base subtree, in consideration of the positional relationship between nodes. In this manner, the tree structure setting section 102 functions also as a set correlation section. The correlation of the set is described hereinafter in detail.

The sets and symbols used in the following description are defined as follows.

N: A set of all terminal units 20 (users) {1, 2, ..., n}

Aw: A set of leaf nodes located at the lower level of a node w of the entire tree BT. In the case where the node w is the leaf node of the entire tree BT (the case where the node w is the leaf node of the base subtree at the bottom level), Aw indicates a set of those leaf nodes only (i.e. the node w). Those leaf nodes are collectively referred to as "a set of leaf nodes belonging to Aw"

pw: A leaf node located on the leftmost in the set of leaf nodes belonging to Aw qw: A leaf node located on the rightmost in the set of leaf nodes belonging to Aw

[pw, qw]: {pw, pw+1, pw+2, ..., qw-1, qw}

$v^{(-i)}$: A leaf node of each base subtree located on the i-th left of a certain leaf node v $v^{(+i)}$: A leaf node of each base subtree located on the i-th right of a certain leaf node v Regarding two leaf nodes u, v (v is on the right of u) of a base subtree;

$$\text{Set } (u \to v) = \{Au, Au \cup Au^{(+1)}, \ldots, Au \cup \ldots \cup Av\}$$
$$= \{[pu, qu], [pu, qu^{(+1)}], \ldots, [pu, qv^{(-1)}], [pu, qv]\}$$
$$\text{Set } (u \leftarrow v): \{Av, Av \cup Av^{(-1)}, \ldots, Av \cup \ldots \cup Au\}$$

lv': A leaf node located at the left end of a plurality of leaf nodes located at the lower level of the node v (either a root node or an intermediate node) of a base subtree rv': A leaf node located at the right end of a plurality of leaf nodes located at the lower level of the node v (either a root node or an intermediate node) of a base subtree A: A set excluding the root node of the entire tree from a set of the root nodes of base subtrees BTL: A set of intermediate nodes of base subtrees located on the left of a parent node BTR: A set of intermediate nodes of base subtrees located on the right of a parent node The parent-child relation referred to herein indicates the hierarchical relationship of the nodes connected on the base subtree, and it means a relationship in which the parent node is located at the upper level and the child node is located at the lower level.

Using the sets and symbols defined as above, the tree structure setting section 102 correlates the set combining the leaf nodes 1 to n corresponding to the terminal units 20 with each node of the hierarchical entire tree BT configured as above, which is the root node and the intermediate node of each base subtree, in consideration of the positional relationship between nodes.

Specifically, the tree structure setting section 102 correlates the set $(l_{root}' \to r_{root}')$ and the set $(l_{root}'^{(+1)} \leftarrow r^{root})$ with the root node of the base subtree at the top level (which corresponds to the root node of the entire tree BT). In the example of FIG. 9, the set (a→h) and the set (b←h) are correlated with the root node of the base subtree at the upper level.

Further, for intermediate nodes of base subtrees at a level different from the bottom level, if an intermediate node v of each base subtree is located on the left of its parent node, the tree structure setting section 102 correlates the set $(lv'^{(+1)} \leftarrow rv')$ with the intermediate node v; on the other hand, if it is located on the right of its parent node, the tree structure setting section 102 correlates the set $(lv' \to rv'^{(-1)})$ with the intermediate node v. In the example of FIG. 9, the set (b←d), the set (e→g), the set (b←b), the set (c→c), the set (f←f) and the set (g→g) are correlated respectively with the six intermediate nodes v of the base subtree at the upper level. For example, because the symbols e, f and g indicate the subset {33, ..., 40}, the subset {41, ..., 48} and the subset {49, ..., 56}, respectively, the set (e→g) indicates a set of those subsets {Ae, Ae∪Af, Ae∪Af∪Ag}={{33, ..., 40}, {33, ..., 48}, {33, ..., 56}}.

In this manner, the subset is correlated with the node of the base subtree at the upper level, not in units of the leaf nodes 1 to n of the entire tree but in units of the leaf nodes a to h of the base subtree at the upper level, in this embodiment. Although the example of FIG. 9 is a two-level hierarchical structure and thus base subtrees at an intermediate level do not exist, if a hierarchical structure has three or more levels, for example, the subset is correlated with the node of the base subtrees at the intermediate level in units of leaf nodes of the base subtrees at the intermediate level.

Further, the tree structure setting section 102 correlates the set $(lv' \to rv'^{(-1)})$ and $(lv'^{(+1)} \leftarrow rv')$ with the root node v of the base subtree at a level different from the top level. In the example of FIG. 9, two sets are correlated with each of the root nodes a, b, c, ..., h of the eight base subtrees at the lower level. For example, the set (2←8) and the set (1→7) are correlated with the root node a. In this manner, the two sets are correlated with each root node of the base subtrees, not only the root node of the entire tree.

Furthermore, if an intermediate node v of each base subtree at the bottom level is located on the left of its parent node, the tree structure setting section 102 correlates the set $(lv'^{(-1)} \leftarrow rv')$ with the intermediate node v, and if it is located on the right of its parent node, the tree structure setting section 102 correlates the set $(lv' \to rv'^{(-1)})$ with the intermediate node v. For example, the set (2←4), the set (5→7), the set (2→2) and so on are correlated with the respective intermediate nodes of the base subtree at the left end of the lower level of FIG. 9.

As described in the foregoing, in the encryption key distribution scheme according to the embodiment, the subsets of the user set are defined using the binary tree BT hierarchized into a plurality of base subtrees. This method enables representation of the subsets of users in various combinations. The universal set made up of those subsets is called a set system Ψ and defined as the following expression (2). Thus, the following expression (2) mathematically represents the entire tree BT of the binary tree structure constructed by the above method.

[Expression 2]

$$\Psi = \bigcup_{v \in BTL \cup A} (lv'^{(+1)} \leftarrow rv') \cup \bigcup_{v \in BTR \cup A} (lv' \to rv'^{(-1)}) \cup \quad (2)$$
$$(l'_{root} \to r'_{root}) \cup (l'^{(+1)}_{root} \leftarrow r'_{root}))$$

The method of configuring the binary tree that regulates the subsets of the terminal units 20 of users by means of the tree structure setting section 102 according to the embodiment is described in the foregoing. The basic concept of the encryption key distribution scheme according to the embodiment is to set the set keys for encrypting a contents key to the respective subsets, encrypt the contents key using the respective set keys and distribute it to all users. By defining the subsets as described above, one means for categorizing combinations of users is regulated at least. Hereinafter, an algorithm for creating directed graphs using those subsets and generating set keys based on the directed graphs is described.

The directed graph generation section 110 creates the directed graphs H' corresponding respectively to the set $(l_{root}' \to r_{root}')$, the set $(lv' \to rv'^{(-1)})$, the set $(l_{root}'^{(+1)} \leftarrow r_{root}')$ and the set $(lv'^{(+1)} \leftarrow rv')$ correlated with the nodes of the hierarchical entire tree BT configured by the tree structure setting section 102. The directed graph H' is made up of a horizontal coordinate axis on which coordinate points corresponding to subsets included in those sets are sequentially arranged in such a way that the degree of inclusion of the subsets becomes larger, and a directed edge connecting the coordinate points on the horizontal coordinate axis.

The directed graph generation section 110 includes the coordinate axis setting section 104 that sets a horizontal coordinate axis of each directed graph H', the directed edge setting section 106 that sets a directed edge on the horizontal coordinate axis of each directed graph H', and the inter-subtree directed edge setting section 108 that additionally sets a directed edge between the directed graphs H' corresponding to different base subtrees. The components of the directed graph generation section 110 are described hereinafter.

(Coordinate Axis Setting Section 104)

Figure 10:
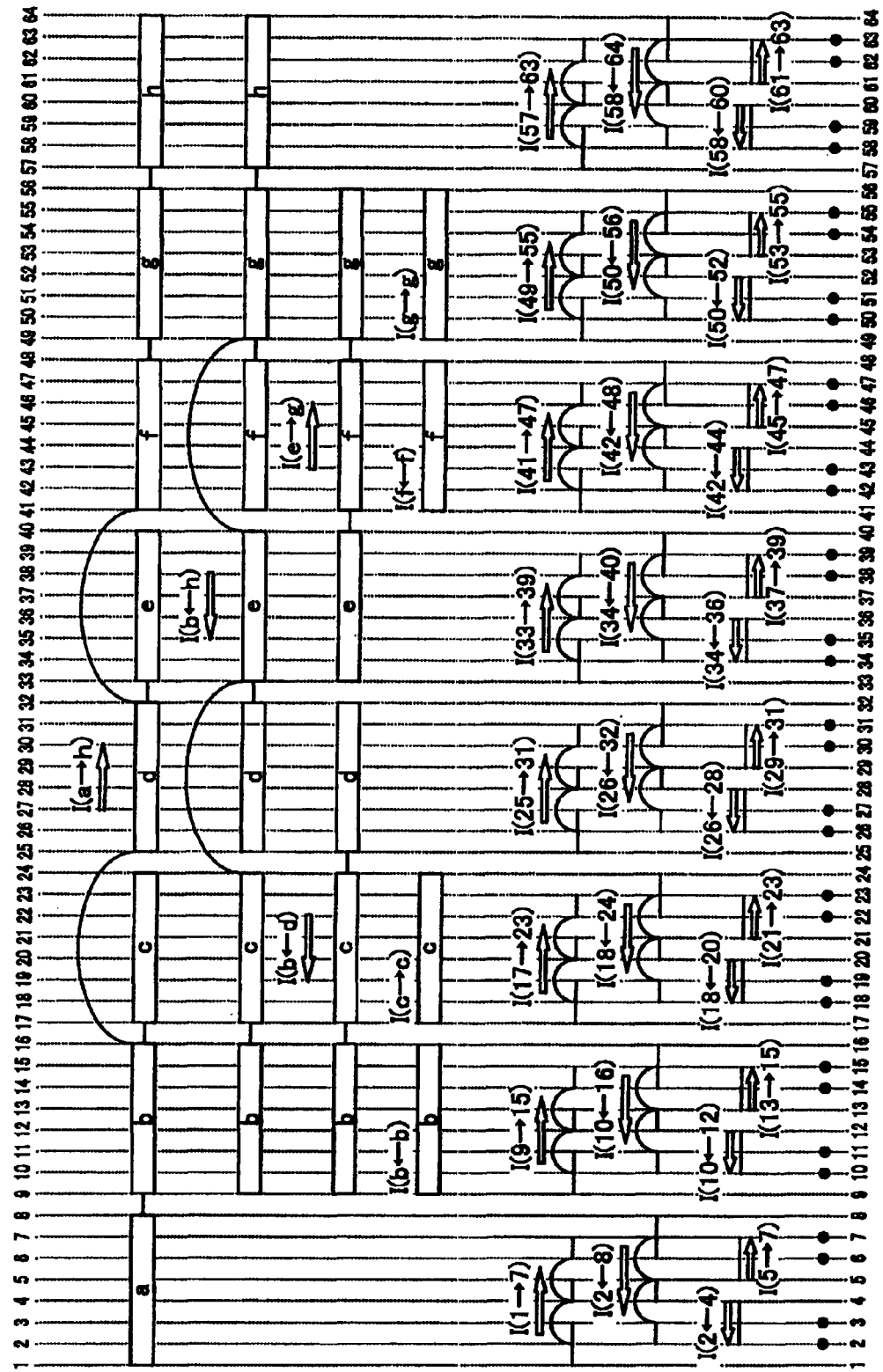
[FIG. 10] An explanatory view showing a directed graph according to the embodiment.

The coordinate axis setting section 104 sets a first horizontal coordinate axis (e.g. the coordinate axis of H'(a→h) in FIG. 10) on which the coordinate points corresponding to the respective subsets included in the set $(l_{root}' \to r_{root}')$ correlated with the root node of the base subtree at the top level are arranged in such a way that the degree of inclusion becomes larger from left to right. Further, the coordinate axis setting section 104 sets first horizontal coordinate axes (e.g. the coordinate axes of H'(e→g), H'(1→7), H'(5→7) etc. in FIG. 10) on which the coordinate points corresponding to the respective subsets included in the set $(lv' \to rv'^{(-1)})$ correlated with the root node v of the base subtree at a level other than the top level or the intermediate node v of each base subtree are arranged in such a way that the degree of inclusion becomes larger from left to right.

The coordinate axis setting section 104 further sets a second horizontal coordinate axis (e.g. the coordinate axis of H'(b←h) in FIG. 10) on which the coordinate points corresponding to the respective subsets included in the set $(l_{root}'^{(+1)} \leftarrow r_{root}')$ correlated with the root node of the base subtree at the top level are arranged in such a way that the degree of inclusion becomes larger from right to left. Further, the coordinate axis setting section 104 sets second horizontal coordinate axes (e.g. the coordinate axes of H'(b←d), H'(2←8), H'(2←4) etc. in FIG. 10) on which the coordinate points corresponding to the respective subsets included in the set $(lv'^{(+1)} \leftarrow rv')$ correlated with the root node v of the base subtree at a level other than the top level or the intermediate node v of each base subtree are arranged in such a way that the degree of inclusion becomes larger from right to left.

As described above, the coordinate axis setting section 104 sets the coordinate axes for constructing the directed graphs H' corresponding to the respective nodes of the base subtrees configured by the tree structure setting section 102. The first horizontal coordinate axis is a rightward coordinate axis, and the second horizontal coordinate axis is a leftward coordinate axis. Because the first and second horizontal coordinate axes are set for the root nodes and the intermediate nodes v of the respective base subtrees, a plurality of coordinate axes are set.

Further, the coordinate axis setting section 104 additionally sets at least total two temporary coordinate points at the left end and/or the right end of each of the first and second horizontal coordinate axes. In this embodiment, one temporary coordinate point is additionally set respectively on the left of the coordinate point at the left end and on the right of the coordinate point at the right end of each of the first and second horizontal coordinate axes, for example. In such a case, the temporary coordinate point set at the left end of the first horizontal coordinate axis serves as the starting point at the time of setting a directed edge, and the temporary coordinate point set at the right end of the first horizontal coordinate axis serves as the end point at the time of setting a directed edge. On the other hand, the temporary coordinate point set at the left end of the second horizontal coordinate axis serves as the end point at the time of setting a directed edge, and the temporary coordinate point set at the right end of the second horizontal coordinate axis serves as the starting point at the time of setting a directed edge. The technique of setting the temporary coordinate points is not limited to the above example, and at least two temporary coordinate points may be set at either one of the left end or the right end of the first and second horizontal coordinate axes, for example (Directed Edge Setting Section 106)

The directed edge setting section 106 has a function to set a directed edge forming a directed graph I between the coordinate points set by the coordinate axis setting section 104.

Specifically, the directed edge setting section 106 first sets a given integer k (where k|log($n^{1/y}$); accordingly, k is a divisor of log($n^{1/y}$)), and calculates an integer x that satisfies $n^{(x-1)/k*y}<(rv'-lv'+1) \leq n^{x/k*y}$.

Further, for the directed graph I having the above-described first horizontal coordinate axis, the directed edge setting section 106 repeatedly performs setting of a rightward directed edge extending to a coordinate point that is $n^{i/(k*y)}$ (i=0 to x−1) apart, starting from the temporary coordinate point (starting point) at the left end of each first horizontal coordinate axis. Further, for the directed graph I having the above-described second horizontal coordinate axis, the directed edge setting section 106 repeatedly performs setting of a leftward directed edge extending to a coordinate point that is $n^{i/(k*y)}$ (i=0 to x−1) apart, starting from the temporary coordinate point at the right end of each second horizontal coordinate axis.

Then, for the first and second horizontal coordinate axes, the directed edge setting section 106 excludes all the directed edges whose tails or heads are at the temporary coordinate point located each at the left end and the right end of the coordinate axes. Further, the directed edge setting section 106 excludes directed edges other than the longest directed edges, from the directed edges reaching the respective coordinate points on the first and second horizontal coordinate axes. In this manner, the directed edge setting section 106 sets a plurality of directed edges, which are chains connecting the coordinate points, on each horizontal coordinate axis of each directed graph I correlated with the root node and the intermediate node of each base subtree.

The above technique of generating the directed graph I by means of the coordinate axis setting section 104 and the directed edge setting section 106 according to the embodiment is substantially the same as the technique of generating the directed graph H according to the basic technology described earlier, except that the number of leaf nodes is $n^{1/y}$. A specific example is described hereinbelow. As one example of the technique of generating the directed graph I, the example of the directed graph I($l_{root'} \rightarrow rroot'$)=the directed graph I(a→h) correlated with the root node of the base subtree at the top level (the root node of the entire tree BT) shown in FIG. 9 is described hereinafter.

Like the basic technology described earlier, the directed graph I(a→h), which is a rightward graph correlated with the root node, is created by creating the directed graph I(a→g) corresponding to the set ($lv' \rightarrow rv'^{(-1)}$) and then adding the directed edge E ([a, g], [a, h]) after that. Therefore, the directed graph I(a→g) is first created as follows.

(S10) First, set the first horizontal coordinate axis for configuring the directed graph I(a→g) by the coordinate axis setting section 104. On the first horizontal coordinate axis, the subsets Si as the elements of the set (a→g) are assigned as coordinate points. The subsets Si forming the coordinate points are arranged in such a way that the degree of inclusion becomes larger from left to right. For example, in the directed graph H(a→h)=H({[a, a], [a, b], . . . , [a, g]}), the coordinate axis has seven coordinate points to which the subsets [a, a], [a, b], . . . , [a, g] are sequentially assigned from the left. After that, the coordinate axis setting section 104 sets a temporary coordinate point to serve as a starting point on the left of the coordinate point located leftmost on the coordinate axis for use as the starting point, and sets a temporary coordinate point to serve as an end point on the right of the coordinate point located rightmost on the coordinate axis for use as the end point. In the coordinate axis set in this manner, a length Lv from the temporary coordinate point at the left end (starting point) to the temporary coordinate point at the right end (end point) is Lv=rv'−lv'+1=h−a+1=8.

(S20) Set the directed edge forming the directed graph I(a→g) by the directed edge setting section 106.

(S20-1) Calculate the integer x satisfying $n^{(x-1)/k*y}<(h-a+1) \leq n^{x/k*y}$. The integer x satisfies $1 \leq x \leq k$.

(S20-2) Perform the following operations by changing a counter i from 0 to x−1. Starting from the starting point (temporary coordinate point) at the left end of the first horizontal coordinate axis, repeat the setting of a rightward directed edge extending to a coordinate point that is $n^{i/(k*y)}$ (i=0 to x−1) apart from the coordinate point (jump to a coordinate point that is $n^{i/(k*y)}$ apart from the coordinate point) until the head of the directed edge reaches the end point (temporary coordinate point) at the right end of the horizontal coordinate axis or the head of the directed edge to be set next exceeds the end point.

(S30) Delete all directed edges whose tails or heads are at the temporary coordinate points at both ends of the first horizontal coordinate axis.

(S40) If there are a plurality of directed edges reaching a certain coordinate point, leave the longest directed edge only and delete all the directed edges other than the longest directed edge.

If the above steps (S10) to (S40) are executed, the directed graph I(a→g) is completed. By adding the directed edge E([a, g], [a, h]) to the directed graph I(a→g), the directed graph I(a→h) is completed. For example, referring to the directed graph I(a→h) shown in FIG. 10, the coordinate points corresponding to the subsets [a, a] (shown by the box "a"), [a, b] (shown by the box "b"), . . . , [a, h] (shown by the box "h") and the linear directed edge or the arched curved directed edge connecting those coordinate points are set. Although the horizontal coordinate axis is not clearly shown in FIG. 10, the horizontal coordinate axis is composed of a group of intersection points between the coordinate points and the ends of the directed edges. Further, a rightward outline arrow is depicted above the directed graph I(a→h), and it indicates the direction of the directed edge. Specifically, it indicates that all of the directed edges forming the directed graph I(a→h) are rightward. Thus, in the directed graph I(a→h), one rightward directed edge that reaches the coordinate point b of the subset [a, b] is set from the coordinate point a of the subset [a, a], and two rightward directed edges that reach the coordinate point c of the subset [a, c] and the coordinate point d of the subset [a, d] are set from the coordinate point b of the subset [a, b].

In the same manner as the directed graph I(a→g), the directed graph I($l_{root}'^{(+1)}$←$r_{root}'$) correlated with the root node of the base subtree at the top level and the directed graph I(lv'→rv'$^{(-1)}$) and the directed graph I(lv'$^{(+1)}$←rv') correlated with the root nodes of the other base subtrees or the intermediate nodes of the base subtrees are generated. It is noted that when setting the coordinate axis of the directed graph I(lv'→rv'$^{(-1)}$) and the directed graph I(lv'$^{(+1)}$←rv'), the subsets Si are arranged in such a way that the degree of inclusion becomes larger from right to left on the second horizontal coordinate axis, so that the direction of the directed edges is leftward.

In this manner, the directed graphs I are generated. FIG. 10 represents the set system Ψ shown in FIG. 9 using the directed graphs I. FIG. 10 shows the case of y=2 and k=3.

The directed graphs I(a→h) and I(b←h) shown in FIG. 10 are directed graphs I correlated with the root node of the base subtree at the top level. Further, the directed graphs I(b←d) and I(e→g) are directed graphs I correlated with the upper-level intermediate node of the base subtree at the top level, and the directed graphs I(b←b), I(c→c), I(f←f), I(g→g) are directed graphs I correlated with the lower-level intermediate node of the base subtree at the top level, Further, the directed graphs I(1→7) and I(2←8), the directed graphs I(9→15) and I(10←16), . . . , and the directed graphs I(57→63) and I(58←64) are directed graphs I correlated respectively with the root nodes v of the eight base subtrees at the lower level. The directed graphs I(2←4), I(5→7), . . . , I(58←60), I(61→63) are directed graphs I correlated respectively with the upper-level intermediate nodes v of the eight base subtrees at the lower level. Furthermore, the directed graphs I(2←2), I(3→3), . . . , I(62←62), I(63→63), which are indicated by one coordinate point (black circle) are directed graphs I correlated respectively with the lower-level intermediate nodes v of the eight base subtrees at the lower level.

As shown in FIG. 10, by dividing and hierarchizing the entire tree BT into a plurality of base subtrees and generating the directed graphs I corresponding thereto, it is possible to reduce the length of each directed graph I and also reduce the number and the length of directed edges (the number and the distance of jumps) in each directed graph I. It is thereby possible to reduce the number of keys to be held by the terminal unit 20 and the amount of calculations of the terminal unit 20.

(Inter-Subtree Directed Edge Setting Section 108)

The inter-subtree directed edge setting section 108 shown in FIG. 8 additionally sets a directed edge from the directed graph I corresponding to the base subtree at the lower level to the directed graph I corresponding to the base subtree at the upper level in the hierarchical entire tree BT. Specifically, the inter-subtree directed edge setting section 108 sets a directed edge from a first coordinate point (e.g. a coordinate point of the subset [1, 7] of the directed graph I(1→7) in FIG. 11) in the directed graph I corresponding to the base subtree at the lower level to a second coordinate point (e.g. a coordinate point of the subset [a, a] of the directed graph I(a→h) in FIG. 11) in the directed graph I corresponding to the base subtree at the upper level. The subset represented by the second coordinate point (e.g. g. [a, a]) includes the subset corresponding to the first coordinate point (e.g. [1, 7]).

Figure 11:
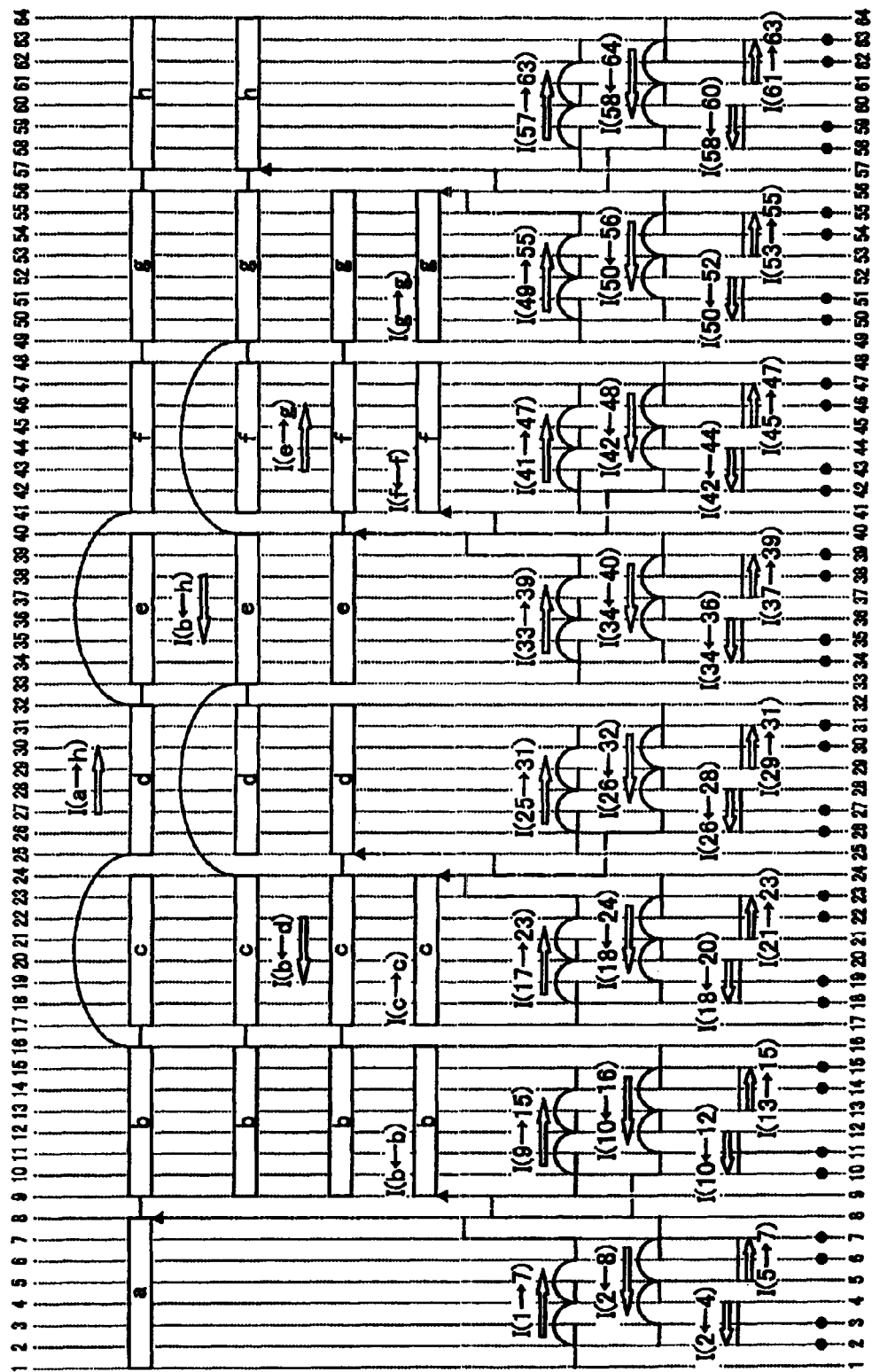
[FIG. 11] An explanatory view showing a directed graph to which a directed edge between subtrees is set according to the embodiment.

FIG. 11 shows the directed graphs I in the state where the directed edges are set between the directed graphs I corresponding to different base subtrees in such a way that the subsets Si have the inclusion relation.

As shown in FIG. 10 and FIG. 11, the subset [a, a]={1, 2, . . . , 8} of the second coordinate point indicated by the box "a" includes the subset {1, 2, . . . , 7}, that is, the subset [a, a] is a parent set of the subset [1, 7]. Thus, the inter-subtree directed edge setting section 108 additionally sets a directed edge from the coordinate point (first coordinate point) corresponding to the subset [1, 7] in the directed graph I(1→7) to the coordinate point (second coordinate point) corresponding to the subset [a, a] in the directed graph I(a→h).

Likewise, the inter-subtree directed edge setting section 108 additionally sets a directed edge from the coordinate point (first coordinate point) corresponding to the subset [64, 58] in the directed graph I(58←64) to the coordinate point (second coordinate point) corresponding to the subset [h, h] in the directed graph I(b←h). Further, the inter-subtree directed edge setting section 108 additionally sets a directed edge from the coordinate point (first coordinate point) corresponding to the subset [32, 26] in the directed graph I(26←32) to the coordinate point (second coordinate point) corresponding to the subset [d, d] in the directed graph I(b←d), and also additionally sets a directed edge from the coordinate point (first coordinate point) corresponding to the subset [33, 39] in the directed graph I(33→39) to the coordinate point (second coordinate point) corresponding to the subset [e, e] in the directed graph I(e→g). Furthermore, the inter-subtree directed edge setting section 108 additionally sets directed edges from the coordinate points (first coordinate points) corresponding to the subsets [16, 10], [17, 23], [48, 42], [49, 55] in the directed graphs I(10←16), I(17→23), I(42←48), I(49→55) to the coordinate points (second coordinate points) corresponding to the subsets [b, b], [c, c], [f, f], [g, g] in the directed graphs I(10←16), I(17→23), I(42←48), I(49→55), which include the above subsets.

In this manner, by additionally setting the directed edge between the directed graphs I, it is possible to further reduce the number of intermediate keys to be held by the terminal unit 20. For example, by additionally setting the directed edge from the subset [1, 7] of the directed graph I(1→7) to the subset [a, a] of the directed graph I(a→h), the terminal units 20 with the number 1 to 7 can derive the intermediate keys t([a, a]), t([a, b]), . . . , t([a, h]) for the eight subsets [a, a], [a, b], . . . , [a, h] by inputting the intermediate key held by itself (e.g. the intermediate key t([1, 7])), without holding the intermediate key for the subset [a, a] or the like. The number of intermediate keys t(S) to be held by those terminal units 20 is thereby reduced. The directed edges added between the other base subtrees also contribute to the reduction of the number of intermediate keys t(S) to be held by the terminal units 20.

The components of the key generation logic construction block in the key distribution server 10 are described in the foregoing. Referring to FIG. 8, the key distribution server 10 further includes the key generation block that includes the initial intermediate key setting section 112 and the key generation section 114, the encryption section 116, the transmission section 118 and the subset determination section 120, in addition to the key generation logic construction block.

(Initial Intermediate Key Setting Section 112)

The initial intermediate key setting section 112 generates an intermediate key corresponding to the initial coordinate point of the directed graph I, for each directed graph I corresponding to each node of the basic subtree. The initial coordinate point is a coordinate point located at the left end in the directed graph I having the rightward first horizontal coordinate axis (e.g. a coordinate point of the subset [1, 1] in the directed graph I(1→7)), and it is a coordinate point located at the right end in the directed graph I having the leftward second horizontal coordinate axis (e.g. a coordinate point of the subset [64, 64] in the directed graph I(58←64)). The initial intermediate key is the intermediate key t(S) for the initial coordinate point. If the initial intermediate key is obtained, the intermediate keys for the other coordinate points included in the directed graph I can be sequentially derived based on the directed graph I corresponding to the initial intermediate key with use of the pseudo-random number generator PRSG, for example. The initial intermediate key setting section 112 may generate random numbers using the pseudo-random number generator PRSG and set the random numbers as the intermediate keys or may set given numerical values as the intermediate keys.

(Key Generation Section 114)

The key generation section 114 generates the set key k(Si) for encrypting the contents key mek for each subset Si corresponding to the coordinate point in the directed graph I, based on the directed graph I generated by the above-described graph generation section 110. Specifically, when the intermediate key t(S0) for the subset S corresponding to a certain coordinate point in the directed graph I is input, the key generation section 114 outputs the set key k(S0) corresponding to the subset S0 and the intermediate keys t(S1), t(S2), . . . , t(Sk) for the subsets S1, S2, . . . , Sk corresponding to the coordinate point at the head of each directed edge whose tail is at the coordinate point S. Thus, for a certain directed edge forming the directed graph I, upon input of a given intermediate key t(S0) corresponding to the coordinate point indicated by the tail of the directed edge, the key generation section 114 outputs the set key k(S0) corresponding to the coordinate point indicated by the tail of the directed edge and the intermediate keys t(S1), t(S2), . . . , t(Sk) corresponding to the heads of all of at least k-number of directed edges extending from the tail of the directed edge.

The key generation section 114 is composed of the pseudo-random number generator (PRSG) according to the basic technology and a control section that controls the PRSG, for example. As the PRSG of the key generation section 114, the above-described PRSG that outputs $(k+1)\lambda$-bit output in response to $\lambda$-bit input so as to generate the set key k(Si) is used, for example. When the intermediate key t(S0) corresponding to a certain coordinate point (subset S0) is input, the PRSG outputs the intermediate keys t(S1), t(S2), . . . , t(Sk) corresponding to the coordinate points (subsets S1, S2, . . . , Sk) at the head of the directed edges whose tails are at the certain coordinate point, and the set key k(S0) for the subset S0. Thus, t(S1)|| . . . ||t(Sk)||k(S0)←PRSG(t(S0)). By delimiting the output of the PRSG into λ bits each from the left, the intermediate keys t(S1), t(S2), . . . , t(Sk) and the set key k(S0) are obtained.

(Encryption Section 116)

The encryption section 116 encrypts the contents key mek for encrypting the contents using the set key k(Si). Although the number of the contents key mek is one, there are the same number of set keys k(Si) as the number of subsets Si constituting the set system Ψ. The encryption section 116 encrypts the contents key using the set keys corresponding to the subsets selected from all subsets constituting the set system Ψ by the subset determination section 120 described later. Thus, the encryption section 116 generates the encrypted contents keys mek corresponding to the respective set keys k(Si). Therefore, if the number of selected subsets is m, the m-number of encrypted contents keys mek are generated. Alternatively, the encryption section 116 may encrypt contents. For example, the encryption section 116 may encrypt contents using the contents key mek or may encrypt contents using the respective set keys k(Si). The configuration that encrypts contents using the set keys k(Si) is an alternative example of the embodiment.

(Transmission Section 118)

The transmission section 118 transmits various kinds of information to each terminal unit 20 through the network 5. For example, the transmission section 118 transmits the contents keys mek that are encrypted using the respective set keys k(Si) by the encryption section 116 to all the terminal units 20 correlated with the leaf nodes 1 to n of the entire tree BT. Alternatively, the transmission section 118 may transmit contents encrypted using the respective set keys k(Si), instead of the encrypted contents keys mek, to the terminal units 20.

Further, the transmission section 118 distributes the intermediate keys to each terminal unit 20 upon setup. For example, the transmission section 118 may distribute the intermediate keys t(Si) for the subsets Si to which the terminal unit 20 belongs to each terminal unit 20 by referring to the directed graphs I. At this time, the transmission section 118 may distribute the minimum necessary number of intermediate keys so that each terminal unit 20 can derive the intermediate keys for all subsets Si to which it belongs. Specifically, the transmission section 118 may extract the subsets Si to which the terminal unit 20 belongs from the subsets constituting the set system Ψ, select a coordinate point such that the terminal unit 20 is not included in the subset Sj corresponding to the tail of the directed edge reaching the coordinate point from the coordinate points of the directed graph I corresponding to the extracted subset Si and distribute only the intermediate key t(Sj) corresponding to the selected coordinate point to the terminal unit 20. If, however, the subset Si to which the terminal unit 20 as the distribution destination of the intermediate key t(Si) belongs corresponds to the initial coordinate point of the directed graph I, the transmission section 118 may distribute only the intermediate key t(Si) corresponding to the initial coordinate point to the distribution destination user.

Furthermore, the transmission section 118 can also function as a directed graph information distribution section that distributes information related to the set system Ψ (e.g. information about n, λ, k, y, PRSG etc.) and information related to the directed graph I (e.g. a plurality of directed graphs I generated by the directed graph generation section 110 etc.) to each terminal unit 20. Specifically, the transmission section 118 may distribute information related to a key generation algorithm (e.g. a key generation program) of the PRSG that outputs given intermediate keys t(Si) and set key k(Si) based on the directed graph I upon input of each intermediate key t(Si), for example.

Distribution of the intermediate key t(Si) by the transmission section 118 may be performed prior to distribution of contents, using a communication channel different from the one used for distribution of the contents. For example, the intermediate key t(Si) for each terminal unit 20 may be output from the key distribution server 10 and recorded on a recording medium, and the intermediate key t(Si) for each terminal unit 20 that is read from the recording medium may be stored into each terminal unit 20 at the time of manufacturing the terminal unit 20 in a manufacturing plant of the terminal unit 20.

(Subset Determination Section 120)

The subset determination section 120 determines a set (R) of terminal units 20 to be excluded (which is referred to hereinafter as "a set (R) of excluded users") for which decryption of the contents key mek or the contents using the set key k(Si) should be disabled, and eliminates the set (R) of excluded users from the set (N) of all terminal units 20 assigned to the leaf nodes 1 to n of the entire tree BT, thereby determining a set (N\R) of terminal units 20 (which is referred to hereinafter as "a set (N\R) of licensed users") for which decryption of the contents key mek or the contents using the set key k(Si) is allowed. Further, the subset determination section 120 determines the m-number (m is a natural number) of subsets S1 to Sm that satisfy the set of licensed users (N\R)={S1∪S2∪ . . . ∪Sm} so that m is a minimum value.

The subset determination section 120 may be composed of a licensed user set determination section for determining the set (N\R) of licensed users and a licensed user subset determination section for determining a group of subsets Si constituting the set (N\R) of licensed users. By determining the subsets Si so as to minimize the value of m, it is possible to reduce the number of intermediate keys t(Sm) and set keys k(Sm) to be held and the amount of calculations necessary for generating those keys.

After the subsets (S1, S2, . . . , Sm) that satisfy the set of licensed users (N\R)={S1∪S2∪ . . . ∪Sm} are determined by the subset determination section 120 in the above way, the transmission section 118 transmits licensed terminal identification information for identifying the terminal unit 20 allowed to decrypt the contents key mek or the like to each terminal unit 20. For example, the licensed terminal identification information may be information indicating the set (N\R) of licensed users, information indicating the set (R) of excluded users, information indicating the subsets (S1, S2, . . . , Sm) constituting the set (N\R) of licensed users, information indicating one or more than one set keys k(Sj) used for encrypting the contents key mek or the like. Based on the licensed terminal identification information, the terminal unit 20 can decide whether it is excluded or not.

Further, the encryption section 116 encrypts the contents key mek using the set keys corresponding to the subsets (S1, S2, . . . , Sm) determined by the subset determination section 120, and the transmission section 118 transmits the encrypted contents keys mek to each terminal unit 20.

The configuration of the key distribution server 10 according to a preferred embodiment of the present invention is described in the foregoing. As described above, a feature of the embodiment is mainly the configuration of the key generation logic construction block. Particularly, the embodiment has a feature in which the inter-subtree directed edge setting section 108 for generating the directed graph I that determines the key generation logic configures a hierarchical structure having base subtrees. The inter-subtree directed edge setting section 108 according to the embodiment can generate the key generation logic (directed graph) that enables reduction of the number of intermediate keys t(Si) to be held by each terminal unit 20 without increasing the amount of calculations necessary for each terminal unit 20 of a user to generate the set key k(Si). Consequently, it is possible to save the memory capacity necessary for each terminal unit 20 to hold the intermediate keys t(Si) and reduce the distribution cost for distributing the intermediate keys t(Si) to the terminal unit 20.

The functional configurations of the components of the key distribution server 10 are described in the foregoing. Although the components of the key distribution server 10 are configured by installing programs for implementing the above functions in the key distribution server 10 in this embodiment, it is not limited to such an example, and some or all of the components may be configured by dedicated hardware. The programs may be stored in a computer-readable storage medium such as a portable storage medium and provided to the key distribution server 10, or may be transmitted from an external unit to the key distribution server 10 through a communication channel such as the network 5.

[Configuration of the Terminal Unit 20]

The functional configuration of the terminal unit 20 according to the embodiment is described hereinafter with reference to FIG. 8. FIG. 8 is a block diagram showing the functional configuration of the terminal unit 20 according to the embodiment.

As shown in FIG. 8, the terminal unit 20 includes a reception section 124, a decision section 126, a key generation section 128 and a decryption section 130. The terminal unit 20 is assigned to any of the leaf nodes 1 to n at the bottom of the entire tree.

(Reception Section 124)

The reception section 124 receives various kinds of information transmitted from the transmission section 118 included in the key distribution server 10 through the network 5. For example, the reception section 124 receives the contents encrypted by the contents key mek or each set key k(Si), the contents key mek encrypted by each set key k(Si), given one or more than one intermediate keys t(Si), information related to the set system Ψ or the directed graph I, licensed terminal identification information described above (e.g. information indicating the set (N\R) of licensed users, information indicating the subsets (S1, S2, . . . , Sm) constituting the set (N\R) of licensed users or the like) and so on from the key distribution server 10.

Further, the reception section 124 may collect information from a plurality of information sources, not only receiving information from a single information source. For example, the reception section 124 may acquire information from a plurality of information sources (e.g. the key distribution server 10) connected through the network 5 via wired or wireless or information sources (e.g. information media such as an optical disk unit, a magnetic disk unit and a portable terminal unit) connected directly or indirectly without through the network 5. Because the reception section 124 can receive information from another terminal unit 20 as a matter of course, it may be configured so as to share the information of the directed graphs I with the other terminal unit 20 belonging to the same distribution destination group, for example. In such a case, the same distribution destination group means a group of a plurality of terminal units 20 authorized as a viewer user group of contents distributed from the same or a plurality of key distribution servers 10, for example, which corresponds to any of the leaf nodes 1 to n of the entire tree BT described above. The intermediate key may be provided to the terminal unit 20 in advance and held by the terminal unit 20, as described earlier.

(Decision Section 126)

When the reception section 124 receives the licensed terminal identification information, the decision section 126 decides whether the terminal unit 20 belongs to any of the subsets S1 to Sm included in the set (N\R) of licensed users based on the received licensed terminal identification information. The licensed terminal identification information is information indicating the set (N\R) of licensed users, information indicating the subsets S1 to Sm constituting in the set (N\R) or the like. Based on the decision result, the decision section 126 further decides whether the terminal unit 20 is allowed to decrypt the encrypted contents.

Thus, the terminal unit 20 holds only the intermediate key t(Si) for generating the set key k(Si) corresponding to the subset Si to which it belongs. It is thereby necessary to decide in advance whether the subset Si to which the terminal unit 20 belongs is included in the subsets S1 to Sm constituting the set (N\R) based on the information indicating the set (N\R) of licensed users or the information indicating the subsets S1 to Sm constituting the set (N\R) from the key distribution server 10. The decision is made by the decision section 126. The information received from the key distribution server 10 to be used for the decision may be information indicating one or more than one set keys k(Sj) used for encrypting the contents key mek, for example, in addition to the above-described information.

The licensed terminal identification information or the like is distributed from the key distribution server 10 in advance or at the same time as the contents key mek, and received by the reception section 124. If it is decided that the subset Si to which the terminal unit 20 belongs is not included in the subsets Si to Sm constituting the set (N\R) of licensed users, the decryption processing of the contents key mek ends because it is incapable of executing the processing of generating the set key k(Sj) from the intermediate key t(Si) held by the terminal unit 20 On the contrary, if it is decided that the subset Si to which the terminal unit 20 belongs is included in the subsets S1 to Sm to which the terminal unit 20 belongs, the key generation section 128 of the terminal unit 20 generates the set key k(Si) from the intermediate key t(Si) held by itself using the PRSG.

(Key Generation Section 128)

The key generation section 128 generates a set key for decrypting the encrypted contents or contents key mek based on the information of the directed graph I or the like received from the key distribution server 10. The key generation section 128 generates the set key k(Si) for encrypting the contents key mek for each subset Si corresponding to the coordinate point within the directed graph I based on the information of the directed graph I received from the key distribution server 10. Specifically, when the intermediate key t(S0) for the subset S corresponding to a certain coordinate point in the directed graph I is input, the key generation section 128 outputs the set key k(S0) corresponding to the subset S0 and the intermediate keys t(S1), t(S2), . . . , t(Sk) for the subsets S1, S2, . . . , Sk corresponding to the coordinate point at the head of each directed edge whose tail is at the coordinate point S. The key generation section 128 has substantially the same functional configuration as the key generation section 114 of the key distribution server 10 described above, and thus detailed description is omitted.

(Decryption Section 130)

The decryption section 130 decrypts the contents key mek using the set key k(Si). Specifically, the decryption section 130 extracts the subset Sii in which it is included as an element from the subsets Si corresponding to the set key k(Si) and decrypts the contents key mek using the set key k(Sii) corresponding to the subset Sii.

The functional configurations of the components of the terminal unit 20 are described in the foregoing. Although the components of the terminal unit 20 are configured by installing programs for implementing the above functions in the terminal unit 20 in this embodiment, it is not limited to such an example, and some or all of the components may be configured by dedicated hardware. The programs may be stored in a computer-readable storage medium such as a portable storage medium and provided to the terminal unit 20, or may be transmitted from an external unit to the terminal unit 20 through a communication channel such as the network 5.

As described above, the terminal unit 20 according to the embodiment can generate a desired set key k(Si) based on the special key generation logic (directed graph I) generated by the directed graph generation section 110 included in the key distribution server 10 described above. Consequently, it is possible for the terminal unit 20 to reduce the number of intermediate keys t(Si) to be held for generating the set key k(Si) that is used to decrypt the contents key mek or the like. Further, because the directed edges in the directed graphs I are efficiently set because of the hierarchical structure of the entire tree BT described above, it is possible to reduce the amount of calculations by the key generation section 128 for generating the set key k(Si).

[Operations of the Key Distribution Server 10 and the Terminal Unit 20]

(Distribution of Intermediate Keys)

An operation to distribute the intermediate key from the key distribution server 10 to the terminal unit 20 of each user is described hereinafter. As described above, in order to flexibly deal with addition/deletion of a large number of excluded users and licensed users, it is necessary to provide each terminal unit 20 with a plurality of intermediate keys t(Si) that enable derivation of the set keys k(Si) corresponding to all the subsets Si in which the terminal unit 20 is included. It should be, of course, avoided to provide the intermediate key t(Si) that enables derivation of the set key k(Si) corresponding to the subset Si in which the terminal unit 20 is not included, and it is preferred that the number of provided intermediate keys t(Si) is minimum in terms of the efficiency of memory capacity of the terminal unit 20.

Thus, when distributing the intermediate key t(Si) from the key distribution server 10 to the terminal unit 20 upon setup of the key distribution system 100, all of the directed graphs I having the subsets Si to which each terminal unit 20 belongs as elements are extracted. Then, if the terminal unit 20 is included in the subset Si corresponding to the initial coordinate point (root) of the directed graph I, only the intermediate key t(Si) corresponding to the initial coordinate point is provided to the terminal unit 20. On the other hand, if the terminal unit 20 belongs to any of the subsets Si corresponding to coordinate points different from the initial coordinate point of the directed graph I, the subset S0 such that the terminal unit 20 is included in the subset S0 but is not included in the subset parent (S0) which is the parent of the subset S0 is found, and the intermediate key S0 for the subset S0 is provided to the terminal unit 20. If there are a plurality of such subsets S0, the intermediate keys t(S0) for the respective subsets are provided. The parent-child relation of the subsets Si is determined by the directed edge, and the coordinate point at the tail of the directed edge serves as the parent of the coordinate point at the head, and the coordinate point at the head of the directed edge serves as the child of the coordinate point at the tail. Hereinafter, the coordinate point parent (S0) at the tail of the directed edge reaching a certain coordinate point S0 is referred to as the parent coordinate point. If a certain coordinate point S0 is the starting point of the directed graph I, no parent coordinate point exists, and if it is not the starting point of the directed graph I, only one parent coordinate point exists. In one directed graph I, there may be a plurality of coordinate points such that the user u is included in the subset corresponding thereto but the user u is not included in the subset corresponding to its parent coordinate point in some cases.

The distribution method of the intermediate key is described hereinafter specifically with reference to the example of FIG. 11.

EXAMPLE 1

Consider the intermediate key t(Si) that is distributed to the terminal unit 20 of a user 1. First, as a result of searching for the directed graph I having the subset Si to which the user 1 belongs as the element, the directed graph I(1→7) and the directed graph I(a→h) are found. The terminal unit 20 of the user 1 belongs to the subset [1, 1] which is the initial coordinate point of the directed graph I(1→7). Thus, the user 1 is provided with the intermediate key t([1, 1]).

While the terminal unit 20 of the user 1 belongs to the subset [a, a] of the directed graph I(a→h), because an inter-graph directed edge is set from the directed graph I(1→7) to the directed graph I(a→h), the terminal unit 20 of the user 1 can derive the intermediate key t([a, a]) based on the directed graph I(1→7) and the inter-graph directed edge if it holds the intermediate key t([1, 1]). It is thus not necessary to provide the terminal unit 20 of the user 1 with the intermediate key t([a, a]). Accordingly, the intermediate key to be held by the terminal unit 20 of the user 1 is the intermediate key t([1, 1]) only.

Like the terminal unit 20 of the user 1, the terminal units 20 of the users 1 to 7 are provided with the intermediate key for the subset [1, 7]={1, 2, ..., 7} or the intermediate key enabling derivation of the intermediate for the subset [1, 7] using the PRSG, for the directed graph I(1→7). In this case, because the inter-graph directed edge is set from the directed graph I(1→7) to the directed graph I(a→h) as described above, the terminal units 20 of the users 1 to 7 can derive the intermediate key t([a, a]) by applying the intermediate key for the subset [1, 7] to the PRSG and further derive the intermediate key t([a, *]) from the intermediate key t([a, a]) (note that * is any of b to h). It is thus not necessary to provide the terminal units 20 of the users 1 to 7 with the intermediate key for the directed graph I(a→h).

EXAMPLE 2

Consider, next, the intermediate key that is distributed to the terminal unit 20 of the user 12. First, as a result of searching for the directed graph I having the subset Si to which the terminal unit 20 of the user 12 belongs as the element, the directed graphs I(a→h), I(b←h), I(b←d), I(b←b), I(9→15), I(10←16) and I(10←12) are found. Looking into the directed graph I(10←16), the terminal unit 20 of the user 12 does not belong to the subset [16, 16] at the initial coordinate point and belongs to the subsets [16, 12], [16, 11], [16, 10] at the fifth and subsequent coordinate points. Among those coordinate points, the coordinate points that do not include the user 12 at their parent coordinate points are [16, 12] and [16, 11] only. Specifically, the user 12 is not included in the coordinate point [16, 13] which is the parent coordinate points parent ([16, 12]) and parent ([16, 11]) of the coordinate points [16, 12] and [16, 11]including the user 12. Therefore, the user 12 is provided with t([16, 12]) and t([16, 11]) as the intermediate keys corresponding to the directed graph I(10←16).

In the same manner, the corresponding intermediate keys are selected for the other directed graphs I(a→h), I(b←h), I(b←d), I(9→15) and I(10←12), and provided to the user 12. However, because the inter-graph directed edge is set to the I(b←b) from the I(10←16), the terminal unit 20 of the user 12 can derive the intermediate key t([b, b]) using the above intermediate key t([16, 13]), so that it is not necessary to provide the intermediate key t([b, b]) to the terminal unit 20 of the user 12. Consequently, the total seven intermediate keys are provided to the user 12.

Figure 12:
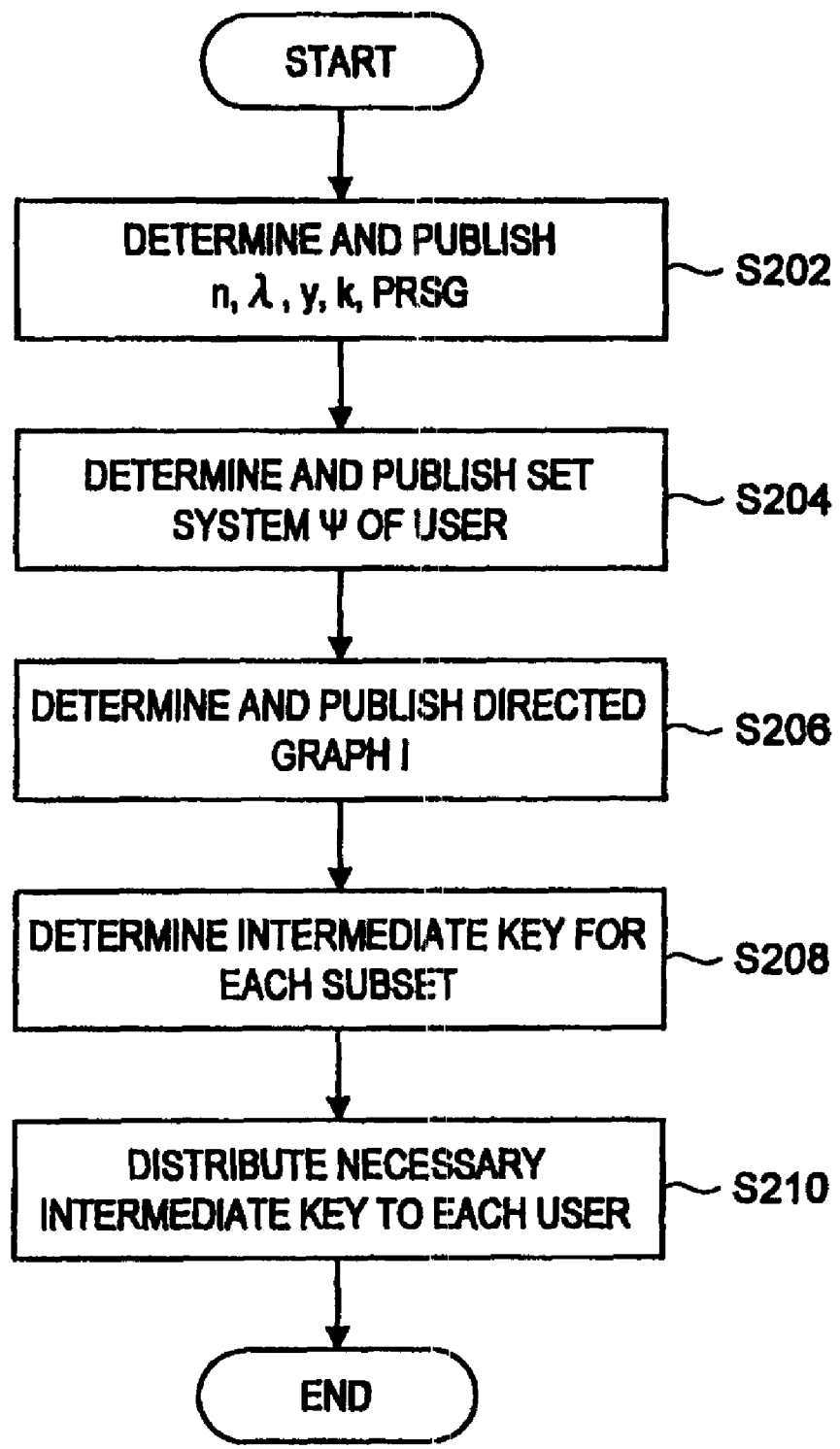
[FIG. 12] A flowchart showing a distribution method of a contents key according to the embodiment.

The processing until distributing the intermediate key to the terminal unit of each user upon system setup is briefly summarized with reference to FIG. 12. FIG. 12 is a flowchart showing the process flow for the intermediate key distribution in the key distribution server 10 upon system setup according to the embodiment.

As shown in FIG. 12, the key distribution server 10 of the key distribution system 100 first sets various parameters or the like. For example, the key distribution server 10 determines the number n of leaf nodes of the entire tree BT (the number of users) to which the terminal units 20 are assigned, the number λ of bits of the set key and the intermediate key, a parameter y indicating the number of hierarchical levels of the entire tree BT, a given parameter k, a pseudo-random number generation algorithm by PRSG and so on, and publishes them to the terminal units 20 of all users (S202). In this way, the embodiment determines and publishes the parameter y indicating the number of hierarchical levels of the entire tree BT, in addition to the parameters n, λ, k and PRSG algorithm, which are published in the above-described basic scheme.

Next, the key distribution server 10 divides a set of terminal units 20 assigned to the leaf nodes into given subsets Si, determines the set system Ψ (cf. the above expression (2)) represented by the union, and publishes the set system Ψ(S204).

Then, the key distribution server 10 generates a plurality of directed graphs I described above, determines a structure T composed of a set of those directed graphs I, and publishes the structure T of the plurality of directed graphs I (S206). Further, the key distribution server 10 determines the intermediate key corresponding to each subset constituting the set system Ψ(S208). After that, the key distribution server 10 derives intermediate keys corresponding to the other coordinate points using the determined intermediate key and the PRSG of the key generation section 114, and distributes the necessary intermediate key to the terminal unit 20 of each user so as to derive the set keys corresponding to all subsets including each terminal unit 20 (S210). Then, the terminal unit 20 receives the information about the intermediate key or the like from the key distribution server 10 and securely stores it into the secure storage section 208.

The distribution method of the intermediate key at the time of setup according to the embodiment is described in the foregoing. If the above distribution method is used, the minimum number of intermediate keys necessary for the terminal unit of each licensed user to generate the set key is distributed, thereby enabling reduction of the traffic between the key distribution server 10 and the terminal unit 20 and the memory capacity for the intermediate key in the terminal unit 20 of each user.

(Distribution of Contents Keys)

The process flow for the distribution of the encrypted contents key mek in the key distribution server 10 according to the embodiment is briefly summarized hereinafter. Because the method of distributing the contents key according to the embodiment is substantially the same as the content distribution method according to the basic technology described earlier, it is described with reference back to FIG. 6.

As shown in FIG. 6, at the time of distributing the contents key, the key distribution server 10 according to the embodiment first determines the set (R) of excluded users and thereby obtains the set (N\R) of licensed users (S112). Next, the key distribution server 10 selects the m-number of subsets Si (i=1, 2, ..., m) having the union of (N\R) from the subsets constituting the set system Ψ so that the value of m is minimum (S114). Then, the key distribution server 10 encrypts the contents key mek using the m-number of set keys k(Si) corresponding respectively to the selected subsets Si (S116). Further, the key distribution server 10 distributes licensed terminal identification information such as information indicating the set (N\R) of licensed users or the subsets Si of it and the m-number of encrypted contents keys mek to the terminal units 20 of all users (S118).

The encryption method and the distribution method of the contents key mek in the key distribution server 10 according to the embodiment are described in the foregoing. If the above encryption method is used, the subsets Si are selected efficiently so that the number of set keys is the minimum necessary. Because the contents key mek is thereby encrypted using the minimum necessary number m of set keys, it is possible to save the amount of calculations necessary for encryption and also reduce the number of encrypted contents keys mek to be distributed, thereby reducing the traffic.

(Decryption of Contents Keys)

The process flow of decrypting the encrypted contents key in the terminal unit 20 of each user according to the embodiment is described hereinafter. Because the method of decrypting the contents key according to the embodiment is substantially the same as the contents key decryption method according to the basic technology described earlier, it is described with reference back to FIG. 7.

As shown in FIG. 7, the terminal unit 20 of each user first receives the m-number of encrypted contents keys mek and the licensed terminal identification information such as the information indicating the set (N\R) of licensed users or the information indicating the m-number of subsets Si (i=1, 2, . . . , m) from the key distribution server 10 (S120). Next, the terminal unit 20 searches for the subset Si to which it belongs based on the licensed terminal identification information (S122) and decides whether it belongs to any of the m-number of subsets Si (Step S124).

As a result, if the terminal unit 20 finds the subset Si to which it belongs, it derives the set key k(Si) corresponding to the subset Si using the PRSG of the key generation section 128 described above based on the intermediate key and the directed graph I provided from the key distribution server 10 beforehand (S126). The configuration of the PRSG is as described earlier. If the terminal unit 20 is provided with the intermediate key t(Si) corresponding to the subset Si from the key distribution server upon setup and holds it beforehand, it can derive the set key k(Si) by using the PRSG once. On the other hand, if the terminal unit 20 does not hold the intermediate key t(Si), it can derive the desired set key k(Si) by using the PRSG repeatedly. After that, the terminal unit 20 decrypts the encrypted contents key mek using the set key k(Si) derived in this way, thereby enabling decryption of the encrypted contents (S128).

On the other hand, if the terminal unit 20 decides in the step S124 that it does not belong to any of the subsets Si, the terminal unit 20 displays and outputs that it is excluded from the terminal units 20 allowed to access the contents (i.e. it is an excluded user) (S130) and ends the decryption processing of the contents key mek.

Because the contents key decryption processing according to the embodiment as described above does not only configure the directed edges of the directed graphs I suitably by hierarchizing the entire tree BT into base subtrees but also sets the inter-graph directed edges, it is possible for the in the terminal unit 20 to reduce the amount of calculations using the PRSG to obtain the intermediate key and the set key compared to the basic technology described earlier.

Advantage of the Embodiment

The key distribution system 100 according to the embodiment is described in detail in the foregoing. In this embodiment, the set system Ψ composed of the subsets of the terminal units 20 is altered as represented by the above expression (2) to thereby improve the directed graphs I, compared to the basic technology described earlier. The embodiment divides a large entire tree BT to which all terminal units 20 are assigned into small base subtrees to hierarchize it into y levels and uses the key derivation method according to the basic technology in each base subtree, and further sets directed edges of the directed graphs I between the subsets corresponding to different base subtrees and applies the key derivation method using the pseudo-random number generator PRSG.

This configuration enables reduction of the number of intermediate keys to be held by the terminal unit 20 of each user and reduction of the amount of calculations of the terminal unit 20 necessary for key derivation. The number of intermediate keys to be held by the terminal unit 20 has a positive correlation with $k*\log(n)$, and the amount of calculations of the terminal unit 20 for key derivation has a positive correlation with $k*n^{(1/k)}$. Because this embodiment configures the set system Ψ and the directed graph I by dividing a large entire tree BT into small base subtrees with the $n^{(1/y)}$ number of leaf nodes to reduce the number n of leaf nodes of the tree structure, it is possible to reduce the number of keys to be held by the terminal unit 20 and the amount of calculations necessary for key derivation.

The number of intermediate keys to be held by the terminal unit 20 is compared between the key distribution scheme according to the basic technology described earlier and the key distribution scheme according to the embodiment with reference to FIG. 13. FIG. 13(A) is a table showing the number of intermediate keys to be held by each terminal unit in the key distribution scheme according to the basic technology described earlier (the case of n=64 and k=6 shown in FIG. 4), and FIG. 13(B) is a table showing the number of intermediate keys to be held by each terminal unit 20 in the key distribution scheme according to the embodiment (the case of n=64, y=2 and k=3 shown in FIG. 11).

As shown in FIG. 13, comparing the key distribution scheme according to the embodiment and the key distribution scheme according to the basic technology, while the number of intermediate keys is the same, i.e. one and two, between the both schemes in the terminal units 20 of the users 1 and 64, the number of keys is smaller in the key distribution scheme according to the embodiment than in the key distribution scheme according to the basic technology in the terminal units 20 of the other users 2 to 63. Further, while the total number of keys to be held by all terminal units 20 is 705 in the key distribution scheme according to the basic technology, it is 400 in the key distribution scheme according to the embodiment. Furthermore, while the average number of keys per terminal unit 20 is about 11.02 in the key distribution scheme according to the basic technology, it is 6.25 in the key distribution scheme according to the embodiment. In this way, the key distribution scheme according to the embodiment enables reduction of the number of keys to about 56.7% compared to the key distribution scheme according to the basic technology, thus achieving a significant decrease in the number of keys to be held by each terminal unit 20 and reduction of the load on the memory of the terminal unit 20.

Next, the amount of calculations of the terminal unit 20 necessary when decrypting the contents key mek in the terminal unit 20 is studied as follows. The worst value of the amount of calculations is represented by the number of directed edges from the initial coordinate point (root) to the farthest final coordinate point (directed edge leaf) in the directed graph (i.e. the number of jumps when setting directed edges). In the key distribution scheme according to the basic technology shown in the example of FIG. 4, in order to reach the final coordinate point [1, 64] from the initial coordinate point [1, 1] of the directed graph H(1→64), it is necessary to go through eleven directed edges (execute eleven times of jumps), which means to execute the PRSG as many as eleven times.

On the other hand, in the key distribution scheme according to the embodiment shown in the example of FIG. 11, it is farthest from the initial coordinate point [1, 1] to the final coordinate point [1, h] in the directed graphs I(1→7) and I(a→h), and the number of directed edges (i.e. the number of jumps) necessary is ten, which is smaller than eleven in the key distribution scheme according to the basic technology. In this way, the key distribution scheme according to the embodiment enables reduction the amount of calculations in each terminal unit 20 necessary for key calculation at the time of decryption or the like compared to the key distribution scheme according to the basic technology.

In the key distribution scheme according to the basic technology, if the value of the parameter k is made smaller, the number of keys to be held by each terminal unit 20 can be reduced because long directed edges (long-distance jumps) are deleted and only short directed edges (short-distance jumps) remain in FIG. 4; however, this raises a problem that the amount of calculations in the terminal unit 20 which is represented by the number of directed edges from the initial coordinate point to the final coordinate point in each directed graph H increases.

As described in the foregoing, in the key distribution scheme according to the embodiment, even if the number of terminal units 20 (recipients) is large, it is possible to reduce both of the number of keys to be held by the terminal unit 20 and the amount of calculations in the terminal unit necessary at the time of decryption using the encryption key.

[Applications of the Encryption Key Distribution System 100]

Applications of the above-described encryption key distribution system 100 are described hereinafter.

(Application 1)

Figure 14:
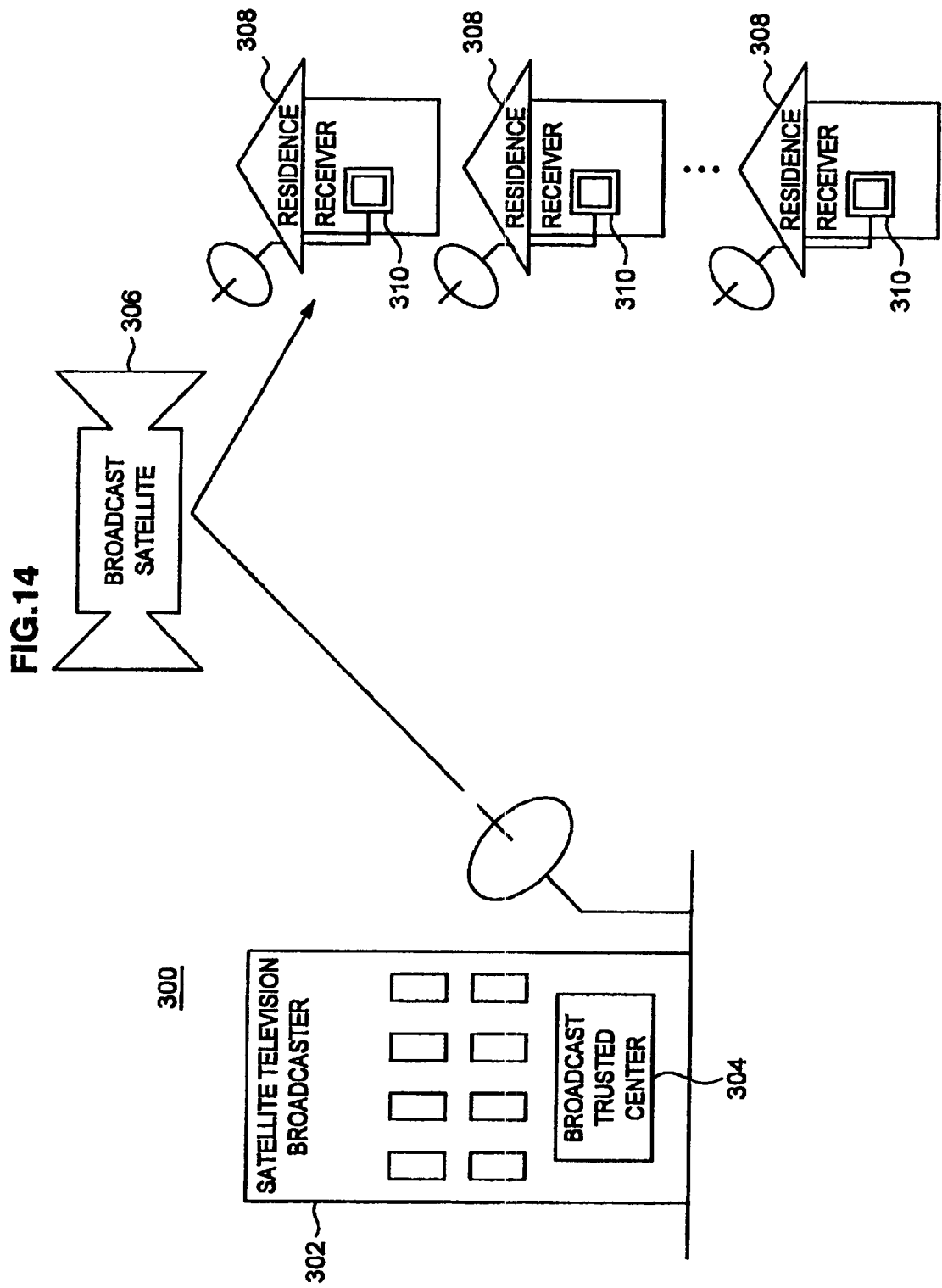
[FIG. 14] An explanatory view showing one application of an encryption key distribution system according to the embodiment.

First, as an application 1, the configuration of a broadcast encryption system 300 is shown in FIG. 14.

FIG. 14 is a block diagram showing the configuration of a broadcast encryption system using a broadcast satellite. In the broadcast encryption system 300, encrypted data (which is a so-called ciphertext) is transmitted to a receiver 310 through a broadcast channel. The broadcast channel in the broadcast encryption system 300 is a satellite broadcast distribution channel, for example. The data transmitted as a ciphertext is contents containing an encryption key, audio data, video data, text data and so on, for example. A broadcast trusted center 304 in a satellite television broadcaster 302 transmits data to a broadcast satellite 306. The broadcast trusted center 304 selects a key for encryption or controls encryption of data and distribution of data, for example. The broadcast satellite 306 broadcasts data. The receiver 310 installed in a residence 308 includes a satellite broadcast receiver, for example, and receives the broadcasted data. A plurality of other receivers 310 can also receive the broadcasted data. In this way, the broadcast trusted center 304 can transmit data to each receiver 310 in a receiver group composed of receivers 310. As described later, the broadcast trusted center 304 encrypts broadcast data in such a way that only the authorized receiver 310 can decrypt the broadcasted data. Although FIG. 14 shows a broadcast system using the broadcast satellite 306, other broadcast channels may be used, such as a cable television and a computer network.

The configuration of the broadcast encryption system 300, which is one application of the encryption key distribution system 100, is described in the foregoing. Briefly summarizing the relationship with the encryption key distribution system 100, the broadcast trusted center 304 corresponds to the key distribution server 10 (an information processing unit according to the present invention), and the receiver 310 corresponds to the terminal unit 20 (a terminal unit according to the present invention). The broadcast satellite 306 mediates a network connecting them.

(Application 2)

Next, as an application 2, the configuration of a broadcast encryption system 400 is shown in FIG. 14.

Figure 15:
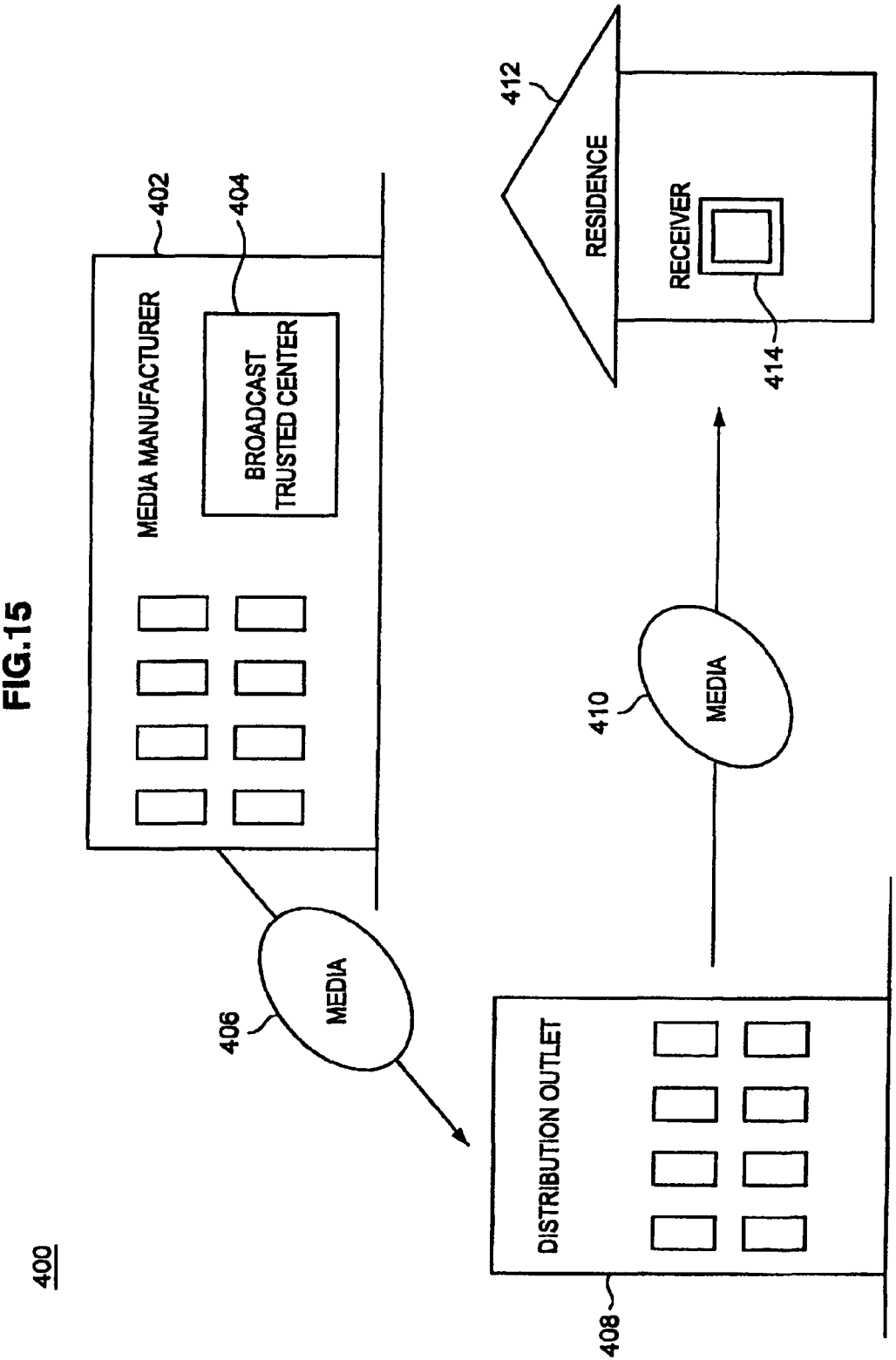
[FIG. 15] An explanatory view showing one application of an encryption key distribution system according to the embodiment.

FIG. 15 is a block diagram showing the configuration of a broadcast encryption system 400 using data media. In the broadcast encryption system 400, a broadcast channel is distribution of data storage media. A broadcast trusted center 404 in a media manufacturer 402 stores data in each article of data media of storage media 406 such as read-only storage media (e.g. CD-ROM, DVD-ROM etc.) and rewritable storage media (e.g. CD-RW, DVD-RW etc.). In the read-only storage media, the broadcast trusted center 404 records an encrypted contents key and encrypted contents, so that only an authorized user can decrypt data and access the encrypted contents (e.g. sounds, videos, texts etc.). On the other hand, in the rewritable storage media, the broadcast trusted center 404 records an encrypted contents key, so that only an authorized recording unit can record corresponding data into recording media. The media manufacturer 402 sends the storage media 406 to a distribution outlet 408 such as a retail store, for example. The distribution outlet 408 provides storage media 410 to a receiver 414 in a residence 412. For example, the distribution outlet 408 sells the storage media 410 to a person, and the person takes the storage media 410 to the residence 412 and inserts the storage media 410 into the receiver 414. For example, the receiver 414 may be a unit that reads and plays back data recorded in the storage media 410, such as a CD player, a DVD player and a computer. As another specific example, the receiver 414 may be a disk unit capable of recording data into the storage media 410 and reading data from the storage media 410, such as a DVD-RW drive. The broadcast trusted center 404 encrypts data in such a way that only the authorized receiver 414 can decrypt the encrypted data.

The configuration of the broadcast encryption system 400, which is one application of the encryption key distribution system 100, is described in the foregoing. Briefly summarizing the relationship with the encryption key distribution system 100, the broadcast trusted center 404 corresponds to the key distribution server 10 (an information processing unit according to the present invention), and the receiver 414 corresponds to the terminal unit 20 (a terminal unit according to the present invention). Further, in stead of a network connecting them, the storage media 406 and 410 that are distributed by the distribution outlet 408 exist as mediation.

Although a preferred embodiment of the present invention is described with reference to the drawings, the present invention is not limited thereto as a matter of course. It will be obvious to those skilled in the art that various changes and modifications may be made without departing from the scope of the claims and thus are intended for inclusion within the technological scope of the present invention.

For example, a tree structure in which branches become wider from top to bottom is assumed in the above-described tree structure setting section 102, it is not limited thereto, and a tree structure may be such that branches become wider in arbitrary directions, such as from bottom to top, from left to right and from right to left. In such a case, it is necessary to change the definition of the subsets correlated with the respective intermediate nodes so as to fit it. However, the change is simply rotating the tree structure set by the above-described tree structure setting section 102, and what is meant is completely the same in any case. Further, although the above-described directed edge setting section 106 and the inter-subtree directed edge setting section 108 construct the directed graphs I' and I by setting the coordinate axis from left to right or from right to left, the direction of the coordinate axis may be reversed or changed to an arbitrary direction such as the vertical direction, other than the horizontal direction. Thus, although the parameters are defined on the basis of the vertical direction or the horizontal direction for convenience in the above description, based upon the common knowledge of general people or those skilled in the art, even if the tree structure or the directed graph is rotated or reversed to change the vertical and horizontal relationship, this is intended for inclusion within the identical technological scope.

Further, although the entire tree BT with the number of leaf nodes n=64 is hierarchized into y=2 levels as shown in FIG. 9 in the above-described embodiment, the present invention is not limited thereto, and the parameter y indicating the number of hierarchical levels may be set to any natural number, and the entire tree may be hierarchized into three or more levels. For example, the entire tree BT with n=64 may be divided into base subtrees with a height of two and having four leaf nodes, so that it is hierarchized into y=3 levels. In such a case, the tree structure may be configured in such a way that the entire tree BT is divided into one base subtree at the top level, four base subtrees at the intermediate level and sixteen base subtrees at the bottom level, and the root nodes of the base subtrees at the intermediate level coincide with the leaf nodes of the base subtree at the top level, and the root nodes of the base subtrees at the bottom level coincide with the leaf nodes of the base subtrees at the intermediate level.

Furthermore, a technique of setting the directed edge that is set between the directed graphs I of different base subtrees by the inter-subtree directed edge setting section 108 is not limited to the example of FIG. 11, and various design changes are feasible. Although it is preferred to set the directed edge between the subsets in such a way that the subset of the directed graph I in the base subtree at the lower level is included in the subset of the directed graph I in the base subtree at the upper level in terms of reducing the number of keys, it is not limited thereto, and the directed edge may be set regardless of the inclusion relation.

<Second Embodiment>

An encryption key distribution scheme according to a second embodiment of the present invention is described hereinafter. The encryption key distribution scheme according to the embodiment enables reduction of the amount of calculations necessary in the terminal unit 20 by generating a directed graph having a longer directed edge. Hereinafter, the functional configurations of the key distribution server 10 and the terminal unit 20 that implement the encryption key distribution scheme according to the embodiment, and features and advantages of the encryption key distribution scheme are described in detail.

[Configuration of the Key Distribution Server 10]

Figure 16:
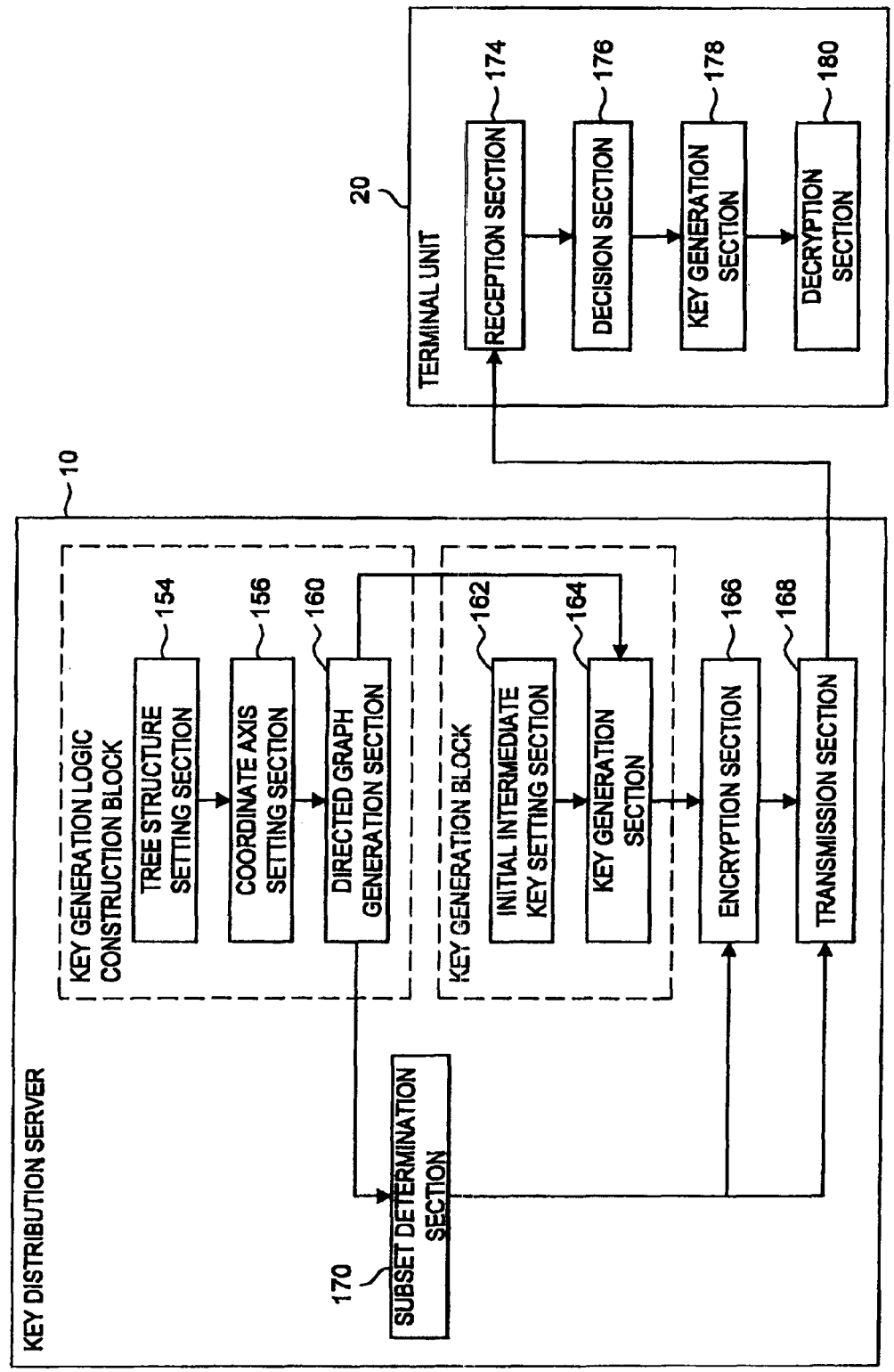
[FIG. 16] A block diagram showing configurations of an information processing unit and a terminal unit according to a second embodiment of the present invention.

Firstly, the configuration of the key distribution server 10 according to the embodiment is described hereinafter in detail with reference to FIG. 16. FIG. 16 is a block diagram showing the configurations of the key distribution server 10 and the terminal unit 20 according to the embodiment.

As shown in FIG. 16, the key distribution server 10 includes a tree structure setting section 154, a coordinate axis setting section 156, a directed graph generation section 160, an initial intermediate key setting section 162, a key generation section 164, an encryption section 166, a transmission section 168, and a subset determination section 170. Particularly, the tree structure setting section 154, the coordinate axis setting section 156 and the directed graph generation section 160 are collectively referred to as a key generation logic construction block. Likewise, the initial intermediate key setting section 162 and the key generation section 164 are collectively referred to as a key generation block.

The elements constituting the key generation logic construction block are described hereinafter. The key generation logic construction block performs processing corresponding to (Setting of a tree structure) and (Generation of directed graphs) in [Description of the basic technology] described above.

(Tree Structure Setting Section 154)

The tree structure setting section 154 configures a binary tree composed of n-number of leaf nodes to which numbers 1 to n (n is a natural number) are assigned, a root node, and a plurality of intermediate nodes other than the root node and the leaf nodes, and sets the number of the leaf node located at the left end to lv, and the number of the leaf node located at the right end to rv, among a plurality of leaf nodes located at the lower level of a certain intermediate node v or root node v. Further, the tree structure setting section 154 assigns a set $(1 \to n)$ and a set $(2 \leftarrow n)$ to the root node, and if a certain intermediate node v is located at the left of its parent node, it assigns a set $(lv+1 \leftarrow rv)$ to the intermediate node, and if an intermediate node v is located on the right of its parent node, it assigns a set $(lv \to rv-1)$ to the intermediate node.

As described above, the tree structure setting section 154 has a configuration capable of constructing a m-level tree structure, and assuming the case of m=2 (binary tree), for example, it can construct a tree structure identical to the binary tree structure according to the basic scheme (FIG. 3). Thus, the meaning of each node of the tree structure constructed by the tree structure setting section 154 is substantially the same as the meaning of each node of the binary tree structure constructed according to the basic scheme described earlier. Although only the binary tree structure is described hereinafter for convenience of description, it is not limited thereto.

(Coordinate Axis Setting Section 156)

The coordinate axis setting section 156 sets a first horizontal coordinate axis corresponding to the root node on which coordinate points correlated with subsets included in the set $(1 \to n)$ are arranged in such a way that the degree of inclusion becomes larger from left to right on the horizontal coordinate axis. Next, the coordinate axis setting section 156 sets a second horizontal coordinate axis corresponding to the root node on which coordinate points correlated with subsets included in the set $(2 \leftarrow n)$ are arranged in such a way that the degree of inclusion becomes larger from right to left on the horizontal coordinate axis. Then, the coordinate axis setting section 156 sets a third horizontal coordinate axis corresponding to a certain intermediate node v on which coordinate points correlated with subsets included in the set $(lv \to rv-1)$ are arranged in such a way that the degree of inclusion becomes larger from left to right on the horizontal coordinate axis, for each of intermediate nodes. Further, the coordinate axis setting section 156 sets a fourth horizontal coordinate axis corresponding to a certain intermediate node v on which coordinate points correlated with subsets included in the set $(lv+1 \leftarrow rv)$ are arranged in such a way that the degree of inclusion becomes larger from right to left on the horizontal coordinate axis. After that, the coordinate axis setting section 156 places two temporary coordinate points each on the right of the coordinate point located at the right end of the third horizontal coordinate axis and on the left of the coordinate point located at the left end of the second and fourth horizontal coordinate axes, sets the coordinate point located at the right end of the first horizontal coordinate axis as a first temporary coordinate point, and places a second temporary coordinate point on the right of the first temporary coordinate point.

As described above, the coordinate axis setting section 156 sets the coordinate axes for constructing the directed graphs corresponding to the respective nodes of the tree structure configured by the tree structure setting section 154. The first horizontal coordinate axis indicates a coordinate axis corresponding to the set $(1 \rightarrow n)$, the second horizontal coordinate axis indicates a coordinate axis corresponding to the set $(2 \leftarrow n)$, the third horizontal coordinate axis indicates a coordinate axis corresponding to the set $(lv \rightarrow rv-1)$, and the fourth horizontal coordinate axis indicates a coordinate axis corresponding to the set $(lv+1 \leftarrow rv)$. Because the third horizontal coordinate axis and the fourth horizontal coordinate axis are set for each intermediate node v, a plurality of coordinate axes are set respectively. Specifically, the same number of the third horizontal coordinate axes and the fourth horizontal coordinate axes as the number of intermediate nodes are set.

(Directed Graph Generation Section 160)

The directed graph generation section 160 sets a given integer k and calculates an integer x that satisfies $n^{(x-1)/k} < (rv-lv+1) \leq n^{x/k}$. Next, the directed graph generation section 160 forms a directed path with the tail at the leftmost coordinate point on the first and third horizontal coordinate axes by coupling one or a plurality of rightward directed edges having a length of $n^{i/k}$, and further forms a directed path with the tail at the rightmost coordinate point on the second and fourth horizontal coordinate axes by coupling one or a plurality of leftward directed edges having a length of $n^{i/k}$, for each of the integer i=0 to x-1. Then, the directed graph generation section 160 excludes all directed edges whose tails or heads are at each temporary coordinate point, for each of the first to fourth horizontal coordinate axes. Further, the directed graph generation section 160 excludes directed edges other than the longest directed edge from directed edges reaching each coordinate point on the first to fourth horizontal coordinate axes, thereby generating the directed graphs related to the set $(1 \rightarrow n-1)$, the set $(2 \leftarrow n)$, the set $(lv+1 \leftarrow rv)$ and the set $(lv \rightarrow rv-1)$, respectively. After that, the directed graph generation section 160 adds a directed edge having a length of 1 whose head is at the first temporary coordinate point on the first horizontal coordinate axis to the directed graph related to the set $(1 \rightarrow n-1)$, thereby generating the directed graph related to the set $(1 \rightarrow n)$.

Figure 17:
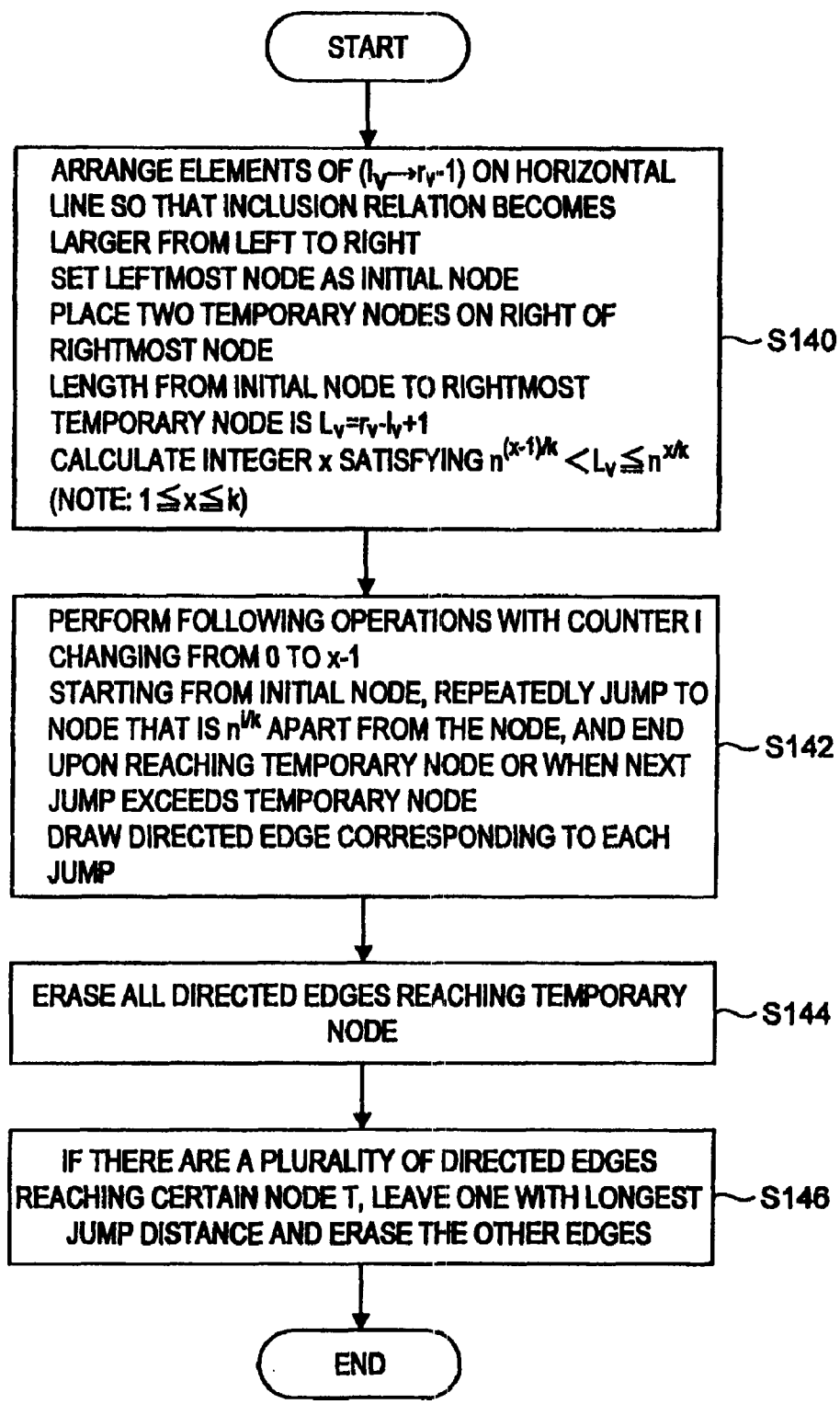
[FIG. 17] A flowchart showing a directed graph generation method according to the embodiment.

As described above, the directed graph generation section 160 generates the directed graph by the method similar to the basic scheme. Compared to the directed graph of the basic scheme, however, the directed graph generation section 160 can generate the directed graph composed of longer directed edges. This reduces the amount of calculations necessary for each user to derive the set key, as described later. The process flow of the processing executed by the directed graph generation section 160 is described hereinafter in detail with reference to FIG. 17. FIG. 17 is a flowchart showing the process flow for the directed graph generation by the directed graph generation section 160.

Referring to FIG. 17, the directed graph generation section 160 generates the directed graph by the steps described below. A method of generating the directed graph $I(lv \rightarrow rv-1)$ corresponding to the set $(lv \rightarrow rv-1)$ is described hereinafter by way of illustration.

(Step 1; S140) The directed graph generation section 160 places the subsets included in the set $(lv \rightarrow rv-1)$ on the horizontal straight line (horizontal coordinate axis) by arranging them in such a way that the degree of inclusion becomes larger from left to right. To be accurate, the directed graph generation section 160 assigns the subsets as the elements of the set $(lv \rightarrow rv-1)$ to the respective coordinate points on the horizontal coordinate axis and places the coordinate points in such a way that the degree of inclusion of the assigned subsets becomes larger toward the right. Then, the directed graph generation section 160 places two temporary coordinate points on the right of the coordinate point located rightmost on the horizontal coordinate axis. A distance Lv from the leftmost coordinate point to the rightmost temporary coordinate point on the coordinate axis is Lv=rv−lv+1. At this time, the directed graph generation section 160 calculates an integer x $(1 \leq x \leq k)$ that satisfies $n^{(x-1)/k} < Lv \leq n^{x/k}$.

(Step 2; S142) The directed graph generation section 160 sets an integer value i as a counter and performs the following operation with the counter i changing from 0 to x−1. Starting from the starting point at the left end of the horizontal coordinate axis, the directed graph generation section 160 repeats setting of a rightward directed edge extending to a coordinate point that is $n^{i/k}$ apart from the coordinate point (jump to a coordinate point that is $n^{i/k}$ apart from the coordinate point) until the head of the directed edge reaches the temporary coordinate point at the right end or on the left of it of the horizontal coordinate axis or until the head of the directed edge to be set next exceeds any of the temporary coordinate points.

(Step 3; S144) The directed graph generation section 160 deletes all the directed edges reaching the temporary coordinate points from the directed edges created in the above (Step 2).

(Step 4; S146) If there are a plurality of directed edges reaching a certain coordinate point, the directed graph generation section 160 deletes all the directed edges other than the longest directed edge.

By the above process, the directed graph generation section 160 can generate the directed graph made up of longer directed edges compared to the basic scheme. Further, the directed graph generation section 160 generates the directed graphs by the same method as the above directed graph $I(lv \rightarrow rv-1)$ for all the intermediate nodes and the root nodes constituting the tree structure. For example, the directed graph generation section 160 generates the directed graph $I(lv+1 \leftarrow rv)$ corresponding to a certain intermediate node v, and further generates the directed graphs $I(1 \rightarrow n)$ and $I(2 \leftarrow n)$ corresponding to the root node. The directed graphs $I(lv+1 \leftarrow rv)$ and $I(2 \leftarrow n)$ are formed on the horizontal coordinate axes on which the coordinate points are arranged in such a way that the degree of inclusion of the subsets included in each graph becomes larger toward the "left direction". Thus, the coordinate point arrangement rule on the horizontal coordinate axis set by the above (Step 1) is reversed. Further, two temporary coordinate points for forming the directed graphs $I(lv+1 \leftarrow rv)$ and $I(2 \leftarrow n)$ are placed on the left of the coordinate point located leftmost on the horizontal coordinate axis. The directed graph $I(1 \rightarrow n)$ is generated by adding the directed edge E([1, n−1], [1, n]) to the directed graph $I(1 \rightarrow n-1)$.

Figure 18:
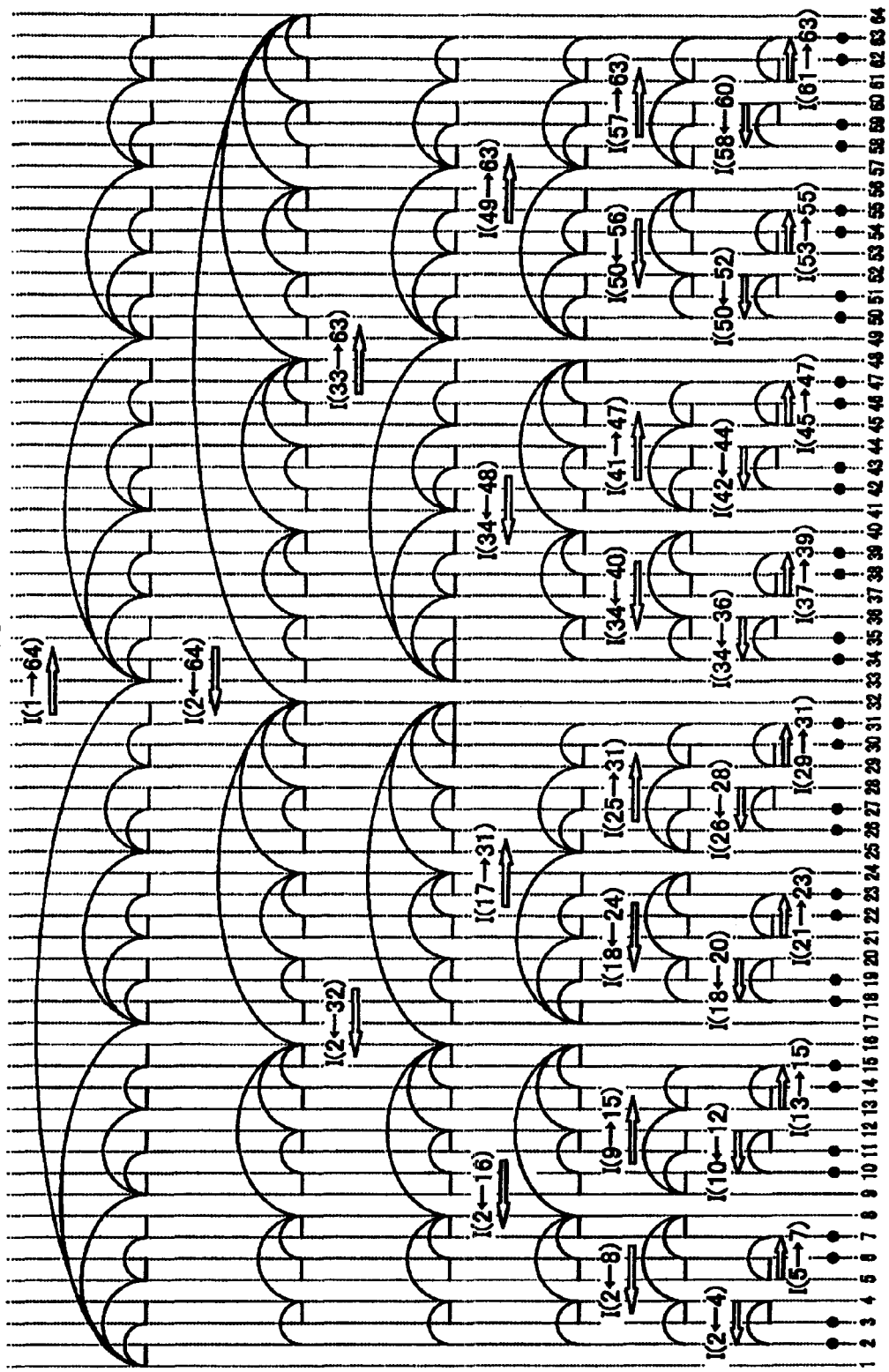
[FIG. 18] An explanatory view showing one example of a directed graph (k=6) according to the embodiment.

With use of the directed graph generation method described above, the directed graph I shown in FIG. 18 is generated. FIG. 18 shows the directed graph I formed when setting the parameter k=6 based on the complete binary tree with the number of leaf nodes n=64 shown in FIG. 3.

Figure 19:
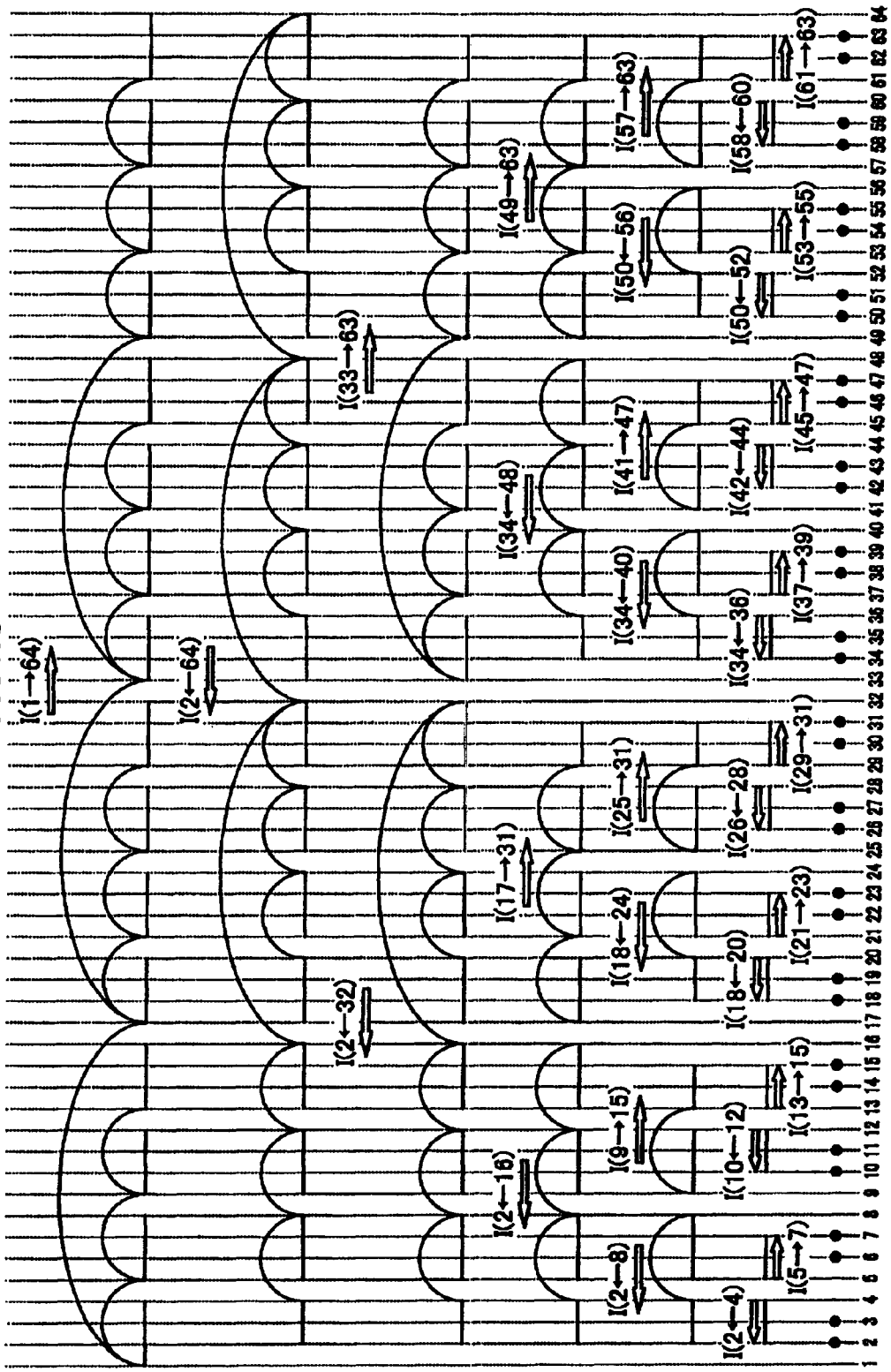
[FIG. 19] An explanatory view showing one example of a directed graph (k=3) according to the embodiment.

First, comparing the directed graph H (FIG. 4) generated based on the basic scheme and the directed graph I (FIG. 18) according to the embodiment, the directed graph I includes longer directed edges. Making a comparison about the longest directed path V ([1, 1], [1, 64]), while the directed graph H is made up of eleven directed edges, the directed graph I is made up of only six directed edges. It is thus confirmed that the amount of calculations necessary for generation of the set key by the directed graph generation section 160 is reduced. Likewise, the directed graph I in the case where the parameter k is set to k=3 is shown in FIG. 19.

An evaluation method for evaluating the number of set keys necessary for each user with respect to each directed graph is briefly described hereinbelow. First, in order to select the intermediate key to be held by each user, it is necessary to extract the directed graph to which a user u belongs. Specifically, all of the intermediate nodes in which the leaf node u corresponding to the user u is included in the leaf nodes located at the lower level are extracted from the intermediate nodes constituting the tree structure, and the directed graphs corresponding to those intermediate nodes are selected. Because all leaf nodes exist at the lower level of the root node, the directed graph corresponding to the root node is selected as a matter of course. If the tree structure including the n-number of leaf nodes is categorized by level, there are one root level, one leaf level, and log(n)−1 number of intermediate node levels. As shown in FIG. 3, there is only one graph I that includes the sub group corresponding to a certain user u as the element at each intermediate node level. Thus, the maximum log(n)+1 number of directed graphs, including the two directed graphs correlated with the root node, exist as targets.

Further, for each directed graph, the maximum number of intermediate keys to be held by a user is determined by the maximum number of directed edges with their tails located at one coordinate point. Thus, for each coordinate point of a certain directed graph, the number of directed edges starting from one coordinate point is counted, and when a coordinate point with the maximum number is extracted, the number of directed edges with their tails at the coordinate point is equivalent to the maximum number of intermediate keys to be held by a user. A user does not need to hold the intermediate keys exceeding the maximum number at least for the directed graph. Further, it is easily understood that the number of directed edges with their tails at each coordinate point does not exceed the parameter k, on the basis of the directed graph generation logic.

As a result, the number of intermediate keys to be held by each user does not exceed $k*(\log(n)+1)$ at most. Because the number n of users is large enough, an upper limit to the number of keys is generally evaluated by $O(k*(\log(n)))$. However, the evaluation value is actually an overestimation, and if a more specific evaluation value is calculated about the case of the basic scheme, for example, an upper limit to the number of keys is as represented by the following expression (3). In the encryption key distribution scheme according to the embodiment also, an evaluation model of the number of keys is the following expression (3), and there is no change in the number of intermediate keys to be held by a user.

[Expression 3]

$$\sum_{x=1}^{k-1} x\left(\frac{\log n}{k}\right) + k\left(\frac{\log n}{k} - 1\right) + 2k = \frac{k+1}{2}\log n + k \quad (3)$$

On the other hand, evaluation of the amount of calculations necessary for each user to generate a set key depends on the length of a directed path constituting a directed graph. Specifically, as the number of directed edges forming each directed path is smaller, the amount of calculations of each user decreases. For example, in the case of the directed graph H according to the basic scheme, the longest directed path is a directed path V ([1, 1], [1, n]) of the directed graph H(1→n). The directed path includes the $(2*k-1)*(n^{1/k}-1)$ number of directed edges. On the other hand, in the case of the directed graph I according to the embodiment, the longest directed path is a directed path V ([1, 1], [1, n]) of the directed graph I(1→n), and the directed path includes the $k*(n^{1/k}-1)$ number of directed edges. Thus, the embodiment enables reduction of the amount of calculations necessary for each terminal unit of a user to about half compared to the basic scheme.

The logic of generating the directed graph that enables reduction of the worst value of the amount of calculations necessary for generating a set key without increasing the number of intermediate keys to be held by a user is described in the foregoing. Construction of the key generation logic (directed graph) described above is executed mainly by the key generation logic construction block constituting the key distribution server 10. However, in order to execute the encryption key distribution based on the above key generation logic, other elements are necessary. Thus, the other elements are described hereinafter with reference back to FIG. 16.

Referring back to FIG. 16, the key distribution server 10 includes the initial intermediate key setting section 162, the key generation section 164, the encryption section 166, the transmission section 168 and the subset determination section 170, in addition to the key generation logic construction block described above.

(Initial Intermediate Key Setting Section 162)

The initial intermediate key setting section 162 generates an intermediate key corresponding to the initial coordinate point of the directed graph I, for each directed graph I corresponding to each intermediate node of the tree. For example, the initial intermediate key setting section 162 may generate random numbers using the pseudo-random number generator and set the random numbers as each intermediate key corresponding to the above initial coordinate point (root) or may set given numerical values as each intermediate key.

(Key Generation Section 164)

For a certain directed edge constituting the directed graph I, when a given intermediate key assigned to the coordinate point indicated by the tail of the directed edge is input, the key generation section 164 outputs a set key corresponding to the coordinate point indicated by the tail of the directed edge and intermediate keys corresponding to the heads of all directed edges extending from the tail of the directed edge. Thus, the key generation section 164 corresponds to the PRSG of the basic scheme. However, the key generation section 164 is different from the PRSG of the basic scheme in that it outputs intermediate keys based on the directed graph I generated by the directed graph generation section 160. If the key generation section 164 is represented as being the same as the PRSG, when the intermediate key t(S0) corresponding to a certain coordinate point S0 of the directed graph I is input, it outputs the intermediate keys t(S1), t(S2), . . . , t(Sm) corresponding to the heads of the directed edges whose tails are at the coordinate point (corresponding to the subset S0) and the set key k(S0). Note that, m indicates the number of directed edges whose tails are at a certain coordinate point S0.

(Encryption Section 166)

The encryption section 166 encrypts the contents key using the set key. Although the number of the contents key is one, there are the same number of set keys as the number of subsets constituting the set system Φ. Therefore, the encryption section 166 encrypts the contents key using the corresponding set keys for all the subsets constituting the set system Φ. Thus, the encryption key 116 generates the encrypted contents keys corresponding to the respective set keys. Accordingly, if the number of subsets constituting the set system Φ is m, the m-number of encrypted contents keys are generated. Alternatively, the encryption section 166 may encrypt contents. For example, the encryption section 166 may encrypt contents using the contents key or may encrypt contents using the respective set keys. The configuration that encrypts contents using the set key is an alternative example of the embodiment.

(Transmission Section 168)

The transmission section 168 transmits the contents keys encrypted by the encryption section 116 to all users corresponding to the leaf nodes. Further, the transmission section 168 may transmit the intermediate key to each user by referring to the above-described directed graph I. At this time, the transmission section 168 may distribute the minimum necessary number of intermediate keys so that each user can derive the intermediate keys corresponding to the subsets to which it belongs. Specifically, the transmission section 168 may extract the subset to which a distribution destination user of the intermediate key belongs from the subsets constituting the set system Φ (cf. the above expression (1)), select a coordinate point such that the distribution destination user is not included in the subset corresponding to the tail of the directed edge reaching the coordinate point from the coordinate points of the directed graph I corresponding to the extracted subset, and distribute only the intermediate key corresponding to the selected coordinate point to the distribution destination user. If, however, the subset to which the distribution destination user of the intermediate key belongs corresponds to the initial coordinate point of the directed graph I, the transmission section 168 may distribute only the intermediate key corresponding to the initial coordinate point to the distribution destination user. Further, the transmission section 168 may function as a directed graph information distribution section that distributes information of the directed graph I to each user. Specifically, the transmission section 168 may distribute information related to a key generation algorithm (e.g. a key generation program) of the PRSG that outputs given intermediate key and set key based on the directed graph I upon input of each intermediate key.

(Subset Determination Section 170)

The subset determination section 170 determines a set (R) of excluded users for which decryption of the contents or the contents key should be disabled, and defines a set (N\R) of licensed users by eliminating the set (R) of excluded users from a set (N) of all users using a union of given subsets selected from the subsets corresponding to the coordinate points of the directed graph I, and then determines a group of subsets constituting the set (N\R) of licensed users in such a way that the number of subsets constituting the set (N\R) of licensed users is minimum. The subset determination section 170 may be composed of a licensed user set determination section for determining the set (N\R) of licensed users and a licensed user subset determination section for determining a group of subsets constituting the set (N\R) of licensed users.

After the subsets (S1, S2, . . . , Sm) that constitute the set of licensed users (N\R=S1∪S2∪ . . . ∪Sm; m is a natural number) are determined by the subset determination section 170 in the above way, the transmission section 168 distributes information indicating the set (N\R) of licensed users or the subsets (S1, S2, . . . , Sm) constituting the set (N\R) of licensed users to each user. Further, the encryption section 166 encrypts the contents or the contents key using the set keys corresponding to the subsets (S1, S2, . . . , Sm) determined by the subset determination section 170, and the transmission section 168 transmits the encrypted contents or contents keys to each user.

The configuration of the key distribution server 10 according to a preferred embodiment of the present invention is described in the foregoing. As described above, a feature of the embodiment is mainly the configuration of the key generation logic construction block. Particularly, the embodiment has a feature in the configuration of the directed graph generation section 160 for generating the directed graph that determines the key generation logic. The directed graph generation section 160 according to the embodiment can generate the key generation logic (directed graph) that enables reduction of the amount of calculations necessary for each terminal unit to generate the set key without increasing the number of keys to be held by the terminal unit of each user.

[Configuration of the Terminal Unit 20]

The configuration of the terminal unit 20 according to the embodiment is described hereinafter with reference to FIG. 16. FIG. 16 is a block diagram showing the configuration of the terminal unit 20.

Referring to FIG. 16, the terminal unit 20 includes a reception section 174, a decision section 176, a key generation section 178 and a decryption section 180. The terminal unit 20 corresponds to the user described above.

(Reception Section 174)

The reception section 174 receives information transmitted from the transmission section 168 included in the key distribution server 10. For example, the reception section 174 receives distributed contents, an encrypted contents key, a given intermediate key, information related to the directed graph I, information related to licensed users and so on from the key distribution server 10. Further, the reception section 174 may collect information from a plurality of information sources, not only receiving information from a single information source. For example, the reception section 174 may acquire information from a plurality of information sources (e.g. the key distribution server 10) connected through a wired or wireless network or information sources (e.g. information media such as an optical disk unit, a magnetic disk unit and a portable terminal unit) connected directly or indirectly without through a network. Because the reception section 174 can receive information from another terminal unit 20 as a matter of course, it may be configured so as to share the information of the directed graph I with the other terminal unit 20 belonging to the same distribution destination group, for example. In such a case, the same distribution destination group means a group authorized as viewer users of contents distributed from the same or a plurality of key distribution servers 10, which corresponds to a set of users corresponding to the leaf nodes of the above-described tree structure.

(Decision Section 176)

The decision section 176 decides whether it is included in any of the subsets corresponding to the set keys as an element. Because the terminal unit 20 holds only the intermediate key for generating the set key corresponding to the subset to which it belongs, it is necessary to decide in advance whether the subset to which it belongs is included in the subsets corresponding to the set keys based on the information about the set keys used by the key distribution server 10 to encrypt the contents or the contents key. Such decision is made by the decision section 176. The information about the set keys is distributed from the key distribution server 10 at the same timing as or different timing from the contents key and received by the reception section 174. If it is decided that the set key corresponding to the subset to which it belongs is not included in the set keys used for encryption, the terminal unit 20 ends the decryption processing of the contents key without executing the processing to generate the set key using the intermediate key held by itself. On the contrary, if the set key corresponding to the subset to which it belongs is found, the terminal unit 20 generates the set key using the intermediate key held by itself with use of the PRSG.

(Key Generation Section 178)

For a certain directed edge constituting the directed graph I, when a given intermediate key assigned to the coordinate point indicated by the tail of the directed edge is input, the key generation section 178 outputs a set key corresponding to the coordinate point indicated by the tail of the directed edge and intermediate keys corresponding to the heads of all directed edges extending from the tail of the directed edge. Thus, the key generation section 178 corresponds to the key generation section 164 included in the key distribution server 10. If the key generation section 178 is represented as being the PRSG, if an intermediate key t(S0) corresponding to a certain coordinate point S0 of the directed graph I is input, it outputs the intermediate keys t(S1), t(S2), . . . , t(Sm) corresponding to the heads of the directed edges whose tails are at the coordinate point S0 and the set key k(S0). Note that, m indicates the number of directed edges whose tails are at a certain coordinate point S0. The information of the directed edge I may be acquired from the key distribution server 10 or stored in a storage section (not shown) included in the terminal unit 20.

(Decryption Section 180)

The decryption section 180 decrypts the contents key using the set key. Specifically, the decryption section 180 extracts the subset in which it is included as an element from the subsets corresponding to the set keys and decrypts the contents or the contents key using the set key corresponding to the subset.

The configuration of the terminal unit 20 according to the embodiment is described in the foregoing. As described above, the terminal unit 20 can generate a desired set key based on the special key generation logic (directed graph I) generated by the directed graph generation section 160 included in the key distribution server 10 described above. Consequently, it is possible for the terminal unit 20 to reduce the amount of calculations necessary for generating the set key to be used to decrypt the contents key.

Although a preferred embodiment of the present invention is described with reference to the drawings, the present invention is not limited thereto as a matter of course. It will be obvious to those skilled in the art that various changes and modifications may be made without departing from the scope of the claims and thus are intended for inclusion within the technological scope of the present invention.

For example, a tree structure in which branches become wider from top to bottom is assumed in the above-described tree structure setting section 154, it is not limited thereto, and a tree structure may be such that branches become wider from bottom to top, from left to right or from right to left. In such a case, it is necessary to change the definition of the subsets correlated with the respective intermediate nodes so as to fit it. However, the change is simply rotating the tree structure configured by the above-described tree structure setting section 154, and what is meant is completely the same in any case. Further, although the directed graph generation section 160 constructs the directed graphs I' and I by setting the coordinate axis from left to right or from right to left, a change that reverses the left and the right is feasible. Specifically, although the parameters are defined on the basis of the vertical direction or the horizontal direction for convenience in the above description, based upon the common knowledge of general people or those skilled in the art, even if the tree structure or the directed graph is rotated or reversed to change the vertical and horizontal relationship, this is intended for inclusion within the identical technological scope. Further, an information processing unit according to the embodiment may include an acquisition section that acquires a given directed graph or information related to the directed graph, for example, so as to generate the set key based on the acquired directed graph.

The invention claimed is:

1. An information processing unit comprising:
a processor; and
a memory, wherein the memory stores instructions that, when executed by the processor, cause the processor to perform the operations of:
configuring an entire binary tree made up of n-number of leaf nodes, a root node and a plurality of intermediate nodes different from the root node and the leaf nodes and divide the entire tree into a plurality of base subtrees including $n^{1/y}$ number of leaf nodes to form a y-level (y is a divisor of log(n)) hierarchical structure such that root nodes of the base subtrees at a lower level coincide with leaf nodes of the base subtree at an upper level,
defining a set of leaf nodes located lower than a node w of the entire tree as Aw,
defining a leaf node located on i-th left of a certain leaf node v as $v(^{-i})$ and a leaf node located on i-th right as $v(^{+i})$ in the leaf nodes of the base subtrees,
regarding two leaf nodes u and v (v is on right of u) of the base subtrees, defining a set (u→v) as {Au, Au∪Au $(^{+1})$, . . . , Au∪ . . . ∪Av} and a set (u←v) as {Av, Av∪Av $(^{-1})$, . . . , Av∪ . . . ∪Au},
when a leaf node located at a left end is defined as lv' and a leaf node located at a right end is rv' in a plurality of leaf nodes located lower than a node v of the base subtrees,
correlating a set $(l_{root}' \to r_{root}')$ and a set $(l_{root}'^{(+1)} \leftarrow) \leftarrow r_{root}')$ with a root node root of the base subtree at a top level,
correlating a set $(lv' \to rv'^{(-1)})$ and a set $(lv'^{(+1)}(a) \leftarrow rv')$ with a root node v of the base subtrees at a level other than the top level,
if an intermediate node v of each subtree is located on left of its parent node, correlate a set $(lv'^{(+1)} \leftarrow rv')$ with the intermediate node v, and
if an intermediate node v of each subtree is located on right of its parent node, correlate a set $(lv' \to rv'(^{-1}))$ with the intermediate node v; and
generating a directed graph where coordinate points corresponding to subsets included in the set $(l_{root}' \to r_{root}')$ or the set (lv'→rv') are arranged on a horizontal coordinate axis with a degree of inclusion increasing from left to right and a directed edge connecting the coordinate points is set and/or a directed graph where coordinate points corresponding to subsets included in the set $(l_{root}'^{(+1)} \leftarrow r_{root}')$ or the set $(lv'^{(+1)} \leftarrow rv')$ are arranged on a horizontal coordinate axis with a degree of inclusion increasing from right to left and a directed edge connecting the coordinate points is set, for each of the root node and the intermediate node v of the respective base subtrees.

2. The information processing unit according to claim 1, further comprising a directed edge from the directed graph corresponding to the base subtree at the lower level to the directed graph corresponding to the base subtree at the upper level.

3. The information processing unit according to claim 2, further comprising
setting a directed edge from a first coordinate point in the directed graph corresponding to the base subtree at the lower level to a second coordinate point in the directed graph corresponding to the base subtree at the upper level, and a subset corresponding to the second coordinate point includes a subset corresponding to the first coordinate point.

4. The information processing unit according to claim 1, further comprising setting a first horizontal coordinate axis on which coordinate points corresponding to subsets included in the set $(l_{root}' \rightarrow r_{root}')$ or the set $(lv' \rightarrow rv'^{(-1)})$ are arranged with a degree of inclusion increasing from left to right and/or a second horizontal coordinate axis on which coordinate points corresponding to subsets included in the set $(l_{root}'^{(+1)} \leftarrow r_{root}')$ or the set $(lv^{(+1)} \leftarrow rv')$ are arranged with a degree of inclusion increasing from left to right, for each of the root node and the intermediate node v of the respective base subtrees, and additionally sets at least total two temporary coordinate points at a left end and/or a right end of each of the first and second horizontal coordinate axes, and setting a given integer k (k is a divisor of $\log(n^{1/y})$) and calculating an integer x satisfying $n^{(x-1)/k*y} < (rv'-lv+1) \leq n^{x/k*y}$, repeatedly setting a rightward directed edge extending to a coordinate point being $n^{i/(k*y)}$ (i=0 to x−1) apart, starting from a coordinate point at a left end on each first horizontal coordinate axis, repeatedly setting a leftward directed edge extending to a coordinate point being $n^{i/(k*y)}$ (i=0 to x−1) apart, starting from a coordinate point at a right end on each second horizontal coordinate axis, excluding all directed edges having tails or heads at the temporary coordinate points for each of the first and second horizontal coordinate axes, and excluding directed edges other than a longest directed edge from the directed edges reaching each coordinate point on the first and second horizontal coordinate axes.

5. The information processing unit according to claim 1, further comprising:

generating a set key for encrypting contents or a contents key based on the directed graph.

6. The information processing unit according to claim 5, further compromising:

in response to input of an intermediate key t(Si) for a subset S corresponding to a certain coordinate point in the directed graph, outputting the set key k(Si) corresponding to a subset Si corresponding to the coordinate point and intermediate keys t(S1), t(S2), . . . , t(Sk) for coordinate points S1, S2, . . . , Sk at heads of the directed edges having tails at the coordinate point S.

7. The information processing unit according to claim 5, further compromising:

in response to input of a set key k(S) for a subset S corresponding to a certain coordinate point in the directed graph, outputting set keys k(S1), k(S2), . . . , k(Sk) for coordinate points S1, S2, . . . , Sk at heads of the directed edges having tails at the coordinate point S.

8. The information processing unit according to claim 5, further comprising:

encrypting the contents or the contents key using the set key.

9. The information processing unit according to claim 8, further comprising:

transmitting the contents or the contents key encrypted by the encryption section to terminal units correlated respectively with some or all of leaf nodes 1 to n of the entire tree.

10. The information processing unit according to claim 9, further compromising:

transmitting the contents or the contents key encrypted by the encryption section using the set keys corresponding respectively to the subsets S1 to Sm to the terminal units.

11. The information processing unit according to claim 1, further comprising:

determining a set (N\R) of the terminal units allowed to decrypt the contents encrypted using the set key or the contents key; and determine m-number of subsets S1 to Sm satisfying the set (N\R)={S1∪S2∪ . . . ∪Sm}, when a subset of leaf nodes 1 to n of the entire tree is defined as Si.

12. The information processing unit according to claim 11, further comprising:

determining the subsets S1 to Sm so as to minimize a value of m.

13. The information processing unit according to claim 11, further compromising:

transmitting information indicating the set (N\R) or information indicating the subsets S1 to Sm constituting the set (N\R) to the terminal units.

14. A terminal unit comprising:

a processor; and a memory, wherein the memory stores instructions that, when executed by the processor, cause the processor to perform the operations of:

generating a set key for decrypting encrypted contents or an encrypted contents key based on a directed graph, wherein the directed graph is generated by:

configuring an entire binary tree made up of n-number of leaf nodes, a root node and a plurality of intermediate nodes different from the root node and the leaf nodes and dividing the entire tree into a plurality of base subtrees including $n^{i/y}$ number of leaf nodes to form a y-level (y is a divisor of log(n)) hierarchical structure such that root nodes of the base subtrees at a lower level coincide with leaf nodes of the base subtree at an upper level, defining a set of leaf nodes located lower than a node w of the entire tree as Aw, defining a leaf node located on i-th left of a certain leaf node v as $v^{(-i)}$ and a leaf node located on i-th right as $v^{(+i)}$ in the leaf nodes of the base subtrees, regarding two leaf nodes u and v (v is on right of u) of the base subtrees, defining a set (u→v) as {Au, Au∪Au$^{(+1)}$, . . . , Au∪ . . . ∪Av} and a set (u←v) as {Av, Av∪Av$^{(-1)}$, . . . , Av∪ . . . ∪Au}, when a leaf node located at a left end is defined as lv' and a leaf node located at a right end is rv' in a plurality of leaf nodes located lower than a node v of the base subtrees, correlating a set $(l_{root}'\text{-}r_{root}')$ and a set $(l_{root}'^{(+1)} \leftarrow r_{root}')$ with a root node of the base subtree at a top level, correlating a set $(lv' \rightarrow rv'^{(-1)})$ and a set $(lv'^{(+1)} \leftarrow rv')$ with a root node v of the base subtrees at a level other than the top level, if an intermediate node v of each subtree is located on left of its parent node, correlating a set $(lv'^{(+1)} \leftarrow rv')$ with the intermediate node v, if an intermediate node v of each subtree is located on right of its parent node, correlating a set ($lv' \rightarrow rv'^{(-1)}$) with the intermediate node v, and generating a directed graph where coordinate points corresponding to subsets included in the set ($l_{root}' \rightarrow r_{root}'$) or the set ($lv' \rightarrow rv'^{(-1)}$) are arranged on a horizontal coordinate axis with a degree of inclusion increasing from left to right and a directed edge connecting the coordinate points is set and/or a directed graph where coordinate points corresponding to subsets included in the set ($l_{root}'^{(+1)} \leftarrow r_{root}'$) or the set ($lv'^{(+1)} \leftarrow rv'$) are arranged on a horizontal coordinate axis with a degree of inclusion increasing from right to left and a directed edge connecting the coordinate points is set, for each of the root node and the intermediate node v of the respective base subtrees.

15. The terminal unit according to claim 14, wherein a directed edge is set from the directed graph corresponding to the base subtree at the lower level to the directed graph corresponding to the base subtree at the upper level.

16. The terminal unit according to claim 15, wherein a directed edge is set from a first coordinate point in the directed graph corresponding to the base subtree at the lower level to a second coordinate point in the directed graph corresponding to the base subtree at the upper level, and a subset corresponding to the second coordinate point includes a subset corresponding to the first coordinate point.

17. The terminal unit according to claim 14, further comprising:

decrypting the encrypted contents or the encrypted contents key using the set key generated by the key generation section.

18. The terminal unit according to claim 17, further comprising:

decrypting the encrypted contents key using the set key and decrypts the encrypted contents using the decrypted contents key.

19. The terminal unit according to claim 14, further compromising:

in response to input of an intermediate key t(Si) for a subset S corresponding to a certain coordinate point in the directed graph, outputting the set key k(Si) corresponding to the subset S corresponding to the coordinate point and intermediate keys t(S1), t(S2), . . . , t(Sk) for subsets S1, S2, . . . , Sk corresponding to coordinate points at heads of the directed edges having tails at the coordinate point.

20. The terminal unit according to claim 14, further comprising:

in response to input of a set key k(S) for a subset S corresponding to a certain coordinate point in the directed graph, outputting set keys k(S1), k(S2), . . . , k(Sk) for coordinate points S1, S2, . . . , Sk at heads of the directed edges having tails at the coordinate point S.

21. The terminal unit according to claim 14, further comprising:

when a set (N\R) of the terminal units allowed to decrypt the contents encrypted using the set key or the contents key is determined and m-number of subsets S1 to Sm satisfying the set (N\R)={S1∪S2∪ . . . ∪Sm} are determined, receiving information indicating the set (N\R) or information indicating the subsets S1 to Sm constituting the set (N\R), where a subset of leaf nodes 1 to n of the entire tree is defined as Si; and deciding whether the terminal unit belongs to any of the subsets S1 to Sm based on the received information and decide whether decryption of the encrypted contents is allowed based on the decision result.

22. The terminal unit according to claim 21, further comprising:

decrypting the encrypted contents or the encrypted contents key using the set key generated by the key generation section, wherein decrypting the encrypted contents or the encrypted contents key using the set key when the decision section decides that the terminal unit belongs to any of the subsets S1 to Sm.

23. An information processing unit comprising:

a processor; and a memory, wherein the memory stores instructions that, when executed by the processor, cause the processor to perform the operations of:

processing a temporary directed graph formed by arranging a plurality of directed edges with a length of $n^{i/k}$ (i=0, 1, . . . , x−1) on first to fourth horizontal coordinate axes according to a natural number x satisfying $n^{(x-1)/k} < (rv-lv+1) \leq n^{x/k}$ for a given integer k wherein in a binary tree made up of n-number of leaf nodes to which numbers 1 to n (n is a natural number) are assigned, a root node and a plurality of intermediate nodes different from the root node and the leaf nodes, where a number assigned to a leaf node located at a left end is defined as lv and a number assigned to a leaf node located at a right end is defined as rv in a plurality of leaf nodes located lower than a certain intermediate node v or a certain root node v, for natural numbers i and j (i≦j), it is assumed a set (i→j) is notated as {{i}, {i, i+1}, . . . , {i, i+1, . . . , j−1, j}}, and a set (i←j) is notated as {{j}, {j, j−1}, . . . , {j, j−1, . . . , i+1, i}}, correlating a first horizontal coordinate axis with the root node and having coordinate points correlated respectively with subsets included in a set (1→n) and arranged on a horizontal coordinate axis with a degree of inclusion increasing from left to right is set, correlating a second horizontal coordinate axis with the root node and having coordinate points correlated respectively with subsets included in a set (2←n) and arranged on a horizontal coordinate axis with a degree of inclusion increasing from right to left is set, for each of the intermediate nodes, correlating a third horizontal coordinate axis with a certain intermediate node v and having coordinate points correlated respectively with subsets included in a set (lv→rv−1) and arranged on a horizontal coordinate axis with a degree of inclusion increasing from left to right is set, and correlating a fourth horizontal coordinate axis with a certain intermediate node v and having coordinate points correlated respectively with subsets included in a set (lv+1←rv) and arranged on a horizontal coordinate axis with a degree of inclusion increasing from right to left is set, acquiring the temporary directed graph;

generating a directed graph by leaving a longer directed edge among a plurality of directed edges constituting the temporary directed graph acquired by the temporary directed graph acquisition section; and generating a set key for encrypting contents or a contents key based on the directed graph.

24. An information processing unit comprising:

a processor; and a memory, wherein the memory stores instructions that, when executed by the processor, cause the processor to perform the operations of:

configuring a binary tree made up of n-number of leaf nodes to which numbers 1 to n (n is a natural number) are assigned, a root node and a plurality of intermediate nodes different from the root node and the leaf nodes, define a set (i→j) as {{i}, {i, i+1}, ..., {i, i+1, ..., j−1, j}} and a set (i←j) as {{j}, (j, j−1}, ..., {j, j−1, ..., i+1, i}} for natural numbers i and j (i≦j), and set a number assigned to a leaf node located at a left end as lv and a number assigned to a leaf node located at a right end as rv in a plurality of leaf nodes located lower than a certain intermediate node v or a certain root node v;

setting a first horizontal coordinate axis correlated with the root node and having coordinate points correlated respectively with subsets included in a set (1→n) and arranged on a horizontal coordinate axis with a degree of inclusion increasing from left to right;

setting a second horizontal coordinate axis correlated with the root node and having coordinate points correlated respectively with subsets included in a set (2←n) and arranged on a horizontal coordinate axis with a degree of inclusion increasing from right to left;

setting, for each of the intermediate nodes, a third horizontal coordinate axis correlated with a certain intermediate node v and having coordinate points correlated respectively with subsets included in a set (lv→rv−1) and arranged on a horizontal coordinate axis with a degree of inclusion increasing from left to right;

setting, for each of the intermediate nodes, a fourth horizontal coordinate axis correlated with a certain intermediate node v and having coordinate points correlated respectively with subsets included in a set (lv+1←rv) and arranged on a horizontal coordinate axis with a degree of inclusion increasing from right to left;

placing two temporary coordinate points each on right of a coordinate point located at a right end of the third horizontal coordinate axis and on left of a coordinate point located at a left end of the second and fourth horizontal coordinate axes;

setting a coordinate point located at a right end of the first horizontal coordinate axis as a first temporary coordinate point and place a second temporary coordinate point on right of the first temporary coordinate point;

generating directed graphs respectively related to a set (1→n−1), the set (2←n), the set (lv+1←rv) and the set (lv→rv−1) by setting a given integer k, calculating an integer x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{i/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than a longest directed edge from the directed edges reaching each coordinate point on the first to fourth horizontal coordinate axes; and generating a directed graph related to the set (1→n) by adding a directed edge with a length of 1 having a head at the first temporary coordinate point on the first horizontal coordinate axis to the directed graph related to the set (1→n−1).

25. The information processing unit according to claim 24, comprising:

generating a set key for encrypting contents or a contents key based on the directed graphs.

26. The information processing unit according to claim 25, further comprising:

in response to input of an intermediate key t(S) for a subset S corresponding to a certain coordinate point in the directed graph, outputting the set key k(S) corresponding to the subset S corresponding to the coordinate point and intermediate keys t(S1), t(S2), ..., t(Sk) for coordinate points S1, S2, ..., Sk at heads of the directed edges having tails at the coordinate point S.

27. The information processing unit according to claim 25, further comprising:

in response to input of a set key k(S) for a subset S corresponding to a certain coordinate point in the directed graph, the outputting set keys k(S1), k(S2), ..., k(Sk) for coordinate points S1, S2, ..., Sk at heads of the directed edges having tails at the coordinate point S.

28. A terminal unit comprising:

a processor; and a memory, wherein the memory stores instructions that, when executed by the processor, cause the processor to perform the operations of:

generating a set key for decrypting contents or a contents key based on a directed graph, wherein the directed graph is generated by:

configuring a binary tree made up of n-number of leaf nodes to which numbers 1 to n (n is a natural number) are assigned, a root node and a plurality of intermediate nodes different from the root node and the leaf nodes, defining a set (i→j) as {{i}, {i, i+1}, ..., {i, i+1, ..., j−1, j}} and a set (i←j) as {{j}, {j, j−1}, ..., {j, j−1, ..., i+1, i}} for natural numbers i and j (i←j), and setting a number assigned to a leaf node located at a left end as lv and a number assigned to a leaf node located at a right end as rv in a plurality of leaf nodes located lower than a certain intermediate node v or a certain root node v, setting a first horizontal coordinate axis correlated with the root node and having coordinate points correlated respectively with subsets included in a set (1→n) and arranged on a horizontal coordinate axis with a degree of inclusion increasing from left to right, setting a second horizontal coordinate axis correlated with the root node and having coordinate points correlated respectively with subsets included in a set (2←n) and arranged on a horizontal coordinate axis with a degree of inclusion increasing from right to left, for each of the intermediate nodes, setting a third horizontal coordinate axis correlated with a certain intermediate node v and having coordinate points correlated respectively with subsets included in a set {lv→rv−1} and arranged on a horizontal coordinate axis with a degree of inclusion increasing from left to right, and setting a fourth horizontal coordinate axis correlated with a certain intermediate node v and having coordinate points correlated respectively with subsets included in a set (lv+1←rv) and arranged on a horizontal coordinate axis with a degree of inclusion increasing from right to left, placing two temporary coordinate points each on right of a coordinate point located at a right end of the third horizontal coordinate axis and on left of a coordinate point located at a left end of the second and fourth horizontal coordinate axes, setting a coordinate point located at a right end of the first horizontal coordinate axis as a first temporary coordinate point and placing a second temporary coordinate point on right of the first temporary coordinate point, generating directed graphs respectively related to a set (1→n−1), the set (2←n), the set (lv+1←rv) and the set (lv→rv−1) by setting a given integer k, calculating an integer x satisfying $n^{(x-1)/k} < (rv-lv+1) \leq n^{x/k}$, and for each of integer i=0 to x−1, forming a directed path having a tail at a leftmost coordinate point on the first and third horizontal coordinate axes by coupling one or a plurality of rightward directed edges with a length of $n^{j/k}$, forming a directed path having a tail at a rightmost coordinate point on the second and fourth horizontal coordinate axes by coupling one or a plurality of leftward directed edges with a length of $n^{i/k}$, excluding all directed edges having tails or heads at the temporary coordinate points for each of the first to fourth horizontal coordinate axes, and excluding directed edges other than a longest directed edge from the directed edges reaching each coordinate point on the first to fourth horizontal coordinate axes; and generating a directed graph related to the set (1→n) by adding a directed edge with a length of 1 having a head at the first temporary coordinate point on the first horizontal coordinate axis to the directed graph related to the set (1→n−1).

29. The terminal unit according to claim 28, further comprising:

decrypting the encrypted contents or the encrypted contents key using the set key.

30. The terminal unit according to claim 29, further comprising:

decrypting the encrypted contents key using the set key and decrypts the encrypted contents using the decrypted contents key.

31. The terminal unit according to claim 30, further comprising:

when it is decided that the terminal unit belongs to any of the subsets S1 to Sm, decrypting the contents or the contents key using the set key corresponding to the subset to which the terminal unit belongs.

32. The terminal unit according to claim 28, further comprising:

in response to input of an intermediate key t(S) for a subset S corresponding to a certain coordinate point in the directed graph, outputting the set key k(S) corresponding to the subset S corresponding to the coordinate point and intermediate keys t(S1), t(S2), ..., t(Sk) for subsets S1, S2, ..., Sk corresponding to coordinate points at heads of the directed edges having tails at the coordinate point S.

33. The terminal unit according to claim 28, further comprising:

in response to input of a set key k(S) for a subset S corresponding to a certain coordinate point in the directed graph, outputting set keys k(S1), k(S2), ..., k(Sk) for coordinate points S1, S2, ..., Sk at heads of the directed edges having tails at the coordinate point S.

34. The terminal unit according to claim 28, further comprising:

defining a subset of leaf nodes 1 to n of the tree as Si, and when a set (N\R) of the terminal units allowed to decrypt the contents encrypted using the set key or the contents key is determined, determining m-number of subsets S1 to Sm satisfying the set (N\R) =S1∪S2∪ ... ∪Sm, and receiving information indicating the set (N\R) or information indicating the subsets S1 to Sm constituting the set (N\R), and deciding whether the terminal unit belongs to any of the subsets S1 to Sm based on the received information; and deciding whether decryption of the encrypted contents is allowed based on the decision result.

\* \* \* \* \*